(12) United States Patent
Yamauchi et al.

(10) Patent No.: US 8,192,896 B2
(45) Date of Patent: *Jun. 5, 2012

(54) MEMBRANE-MEMBRANE REINFORCING MEMBER ASSEMBLY, MEMBRANE-CATALYST LAYER ASSEMBLY, MEMBRANE-ELECTRODE ASSEMBLY, POLYMER ELECTROLYTE FUEL CELL, AND METHOD FOR MANUFACTURING MEMBRANE-ELECTRODE ASSEMBLY

(75) Inventors: Masaki Yamauchi, Osaka (JP); Yoichiro Tsuji, Osaka (JP)

(73) Assignees: Panasonic Corporation, Osaka (JP); Asahi Glass Company, Limited, Tokyo (JP)

( * ) Notice: Subject to any disclaimer, the term of this patent is extended or adjusted under 35 U.S.C. 154(b) by 312 days.

This patent is subject to a terminal disclaimer.

(21) Appl. No.: 12/530,907

(22) PCT Filed: Mar. 13, 2008

(86) PCT No.: PCT/JP2008/000576
§ 371 (c)(1),
(2), (4) Date: Sep. 11, 2009

(87) PCT Pub. No.: WO2008/126350
PCT Pub. Date: Oct. 23, 2008

(65) Prior Publication Data
US 2010/0104913 A1    Apr. 29, 2010

(30) Foreign Application Priority Data

Mar. 14, 2007 (JP) ................................. 2007-064685

(51) Int. Cl.
*H01M 2/14* (2006.01)

(52) U.S. Cl. ......................... 429/508; 429/469; 429/481
(58) Field of Classification Search .................. 429/479, 429/481, 484, 491–494
See application file for complete search history.

(56) References Cited

U.S. PATENT DOCUMENTS

| | | | |
|---|---|---|---|
| 2005/0181249 A1* | 8/2005 | Logan | 429/22 |
| 2005/0181267 A1* | 8/2005 | Mitsuta et al. | 429/40 |
| 2006/0046121 A1* | 3/2006 | Shimohira et al. | 429/30 |

FOREIGN PATENT DOCUMENTS

| | | |
|---|---|---|
| JP | 62-005569 | 1/1987 |
| JP | 05-021077 | 1/1993 |
| JP | 05-174845 | 7/1993 |
| JP | 05-242897 | 9/1993 |
| JP | 07-065847 | 3/1995 |
| JP | 08-259710 | 10/1996 |
| JP | 10-154521 | 6/1998 |

(Continued)

*Primary Examiner* — Ula C Ruddock
*Assistant Examiner* — Scott J Chmielecki
(74) *Attorney, Agent, or Firm* — McDermott Will & Emery LLP

(57) ABSTRACT

A membrane-membrane reinforcing member assembly includes: a polymer electrolyte membrane (1); one or more membrane-like first membrane reinforcing members (10) disposed on a main surface (F10) of the polymer electrolyte membrane (1) so as to extend along a peripheral edge of the polymer electrolyte membrane (1) as a whole; and one or more membrane-like second membrane reinforcing members (11) disposed on the first membrane reinforcing members (10) so as to extend along the peripheral edge of the polymer electrolyte membrane (1) as a whole and disposed such that an inner edge of the second membrane reinforcing member (11) and an inner edge of the first membrane reinforcing member (10) do not coincide with each other.

21 Claims, 36 Drawing Sheets

FOREIGN PATENT DOCUMENTS

| | | |
|---|---|---|
| JP | 10-172587 | 6/1998 |
| JP | 2003-068318 | 3/2003 |
| JP | 2003-082488 | 3/2003 |
| JP | 2004-303627 | 10/2004 |
| JP | 2005-135639 | 5/2005 |
| JP | 2005-302709 | 10/2005 |
| WO | WO 2005/081343 A1 | 9/2005 |
| WO | WO 2006/137203 A1 | 12/2006 |
| WO | WO 2007/032442 A1 | 3/2007 |
| WO | WO 2007/043587 A1 | 4/2007 |

* cited by examiner

MEMBRANE-MEMBRANE REINFORCING MEMBER ASSEMBLY, MEMBRANE-CATALYST LAYER ASSEMBLY, MEMBRANE-ELECTRODE ASSEMBLY, POLYMER ELECTROLYTE FUEL CELL, AND METHOD FOR MANUFACTURING MEMBRANE-ELECTRODE ASSEMBLY

RELATED APPLICATIONS

This application is the U.S. National Phase under 35 U.S.C. §371 of International Application No. PCT/JP2008/000576, filed on Mar. 13, 2008, which in turn claims the benefit of Japanese Application No. 2007-064685, filed on Mar. 14, 2007, the disclosures of which Applications are incorporated by reference herein.

TECHNICAL FIELD

The present invention relates to a membrane-membrane reinforcing member assembly, a membrane-catalyst layer assembly, a membrane-electrode assembly, and a polymer electrolyte fuel cell, and particularly to the shape of a membrane reinforcing member for reinforcing a polymer electrolyte membrane. The present invention also relates to a method for manufacturing the membrane-electrode assembly, and particularly to a method for manufacturing the membrane-electrode assembly provided with the membrane reinforcing member for reinforcing the polymer electrolyte membrane.

BACKGROUND ART

A polymer electrolyte fuel cell (hereinafter referred to as "PEFC") causes a hydrogen-containing fuel gas and an oxygen-containing oxidizing gas, such as air, to electrochemically react with each other to generate electric power and heat at the same time. The hydrogen-containing fuel gas is obtained by reforming a material gas, such as a city gas. At this time, a reaction shown by Chemical Formula 1 occurs in an anode, and a reaction shown by Chemical Formula 2 occurs in a cathode.

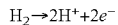   (Chemical Formula 1)

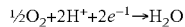   (Chemical Formula 2)

During the electric power generation of the PEFC, a part of water generated in the cathode back-diffuses and moves to the anode.

A general structure of a conventional unit cell (cell) in such PEFC is shown in FIG. 25.

As shown in FIG. 25, a cell 80 of the PEFC includes a membrane-electrode assembly 75, gaskets 76, and electrically conductive separators 77. The membrane-electrode assembly 75 is configured such that an electrode 74 formed by a catalyst layer 72 and a diffusion layer 73 is disposed on each of main surfaces of a polymer electrolyte membrane 71. In the cell 80, when viewed from a thickness direction of the polymer electrolyte membrane 71, a gap is formed at an end portion of a region between the polymer electrolyte membrane 71 and the diffusion layer 73 at which portion the catalyst layer 72 is not provided. At this gap, nothing supports the polymer electrolyte membrane 71. Therefore, if the polymer electrolyte membrane 71 is thin, the following problems may occur.

For example, in a case where the electrode 74 and the polymer electrolyte membrane 71 are bonded to each other by, for example, hot pressing, an end portion of the diffusion layer 73 of the electrode 74 may contact the main surface of the polymer electrolyte membrane 71, and this may damage the polymer electrolyte membrane 71. Moreover, in the case of fastening the cell 80, mechanical stress may be applied to the polymer electrolyte membrane 71, and this may damage the polymer electrolyte membrane 71. Further, the polymer electrolyte membrane 71 may tear by a pressure difference between the fuel gas and the oxidizing gas. If the polymer electrolyte membrane 71 is damaged, serious safety problem may occur, for example, the fuel gas and the oxidizing gas may burn by cross leakage of these gases.

To solve the above problems, known is a seal structure of a solid polymer electrolyte fuel cell in which a frame-shaped protective membrane is attached to a polymer electrolyte membrane (see Patent Document 1 for example).

FIG. 26 is a schematic diagram schematically showing the seal structure of the solid polymer electrolyte fuel cell disclosed in Patent Document 1.

As shown in FIG. 26, a frame-shaped protective membrane 220 formed by a fluorocarbon resin-based sheet is disposed on a main surface of a solid polymer electrolyte membrane 210 such that an inner peripheral portion thereof is covered with an electrode 213. Moreover, a gas sealing material 212 is disposed to surround the electrode 213 such that a gap 214 is formed between the gas sealing material 212 and the electrode 213. With this, the protective membrane 220 is sandwiched between the gas sealing material 212 and the solid polymer electrolyte membrane 210 and between the electrode 213 and the solid polymer electrolyte membrane 210, and the protective membrane 220 reinforces the solid polymer electrolyte membrane 210 at the gap 214. Therefore, the solid polymer electrolyte membrane 210 can be prevented from being damaged without increasing the thickness of the solid polymer electrolyte membrane 210.

Patent Document 1: Japanese Laid-Open Patent Application Publication Hei 5-21077

DISCLOSURE OF THE INVENTION

Problems to be Solved by the Invention

However, in the polymer electrolyte fuel cell disclosed in Patent Document 1, by fastening the cells, the mechanical stress is strongly applied to a portion of the solid polymer electrolyte membrane 210 which portion contacts a corner of the protective membrane 220 which corner is formed by a main surface thereof contacting the solid polymer electrolyte membrane 210 and an inner peripheral surface thereof, and this mechanical stress is higher than the mechanical stress applied to the other portion of the solid polymer electrolyte membrane 210. Therefore, the solid polymer electrolyte membrane 210 may be damaged at this portion. On this account, there is still room for improvement.

Moreover, in the polymer electrolyte fuel cell disclosed in Patent Document 1, there is still room for further improvement of the productivity (effective mass production).

The present invention was made to solve the above problems, and a first object of the present invention is to provide a membrane-membrane reinforcing member assembly, a membrane-catalyst layer assembly, a membrane-electrode assembly, and a polymer electrolyte fuel cell, each of which can prevent a polymer electrolyte membrane from being damaged by contact of an end portion of a gas diffusion layer, can more surely suppress the damage of the polymer electrolyte membrane by an end portion of a membrane reinforcing member, and is improved in durability.

A second object of the present invention is to provide a method for manufacturing a membrane-electrode assembly, the method being capable of effectively mass-produce a polymer electrolyte fuel cell.

Means for Solving the Problems

In order to solve the above problems, a membrane-membrane reinforcing member assembly of the present invention includes: a polymer electrolyte membrane; one or more membrane-like first membrane reinforcing members disposed on a main surface of the polymer electrolyte membrane so as to extend along a peripheral edge of the polymer electrolyte membrane as a whole; and one or more membrane-like second membrane reinforcing members disposed on the first membrane reinforcing members so as to extend along the peripheral edge of the polymer electrolyte membrane as a whole and disposed such that when viewed from a thickness direction of the polymer electrolyte membrane, an inner edge of the second membrane reinforcing member and an inner edge of the first membrane reinforcing member do not coincide with each other.

Here, in the present invention, the "inner edge" of each of the first membrane reinforcing member and the second membrane reinforcing member denotes a portion of the entire peripheral edge of each of the first and second membrane reinforcing members which portion has a normal line extending inwardly of the polymer electrolyte membrane.

With this, the pressure applied to the inner edge portion of the first membrane reinforcing member can be lowered, so that the damage of the polymer electrolyte membrane which contacts the inner edge portion can be surely suppressed.

Moreover, in the membrane-membrane reinforcing member assembly according to the present invention, the first membrane reinforcing member and the second membrane reinforcing member may be disposed on only one of main surfaces of the polymer electrolyte membrane.

Moreover, in the membrane-membrane reinforcing member assembly according to the present invention, the first membrane reinforcing member and the second membrane reinforcing member may be disposed on each of both main surfaces of the polymer electrolyte membrane.

Moreover, in the membrane-membrane reinforcing member assembly according to the present invention, each of the first membrane reinforcing member and the second membrane reinforcing member may be formed to have a doughnut shape.

Moreover, in the membrane-membrane reinforcing member assembly according to the present invention, the polymer electrolyte membrane may have a substantially quadrangular shape; the first membrane reinforcing members of a first pair may be disposed on one of main surfaces of the polymer electrolyte membrane so as to respectively extend along two opposed sides of four sides of the polymer electrolyte membrane, and the first membrane reinforcing members of a second pair may be disposed on the other main surface of the polymer electrolyte membrane so as to respectively extend along remaining two opposed sides of the four sides of the polymer electrolyte membrane; the second membrane reinforcing members of a first pair may be respectively disposed on the first membrane reinforcing members of the first pair so as to respectively extend along the first membrane reinforcing members of the first pair; and the second membrane reinforcing members of a second pair may be respectively disposed on the first membrane reinforcing members of the second pair so as to respectively extend along the first membrane reinforcing members of the second pair.

Moreover, in the membrane-membrane reinforcing member assembly according to the present invention, when viewed from the thickness direction of the polymer electrolyte membrane, each of the second membrane reinforcing members of the first pair may be placed between the first membrane reinforcing members of the second pair, and each of the second membrane reinforcing members of the second pair may be placed between the first membrane reinforcing members of the first pair.

Moreover, in the membrane-membrane reinforcing member assembly according to the present invention, the inner edge of the first membrane reinforcing member may be formed to be located inwardly of the polymer electrolyte membrane as compared to the inner edge of the second membrane reinforcing member.

Further, in the membrane-membrane reinforcing member assembly according to the present invention, the inner edge of the second membrane reinforcing member may be formed to be located inwardly of the polymer electrolyte membrane as compared to the inner edge of the first membrane reinforcing member.

Moreover, a membrane-catalyst layer assembly according to the present invention includes: the membrane-membrane reinforcing member assembly; a first catalyst layer disposed to cover at least a part of one of the main surfaces of the polymer electrolyte membrane; and a second catalyst layer disposed to cover at least a part of the other main surface of the polymer electrolyte membrane.

Moreover, a membrane-electrode assembly according to the present invention includes: the membrane-catalyst layer assembly; a first gas diffusion layer disposed to cover at least a part of a main surface of the first catalyst layer; and a second gas diffusion layer disposed to cover at least a part of a main surface of the second catalyst layer.

Moreover, in the membrane-electrode assembly according to the present invention, the first gas diffusion layer may be disposed to cover the first catalyst layer and a part of a main surface of the first membrane reinforcing member or the second membrane reinforcing member; and the second gas diffusion layer may be disposed to cover the second catalyst layer and a part of a main surface of the first membrane reinforcing member or the second membrane reinforcing member.

Further, in the membrane-electrode assembly according to the present invention, when viewed from the thickness direction of the polymer electrolyte membrane, the first gas diffusion layer and the second gas diffusion layer may be disposed such that entire peripheral edges thereof substantially coincide with each other.

Moreover, a polymer electrolyte fuel cell according to the present invention includes the membrane-electrode assembly.

With this, the operation safety and reliability of the polymer electrolyte fuel cell can be improved.

Moreover, a method for manufacturing a membrane-electrode assembly according to the present invention includes the steps of: (A) disposing a membrane-like doughnut-shaped first membrane reinforcing member on a main surface of a polymer electrolyte membrane; (B) disposing a catalyst layer on a portion of the main surface of the polymer electrolyte membrane at which portion an opening of the doughnut-shaped first membrane reinforcing member is located; (C) bonding a membrane-like doughnut-shaped second membrane reinforcing member and a gas diffusion layer such that the gas diffusion layer is fittingly inserted in an opening of the doughnut-shaped second membrane reinforcing member, to form a membrane reinforcing member-gas diffusion layer assembly; and (D) disposing the membrane reinforcing member-gas diffusion layer assembly formed in the step (C) on the polymer electrolyte membrane subjected to the step (B) such that the catalyst layer and the gas diffusion layer contact each other, and when viewed from a thickness direction of the polymer electrolyte membrane, an inner edge of the first membrane reinforcing member and an inner edge of the second membrane reinforcing member do not coincide with each other.

In a case where the hand of the robot sandwiches the polymer electrolyte membrane when mass-producing the polymer electrolyte fuel cell, the handleability of the polymer electrolyte membrane is low due to the flexibility of the polymer electrolyte fuel cell, so that the improvement of the work efficiency may not be achieved. However, as in the method for manufacturing the membrane-electrode assembly according to the present invention, by bonding the polymer electrolyte membrane and the first membrane reinforcing member, the first membrane reinforcing member can cover the strength of the polymer electrolyte membrane. With this, the handleability and the work efficiency can be improved.

Moreover, for example, the gas diffusion layer formed by kneading, extending by pressure, and solidifying the mixture containing the binder resin and the electrically-conductive particles has high flexibility. Therefore, in a case where the hand of the robot sandwiches the polymer electrolyte membrane, the handleability of the polymer electrolyte membrane may be low. However, in the membrane-electrode assembly according to the present invention, by bonding the gas diffusion layer and the second membrane reinforcing member, the second membrane reinforcing member covers the strength of the gas diffusion layer. With this, the handleability can be improved, and a simple and efficient manufacturing process can be realized.

Moreover, in the method for manufacturing the membrane-electrode assembly according to the present invention, the first membrane reinforcing member, the catalyst layer, the second membrane reinforcing member, and the gas diffusion layer may be disposed on each of both main surfaces of the polymer electrolyte membrane.

Moreover, in the method for manufacturing the membrane-electrode assembly according to the present invention, in the step (C), the gas diffusion layer may be formed to fill the opening of the second membrane reinforcing member, and the second membrane reinforcing member and the gas diffusion layer may be bonded to each other.

Moreover, in the method for manufacturing the membrane-electrode assembly according to the present invention, in the step (C), the gas diffusion layer may be formed to have a plate shape, the second membrane reinforcing member may be formed in a doughnut shape to surround a peripheral surface of the gas diffusion layer, and the gas diffusion layer and the second membrane reinforcing member are bonded to each other.

Moreover, a method for manufacturing a membrane-electrode assembly according to the present invention includes the steps of: (E) disposing a membrane-like doughnut-shaped first membrane reinforcing member on a main surface of a polymer electrolyte membrane; (F) bonding a membrane-like doughnut-shaped second membrane reinforcing member and a gas diffusion layer such that the gas diffusion layer is fittingly inserted in an opening of the doughnut-shaped second membrane reinforcing member, to form a membrane reinforcing member-gas diffusion layer assembly; (G) disposing a catalyst layer on one of main surfaces of the gas diffusion layer of the membrane reinforcing member-gas diffusion layer assembly; and (H) disposing the membrane reinforcing member-gas diffusion layer assembly formed in the step (G) on the polymer electrolyte membrane subjected to the step (E) such that the catalyst layer contacts the polymer electrolyte membrane, and when viewed from a thickness direction of the polymer electrolyte membrane, an inner edge of the first membrane reinforcing member and an inner edge of the second membrane reinforcing member do not coincide with each other.

Moreover, in the method for manufacturing the membrane-electrode assembly according to the present invention, in the step (F), the gas diffusion layer may be formed to fill the opening of the second membrane reinforcing member, and the second membrane reinforcing member and the gas diffusion layer may be bonded to each other.

Further, in the method for manufacturing the membrane-electrode assembly according to the present invention, in the step (F), the gas diffusion layer may be formed to have a plate shape, the second membrane reinforcing member may be formed to surround a peripheral surface of the gas diffusion layer, and the gas diffusion layer and the second membrane reinforcing member may be bonded to each other.

The above object, other objects, features and advantages of the present invention will be made clear by the following detailed explanation of preferred embodiments with reference to the attached drawings.

Effects of the Invention

In accordance with the membrane-membrane reinforcing member assembly, the membrane-catalyst layer assembly, the membrane-electrode assembly, and the polymer electrolyte fuel cell according to the present invention, the present invention can provide a membrane-membrane reinforcing member assembly, a membrane-catalyst layer assembly, a membrane-electrode assembly, and a polymer electrolyte fuel cell, each of which is capable of securing adequate durability and improving safety and reliability. Moreover, in accordance with the method for manufacturing the membrane-electrode assembly of the present invention, the polymer electrolyte fuel cell can be effectively mass-produced.

Figure 1:
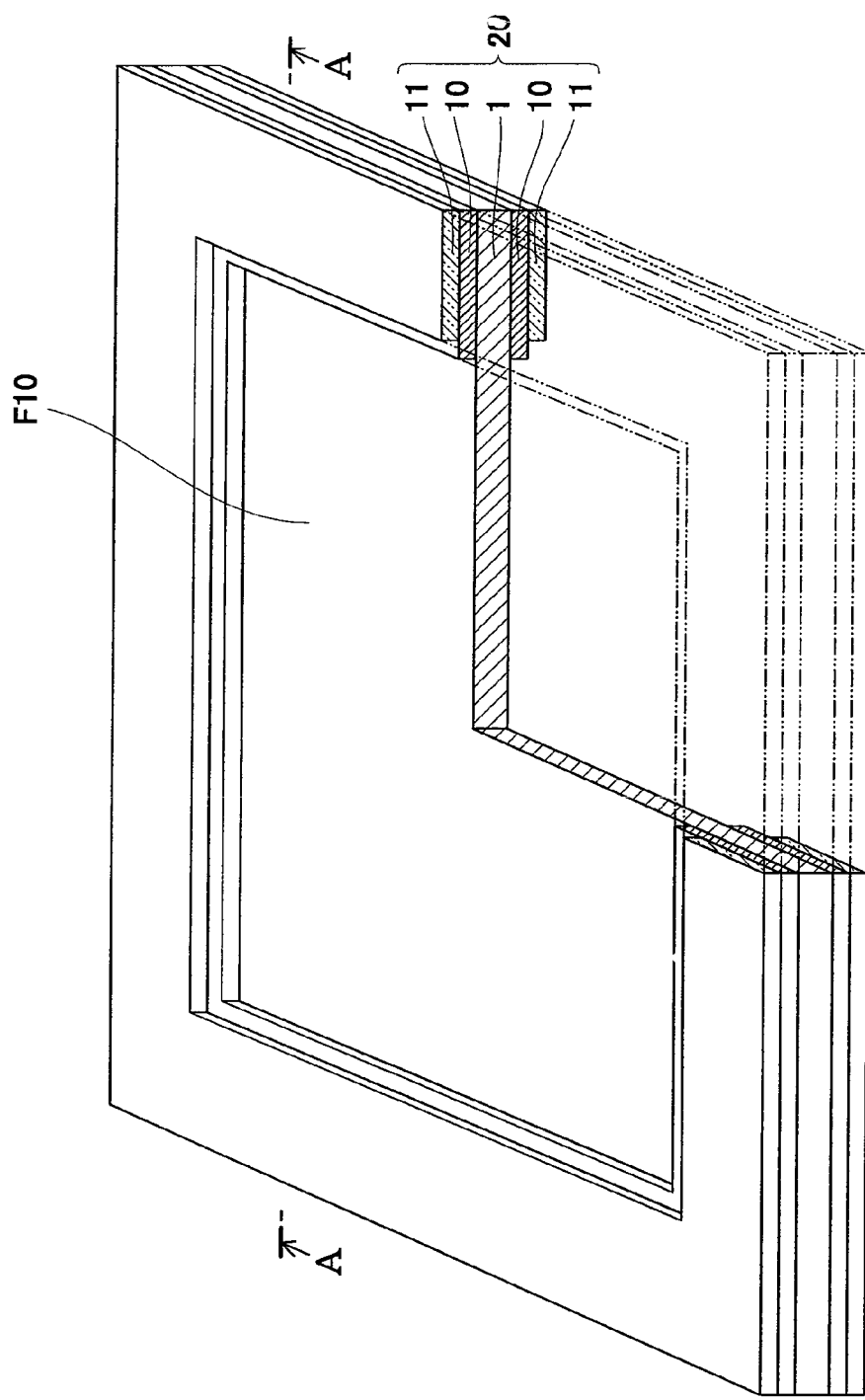
FIG. 1 is a perspective view schematically showing a schematic configuration of a membrane-membrane reinforcing member assembly according to Embodiment 1 of the present invention when viewed obliquely from above.

EXPLANATION OF REFERENCE NUMBERS 1 polymer electrolyte membrane
2a anode catalyst layer (first catalyst layer)
2b cathode catalyst layer (second catalyst layer)
3a anode gas diffusion layer (first gas diffusion layer)
3b cathode gas diffusion layer (second gas diffusion layer)
4a anode
4b cathode
5 MEA (Membrane-Electrode-Assembly)
6a anode separator
6b cathode separator
7 fuel gas channel
8 oxidizing gas channel
9 heat medium channel
10 first membrane reinforcing member
10a first membrane reinforcing member
11 second membrane reinforcing member
12 opening
13 opening
14 corner portion
15 inner peripheral portion
16 portion
17 gasket
18 region
19 broken line
20 membrane-membrane reinforcing member assembly
21 second mask member
22 first mask member
25 membrane reinforcing member-gas diffusion layer assembly
26 membrane-catalyst layer assembly
30 membrane-catalyst layer assembly
40 cell
47 mask
48 opening
50 polymer electrolyte membrane roll
51 polymer electrolyte membrane sheet
52 membrane-membrane reinforcing member sheet assembly
53 membrane-membrane reinforcing member sheet assembly 54 membrane-membrane reinforcing member sheet assembly
55 membrane-membrane reinforcing member sheet assembly
56 membrane-catalyst layer sheet
57 membrane-catalyst layer assembly sheet
58 cutting device
61 membrane-membrane reinforcing member assembly sheet
62 membrane-membrane reinforcing member assembly sheet
81 roller
82 roller
83 roller
84 roller
85 roller
86 roller
111 base material tape
112 base material-membrane reinforcing member stack body
113 base material-membrane reinforcing member roll
114 base material roll
115 base material-membrane reinforcing member roll
116 membrane reinforcing member tape
117 base material tape
118 base material-membrane reinforcing member stack body
121 first membrane reinforcing member roll
122 first membrane reinforcing member tape
123 second membrane reinforcing member roll
124 second membrane reinforcing member tape
125 base material-membrane reinforcing member roll
126 first membrane reinforcing member tape
127 base material tape
128 base material-membrane reinforcing member tape stack body
129 base material-membrane reinforcing member roll
130 second membrane reinforcing member tape
131 base material tape
132 base material-membrane reinforcing member tape stack body
171 polymer electrolyte membrane
172 catalyst layer
173 diffusion layer
174 electrode
175 membrane-electrode assembly
176 gasket
177 separator
180 cell
210 solid polymer electrolyte membrane
212 gasket material
213 electrode
214 gap
220 protective membrane
D1 proceeding direction
D2 proceeding direction
D3 proceeding direction
D4 proceeding direction
D5 proceeding direction
F10 main surface
F20 main surface
F30 outer surface
F40 inner surface
F50 outer surface
P1 first step
P2 second step
P3 third step
P4 fourth step
P5 fifth step
P6 sixth step
P7 seventh step
P8 eighth step
P9 ninth step
P10 tenth step

BEST MODE FOR CARRYING OUT THE INVENTION

Hereinafter, preferred embodiments of the present invention will be explained in reference to the drawings. In the drawings, the same reference numbers are used for the same or corresponding portions, and a repetition of the same explanation is avoided. Moreover, in the embodiments, regarding a pair of main surfaces of each of a catalyst layer, a gas diffusion layer, a membrane reinforcing member, a separator, and a gasket, which constitute a cell and are provide on each of both sides of a polymer electrolyte membrane, one main surface close to the polymer electrolyte membrane may be referred to as an inner surface, and the other main surface far from the polymer electrolyte membrane may be referred to as an outer surface.

Embodiment 1

Membrane-Membrane Reinforcing Member Assembly

Figure 2:
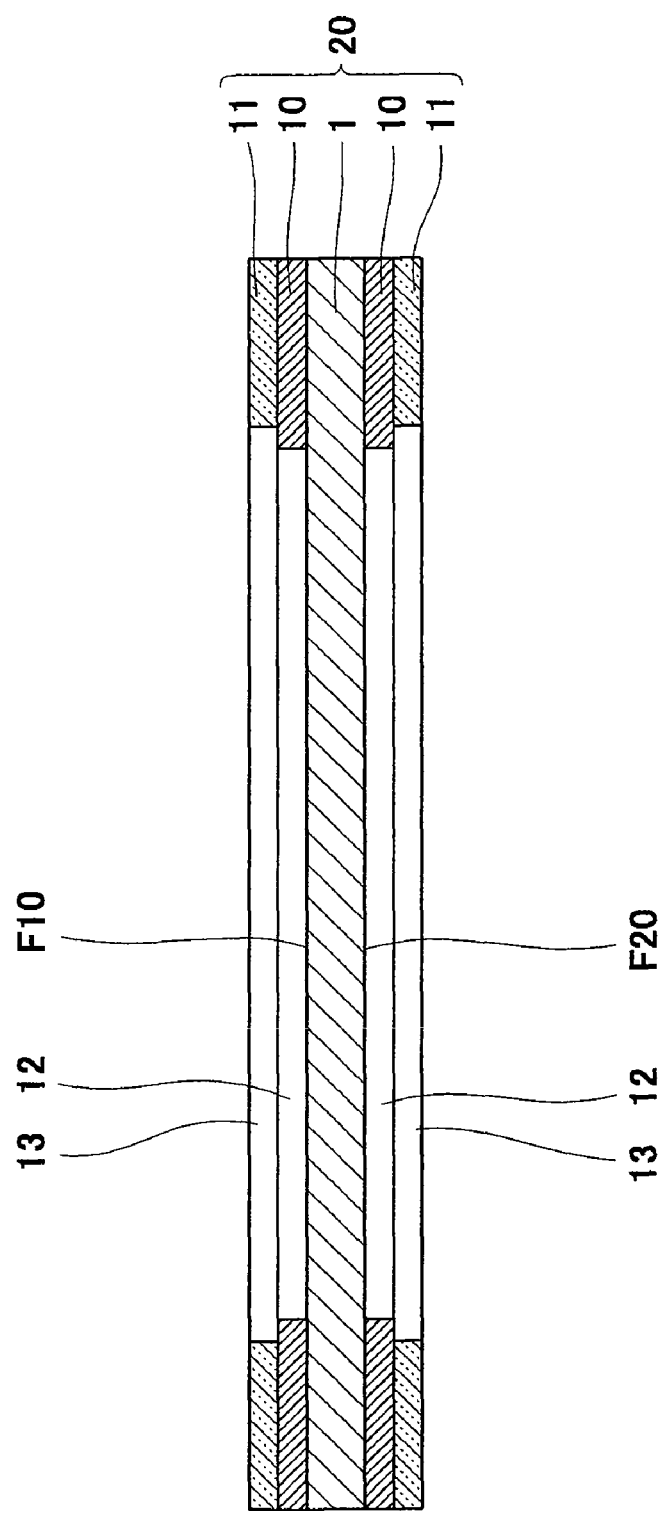
FIG. 2 is a cross-sectional view taken along line A-A of FIG. 1.

FIG. 1 is a perspective view schematically showing a schematic configuration of a membrane-membrane reinforcing member assembly according to Embodiment 1 of the present invention when viewed obliquely from above. FIG. 2 is a cross-sectional view taken along line A-A of FIG. 1. In FIG. 1, a part of the membrane-membrane reinforcing member assembly is cut out to show an internal structure thereof, and below-described manifold holes, such as a fuel gas supplying manifold hole, are omitted.

As shown in FIGS. 1 and 2, a membrane-membrane reinforcing member assembly 20 according to Embodiment 1 includes a polymer electrolyte membrane 1, first membrane reinforcing members 10, and second membrane reinforcing members 11. The polymer electrolyte membrane 1 is formed to have a substantially quadrangular shape (herein, rectangular shape). The first membrane reinforcing member 10 is disposed on a main surface F10 of the polymer electrolyte membrane 1, and the second membrane reinforcing member 11 is disposed on a main surface of the first membrane reinforcing member 10. Moreover, the first membrane reinforcing member 10 is disposed on a main surface F20 of the polymer electrolyte membrane 1, and the second membrane reinforcing member 11 is disposed on a main surface of the first membrane reinforcing member 10. As above, the membrane reinforcing members disposed on the main surfaces F10 and F20 of the polymer electrolyte membrane 1 are disposed to form a two-layer structure.

The first membrane reinforcing member 10 is formed in a rectangular shape similar to the polymer electrolyte membrane 1, and is formed such that an outer peripheral surface thereof is flush with an outer peripheral surface of the polymer electrolyte membrane 1. Moreover, an opening 12 is formed on the main surface of the first membrane reinforcing member 10. The opening 12 is formed to be slightly larger than a main surface of a below-described anode catalyst layer 2a. Similarly, the second membrane reinforcing member 11 is formed in a rectangular shape similar to the polymer electrolyte membrane 1, and is formed such that an outer peripheral surface thereof is flush with the outer peripheral surface of the polymer electrolyte membrane 1. Moreover, an opening 13 is formed on the main surface of the second membrane reinforcing member 11. The opening 13 is formed to be larger in area than the opening 12 of the first membrane reinforcing member 10. To be specific, the opening 13 of the second membrane reinforcing member 11 is formed such that when viewed from a thickness direction of the polymer electrolyte membrane 1, an inner peripheral surface defining the opening 13 is located between the outer peripheral surface of the first membrane reinforcing member 10 and an inner peripheral surface of the first membrane reinforcing member 10 (the inner peripheral surface of the first membrane reinforcing member 10 is located inwardly of the polymer electrolyte membrane 1 as compared to an inner peripheral surface of the second membrane reinforcing member).

The thickness of each of the first and second membrane reinforcing members 10 and 11 is not especially limited as long as it is within such a range that the operational advantages of the present invention can be obtained. However, it is preferable that to obtain flexibility, each of the first and second membrane reinforcing members 10 and 11 be thin. Moreover, it is preferable that to facilitate the manufacturing, the first membrane reinforcing member 10 and the second membrane reinforcing member 10 be the same in thickness as each other.

Next, respective components of the membrane-membrane reinforcing member assembly 20 will be explained.

The polymer electrolyte membrane 1 has proton conductivity. It is preferable that the polymer electrolyte membrane 1 contain a sulfonic acid group, a carboxylic acid group, a phosphonic acid group, or a sulfonimide group as a positive ion exchange group. In light of the proton conductivity, it is especially preferable that the polymer electrolyte membrane 1 contain the sulfonic acid group.

As resin which constitutes the polymer electrolyte membrane 1 and contains the sulfonic acid group, dry resin having the ion exchange capacity of 0.5 to 1.5 meq/g is preferable. It is preferable that the ion exchange capacity of the dry resin constituting the polymer electrolyte membrane 1 be 0.5 meq/g or more, since the increase in the resistance value of the polymer electrolyte membrane 1 at the time of power generation can be adequately decreased. Moreover, it is preferable that the ion exchange capacity of the dry resin be 1.5 meq/g or less, since the water content of the polymer electrolyte membrane 1 does not increase, the polymer electrolyte membrane 1 is unlikely to swell, and fine holes of the below-described catalyst layer 2 do not clog. From the same view point as above, it is more preferable that the ion exchange capacity of the dry resin be 0.8 to 1.2 meq/g.

It is preferable that the polymer electrolyte be a copolymer containing a polymerization unit based on a perfluorovinyl compound expressed by $CF_2=CF-(OCF_2CFX)_m-O_p-(CF_2)_n-SO_3H$ (m is an integer from 0 to 3, n is an integer from 1 to 12, p is 0 or 1, and X is a fluorine atom or a trifluoromethyl group), and a polymerization unit based on tetrafluoroethylene.

Preferable examples of the above fluorovinyl compound are compounds expressed by Formulas (3) to (5) below. In the following formulas, q is an integer from 1 to 8, r is an integer from 1 to 8, and t is an integer from 1 to 3.

$$CF_2=CFO(CF_2)_q-SO_3H \quad (3)$$

$$CF_2=CFOCF_2CF(CF_3)O(CF_2)_r-SO_3H \quad (4)$$

$$CF_2=CF(OCF_2CF(CF_3))_tO(CF_2)_2-SO_3H \quad (5)$$

Moreover, it is preferable that the polymer electrolyte be aromatic polymer having a positive ion exchange group as a side chain and an aromatic compound as a main chain. It is preferable that the aromatic polymer be, for example, a polymer obtained by introducing a sulfonic acid group to aromatic polyether, and it is especially preferable that to obtain the heat resistance and intensity, the aromatic polymer be a sulfonated polyether ketone polymer or a sulfonated polyether sulfone polymer.

Moreover, it is preferable that to reinforce (protect) the polymer electrolyte membrane 1 without damaging the polymer electrolyte membrane 1 itself, a material constituting the first and second membrane reinforcing members 10 and 11 be a synthetic resin having bendability and flexibility.

Moreover, it is preferable that in light of the durability, the above synthetic resin be synthetic resin made of at least one resin selected from the group consisting of polyethylene naphthalate, polytetrafluoroethylene, polyethylene terephthalate, fluoroethylene-propylene copolymer, tetrafluoroethylene-perfluoro alkoxy ethylene copolymer, polyethylene, polypropylene, polyether amide, polyether imide, polyether ether ketone, polyether sulfone, polyphenylene sulfide, polyarylate, polysulfide, polyimide, and polyimide amide.

Further, the first and second membrane reinforcing members 10 and 11 may be formed by using the same material or different materials.

Membrane-Catalyst Layer Assembly

Next, a membrane-catalyst layer assembly according to Embodiment 1 of the present invention will be explained.

Figure 3:
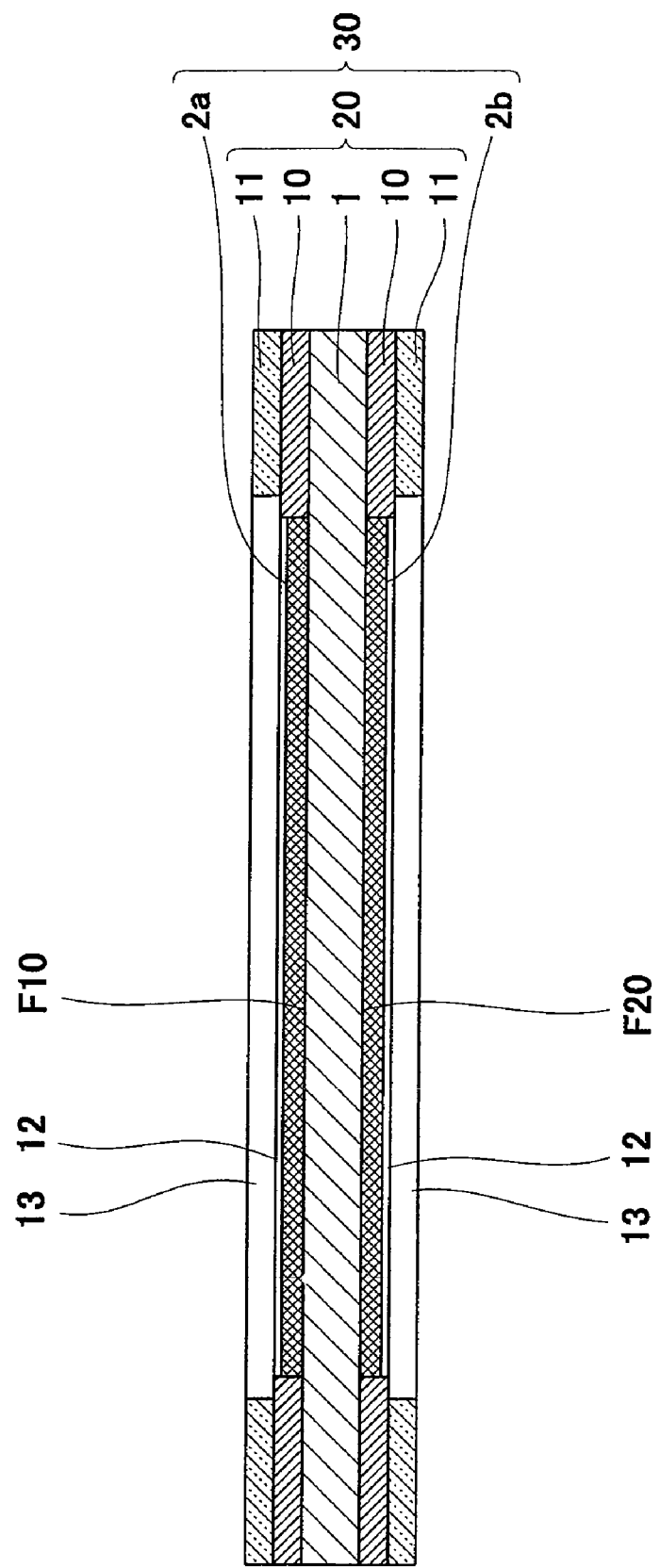
FIG. 3 is a cross-sectional view schematically showing a schematic configuration of a membrane-catalyst layer assembly in which catalyst layers are disposed on the membrane-membrane reinforcing member assembly shown in FIG. 1.

FIG. 3 is a cross-sectional view schematically showing a schematic configuration of a membrane-catalyst layer assembly in which catalyst layers are disposed on the membrane-membrane reinforcing member assembly 20 shown in FIG. 1. In FIG. 3, the manifold holes, such as the fuel gas supplying manifold hole, are omitted, and the membrane-catalyst layer assembly incorporated in the cell stack is shown.

As shown in FIG. 3, a membrane-catalyst layer assembly 30 includes the membrane-membrane reinforcing member assembly 20, the anode catalyst layer (first catalyst layer) 2a, and a cathode catalyst layer (second catalyst layer) 2b. The anode catalyst layer 2a is formed so as to fill the opening 12 of the first membrane reinforcing member 10 and cover the main surface F10 of the polymer electrolyte membrane 1. Similarly, the cathode catalyst layer 2b is formed so as to cover the main surface F20 of the polymer electrolyte membrane 1.

Each of the anode catalyst layer 2a and the cathode catalyst layer 2b is formed in a rectangular shape similar to the polymer electrolyte membrane 1. The anode catalyst layer 2a and the cathode catalyst layer 2b are disposed to overlap each other when viewed from the thickness direction of the polymer electrolyte membrane 1. Moreover, each of the anode catalyst layer 2a and the cathode catalyst layer 2b is slightly thinner than the first membrane reinforcing member 10. Herein, the anode catalyst layer 2a is the first catalyst layer, and the cathode catalyst layer 2b is the second catalyst layer. However, the present embodiment is not limited to this, and the anode catalyst layer 2a may be the second catalyst layer, and the cathode catalyst layer 2b may be the first catalyst layer.

Next, respective components of the membrane-catalyst layer assembly 30 will be explained.

The configuration of each of the anode catalyst layer 2a and the cathode catalyst layer 2b is not especially limited as long as the effects of the present invention can be obtained. The catalyst layer 2 may have the same configuration as a catalyst layer of a gas diffusion electrode of a known fuel cell. For example, the catalyst layer 2 may be configured to contain electrically-conductive carbon particles (powder) supporting electrode catalyst and a polymer electrolyte having positive ion (hydrogen ion) conductivity, or may be configured to further contain a water-repellent material, such as polytetrafluoroethylene. The anode catalyst layer 2a and the cathode catalyst layer 2b may be the same in configuration as each other or may be different in configuration from each other.

Each of the anode catalyst layer 2a and the cathode catalyst layer 2b may be formed by using a method for manufacturing the catalyst layer of the gas diffusion electrode of the known fuel cell. For example, each of the anode catalyst layer 2a and the cathode catalyst layer 2b may be formed by preparing and using a liquid (catalyst layer forming ink) containing at least a constituent material (for example, the electrically-conductive carbon particle supporting the electrode catalyst, and the polymer electrolyte) of the anode catalyst layer 2a or the cathode catalyst layer 2b and a dispersion medium.

The polymer electrolyte may be the same as or different from the material of the above-described polymer electrolyte membrane 1. As the electrode catalyst, a metallic particle can be used. The metallic particle is not especially limited, and various metals can be used. However, in light of an electrode reaction activity, it is preferable that the metallic particle be at least one metal selected from the group consisting of platinum, gold, silver, ruthenium, rhodium, palladium, osmium, iridium, chromium, iron, titanium, manganese, cobalt, nickel, molybdenum, tungsten, aluminum, silicon, zinc, and tin. Among these, platinum or an alloy of platinum and at least one metal selected from the above group are preferable, and an alloy of platinum and ruthenium is especially preferable since the activity of the catalyst becomes stable in the anode catalyst layer 2a.

Moreover, it is preferable that the average diameter of the metallic particles of the electrode catalyst be 1 to 5 nm. The electrode catalyst having the average diameter of 1 nm or more is preferable since it is industrially easy to prepare such electrode catalyst. Moreover, the electrode catalyst having the average diameter of 5 nm or less is preferable since it becomes easy to more adequately secure the activity per unit mass of the electrode catalyst and this leads to the cost reduction of the fuel cell.

It is preferable that the specific surface area of the electrically-conductive carbon particle be 50 to 1500 $m^2/g$. The specific surface area of 50 $m^2/g$ or more is preferable since the supporting rate of the electrode catalyst can be easily increased, and the output characteristics of the obtained catalyst layer 2 can be more adequately secured. Moreover, the specific surface area of 1500 $m^2/g$ or less is preferable since adequate-size fine holes can be more easily secured, the covering by the polymer electrolyte can be more easily carried out, and the output characteristics of each of the anode catalyst layer 2a and the cathode catalyst layer 2b can be more adequately secured. From the same viewpoint as above, it is more preferable that the specific surface area be 200 to 900 $m^2/g$.

Moreover, it is preferable that the average diameter of the electrically-conductive carbon particle be 0.1 to 1.0 μm. The average diameter of 0.1 μm or more is preferable since it becomes easy to more adequately secure the gas diffusivity in each of the anode catalyst layer 2a and the cathode catalyst layer 2b, and flooding can be more surely prevented. Moreover, the average diameter of 1.0 μm or less is preferable since it becomes easy to more easily make the covering state of the electrode catalyst by the polymer electrolyte satisfactory, and it becomes easy to more adequately secure the covering area of the electrode catalyst by the polymer electrolyte, thereby being able to more easily secure adequate electrode performance.

Membrane-Electrode Assembly

Next, a membrane-electrode assembly (MEA) according to Embodiment 1 of the present invention will be explained.

Figure 4:
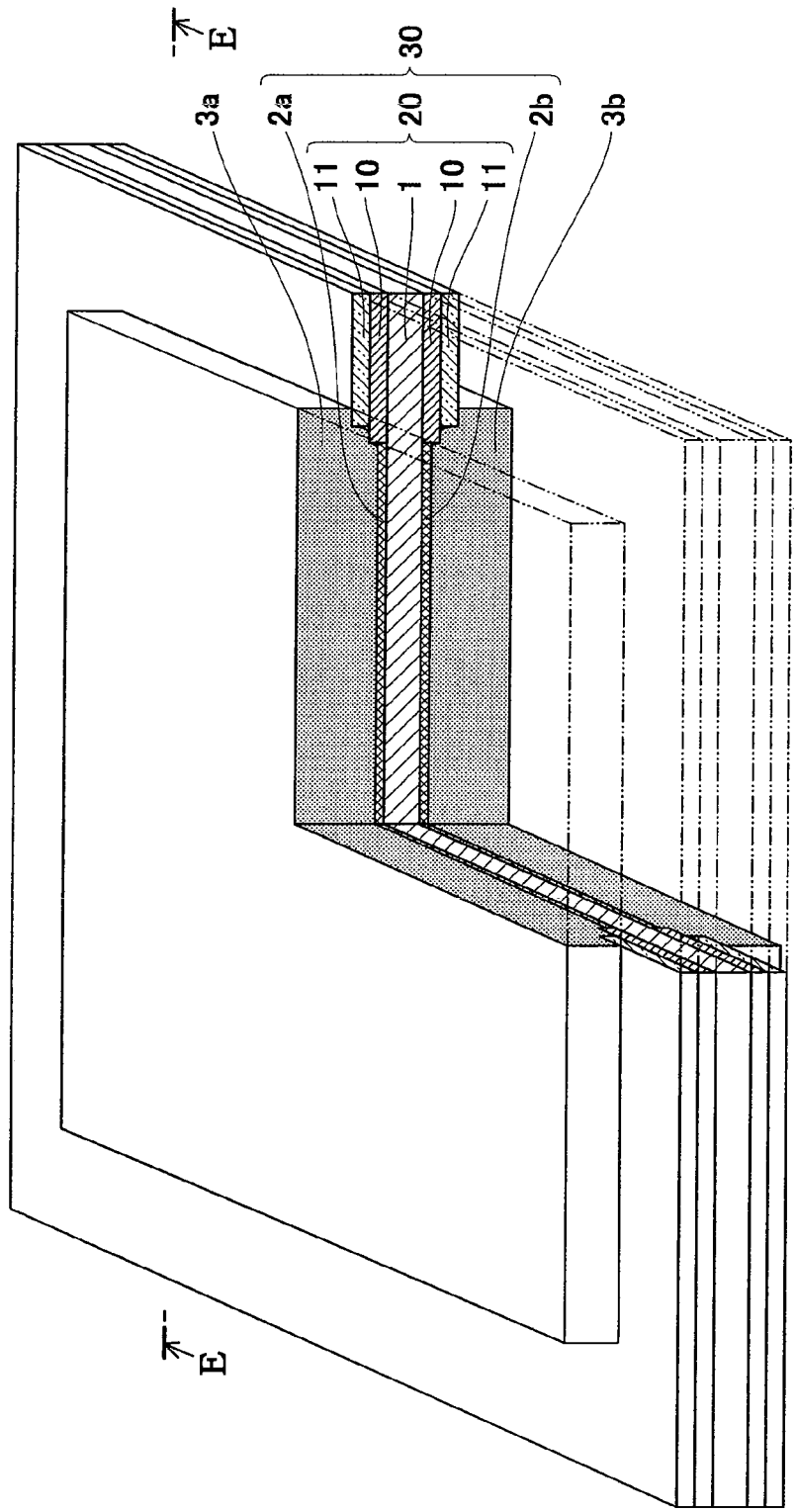
FIG. 4 is a perspective view schematically showing a membrane-electrode assembly in which gas diffusion layers are disposed on the membrane-catalyst layer assembly shown in FIG. 3, when viewed obliquely from above.
Figure 5:
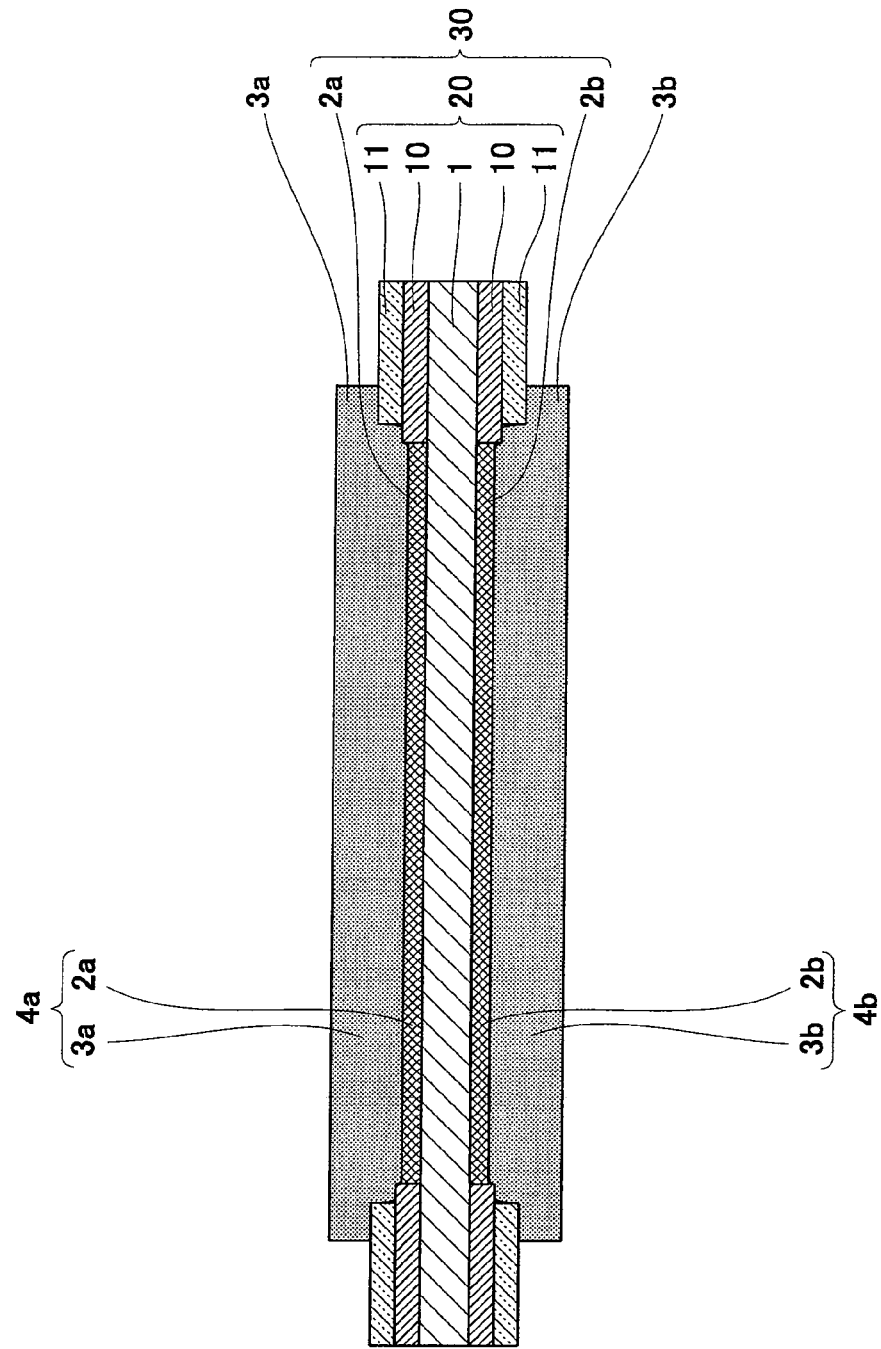
FIG. 5 is a cross-sectional view taken along line E-E of FIG. 4.

FIG. 4 is a perspective view schematically showing a membrane-electrode assembly in which gas diffusion layers are disposed on the membrane-catalyst layer assembly 30 shown in FIG. 3, when viewed obliquely from above. FIG. 5 is a cross-sectional view taken along line E-E of FIG. 4. In FIGS. 4 and 5, the manifold holes, such as the fuel gas supplying manifold hole, are omitted.

As shown in FIGS. 4 and 5, a membrane-electrode assembly (hereinafter referred to as "MEA") 5 includes the membrane-catalyst layer assembly 30, an anode gas diffusion layer (first gas diffusion layer) 3a, and a cathode gas diffusion layer (second gas diffusion layer) 3b. Each of the anode gas diffusion layer 3a and the cathode gas diffusion layer 3b is formed in a substantially rectangular shape similar to the polymer electrolyte membrane 1. The anode gas diffusion layer 3a and the cathode gas diffusion layer 3b are disposed to overlap each other when viewed from the thickness direction of the polymer electrolyte membrane 1. Moreover, the anode gas diffusion layer 3a and the cathode gas diffusion layer 3b are substantially the same in thickness as each other.

The anode gas diffusion layer 3a is formed to cover the anode catalyst layer 2a, the first membrane reinforcing member 10, and the second membrane reinforcing member 11. Moreover, the cathode gas catalyst layer 3b is formed to cover the cathode catalyst layer 2b, the first membrane reinforcing member 10, and the second membrane reinforcing member 11. Specifically, an inner surface of a peripheral portion of the anode gas diffusion layer 3a is formed to have a step-like shape. The inner surface of a portion other than the peripheral portion of the anode gas diffusion layer 3a contacts the main surface (outer surface) of the anode catalyst layer 2a. The step-like inner surface of the peripheral portion of the anode gas diffusion layer 3a contacts the inner peripheral surface of the first membrane reinforcing member 10, a portion of the main surface (outer surface) of the first membrane reinforcing member 10 which portion is exposed to the opening 13 of the second membrane reinforcing member 11, the inner peripheral surface of the second membrane reinforcing member 11, and the main surface (outer surface) of the second membrane reinforcing member 11. Similarly, an inner surface of a peripheral portion of the cathode gas diffusion layer 3b is formed to have a step-like shape. The inner surface of a portion other than the peripheral portion of the cathode gas diffusion layer 3b contacts the main surface (outer surface) of the cathode catalyst layer 2b. The step-like inner surface of the peripheral portion of the cathode gas diffusion layer 3b contacts the inner peripheral surface of the first membrane reinforcing member 10, the portion of the main surface (outer surface) of the first membrane reinforcing member 10 which portion is exposed to the opening 13 of the second membrane reinforcing member 11, the inner peripheral surface of the second membrane reinforcing member 11, and the main surface (outer surface) of the second membrane reinforcing member 11. With this, the pressure applied to the components by fastening the cells can be distributed.

Herein, the anode gas diffusion layer 3a is the first gas diffusion layer, and the cathode gas diffusion layer 3b is the second gas diffusion layer. However, the present embodiment is not limited to this, and the anode gas diffusion layer 3a may be the second gas diffusion layer, and the cathode gas diffusion layer 3b may be the first gas diffusion layer. Moreover, the anode catalyst layer 2a and the anode gas diffusion layer 3a constitute an anode 4a, and the cathode catalyst layer 2b and the cathode gas diffusion layer 3b constitute a cathode 4b.

With this, four sides of the main surface of each of the anode gas diffusion layer 3a and the cathode gas diffusion layer 3b contact the main surface (outer surface) of the second membrane reinforcing member 11 and does not directly contact one main surface of the polymer electrolyte membrane 1. Therefore, the polymer electrolyte membrane 1 is not damaged at this portion.

Next, respective components of the MEA 5 will be explained.

The configuration of each of the anode gas diffusion layer 3a and the cathode gas diffusion layer 3b is not especially limited as long as the effects of the present invention can be obtained. Each of the anode gas diffusion layer 3a and the cathode gas diffusion layer 3b may have the same configuration as a gas diffusion layer of the gas diffusion electrode of the known fuel cell. Moreover, the anode gas diffusion layer 3a and the cathode gas diffusion layer 3b may be the same in configuration as each other or different in configuration from each other.

For example, in order that each of the anode gas diffusion layer 3a and the cathode gas diffusion layer 3b has gas permeability, an electrically-conductive base material having a porous structure, which is manufactured using high surface area carbon fine powder, pore-forming material, carbon paper, carbon cloth, or the like, may be used as each of the anode gas diffusion layer 3a and the cathode gas diffusion layer 3b. Moreover, in order to obtain adequate drainage property, for example, water-repellent polymer, typically fluorocarbon resin, may be dispersed in each of the anode gas diffusion layer 3a and the cathode gas diffusion layer 3b. Further, in order to obtain adequate electron conductivity, each of the anode gas diffusion layer 3a and the cathode gas diffusion layer 3b may be formed by an electron conductive material, such as carbon fiber, metal fiber, or carbon fine powder.

Moreover, a water-repellent carbon layer formed by water-repellent polymer and carbon powder may be disposed between the anode gas diffusion layer 3a and the anode catalyst layer 2a, and between the cathode gas diffusion layer 3b and the cathode catalyst layer 2b. With this, water control in the MEA 5 (retention of water necessary for maintaining satisfactory properties of the MEA 5, and quick discharge of unnecessary water) can be carried out more easily and more surely.

Fuel Cell

Next, a cell (unit cell) of a polymer electrolyte fuel cell (hereinafter referred to as "PEFC") according to Embodiment 1 of the present invention will be explained.

Figure 6:
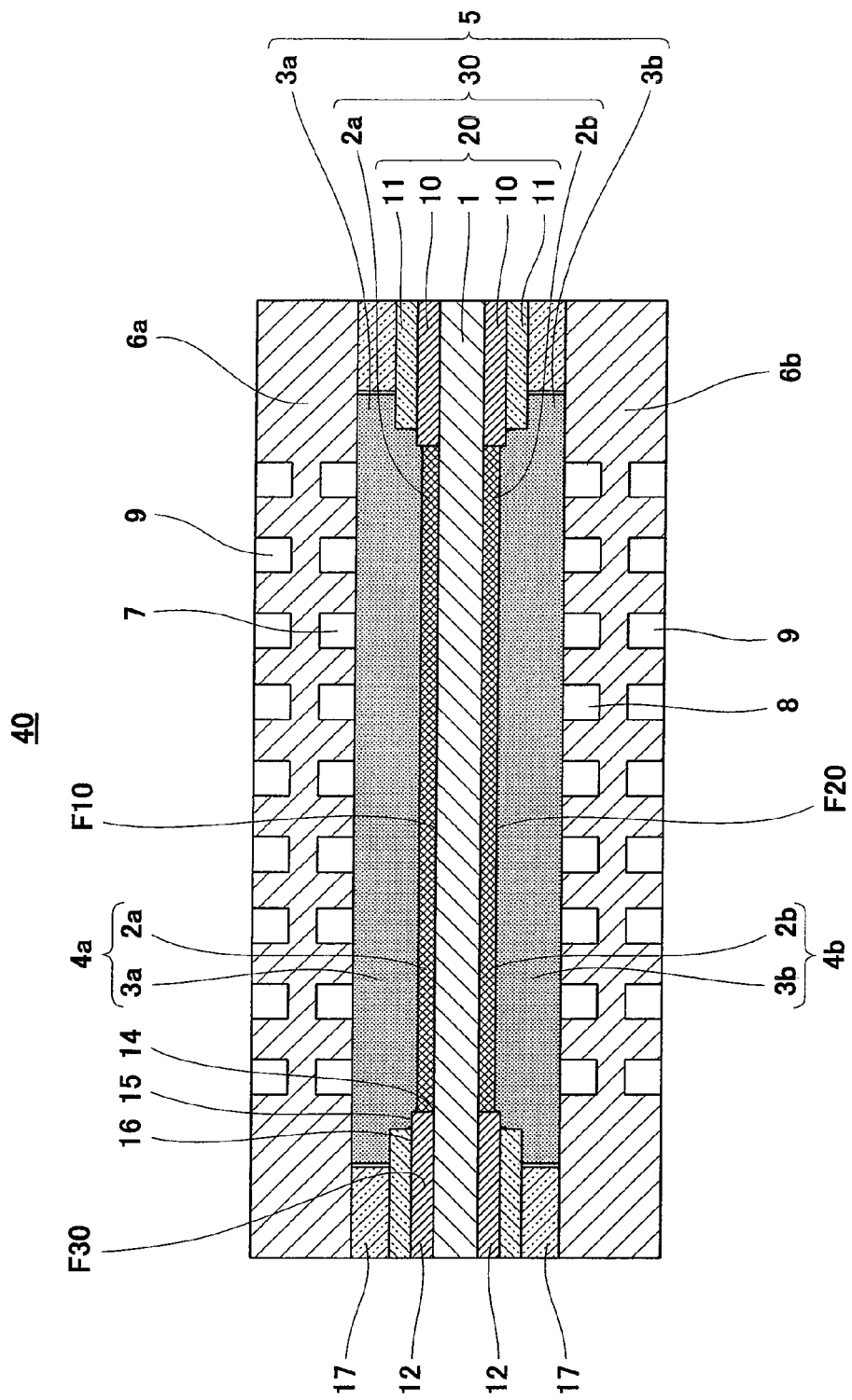
FIG. 6 is a cross-sectional view schematically showing a schematic configuration of a cell including the MEA shown in FIG. 5.

FIG. 6 is a cross-sectional view schematically showing a schematic configuration of the cell including the MEA 5 shown in FIG. 5.

As shown in FIG. 6, a cell 40 includes the MEA 5, the gaskets 17, an anode separator 6a, and a cathode separator 6b. A pair of gaskets 17 each made of fluorocarbon rubber and having a doughnut shape are respectively disposed around the anode 4a and the cathode 4b (to be precise, the anode gas diffusion layer 3a and the cathode gas diffusion layer 3b) of the MEA 5 and sandwich the polymer electrolyte membrane 1. This prevents the fuel gas and the oxidizing gas from leaking to an outside of the cell, and prevents these gases from being mixed with each other in the cell 40. Manifold holes (not shown), such as a fuel gas supplying manifold hole, formed by through holes extending in the thickness direction are formed on a peripheral portion of each of the polymer electrolyte membrane 1, the first and second membrane reinforcing members 10 and 11, and the gaskets 17.

Moreover, the anode separator 6a and the cathode separator 6b both of which are electrically conductive are disposed to sandwich the MEA 5 and the gaskets 17. Used as each of these separators 6a and 6b is a resin-impregnated graphite plate obtained by impregnating a graphite plate with phenol resin and hardening the graphite plate. Moreover, a separator made of a metallic material, such as SUS, may be used as each of the separators 6a and 6b. By the anode separator 6a and the cathode separator 6b, the MEA 5 is mechanically fixed, and adjacent MEAs 5 are electrically connected to each other in series.

A groove-like fuel gas channel 7 through which the fuel gas flows is formed in a serpentine shape on an inner surface (surface contacting the MEA 5) of the anode separator 6a. Meanwhile, a groove-like heat medium channel 9 through which the heat medium flows is formed in a serpentine shape on an outer surface of the anode separator 6a. Moreover, the manifold holes (not shown), such as the fuel gas supplying manifold hole, formed by the through holes extending in the thickness direction are formed on the peripheral portion of the anode separator 6a.

Meanwhile, a groove-like oxidizing gas channel 8 through which the oxidizing gas flows is formed in a serpentine shape on an inner surface of the cathode separator 6b, and the groove-like heat medium channel 9 through which the heat medium flows is formed in a serpentine shape on an outer surface of the cathode separator 6b. Moreover, as with the anode separator 6a, the manifold holes (not shown), such as the fuel gas supplying manifold hole, formed by the through holes extending in the thickness direction are formed on a peripheral portion of the cathode separator 6b.

Herein, each of the fuel gas channel 7, the oxidizing gas channel 8, and the heat medium channel 9 is formed in a serpentine shape. However, the present embodiment is not limited to this, and any shape is acceptable as long as the reactant gas or the heat medium flows through substantially the entire main surface of each of the separators 6a and 6b.

The cells 40 formed as above are stacked in the thickness direction to form a cell stack body. At this time, the manifold holes, such as the fuel gas supplying manifold hole, formed on the polymer electrolyte membrane 1, the first membrane reinforcing member 10, the second membrane reinforcing member 11, the gaskets 17, the anode separator 6a, and the cathode separator 6b are connected to one another in the thickness direction to form manifolds, such as a fuel gas supplying manifold. Then, an end plate on which a current collector and an insulating plate are disposed is disposed on each of both sides of the cell stack body, and these components are fastened by fastener. Thus, a cell stack (PEFC) is formed.

Next, the reason why the end portion of the first membrane reinforcing member 10 of the PEFC according to Embodiment 1 is unlikely to damage the polymer electrolyte membrane 1 will be explained in comparison with Comparative Example 1. The mechanism of the damaging of the polymer electrolyte membrane 1 is the same between an anode side region and a cathode side region, so that the following explanation will take the anode side region as an example.

Figure 7:
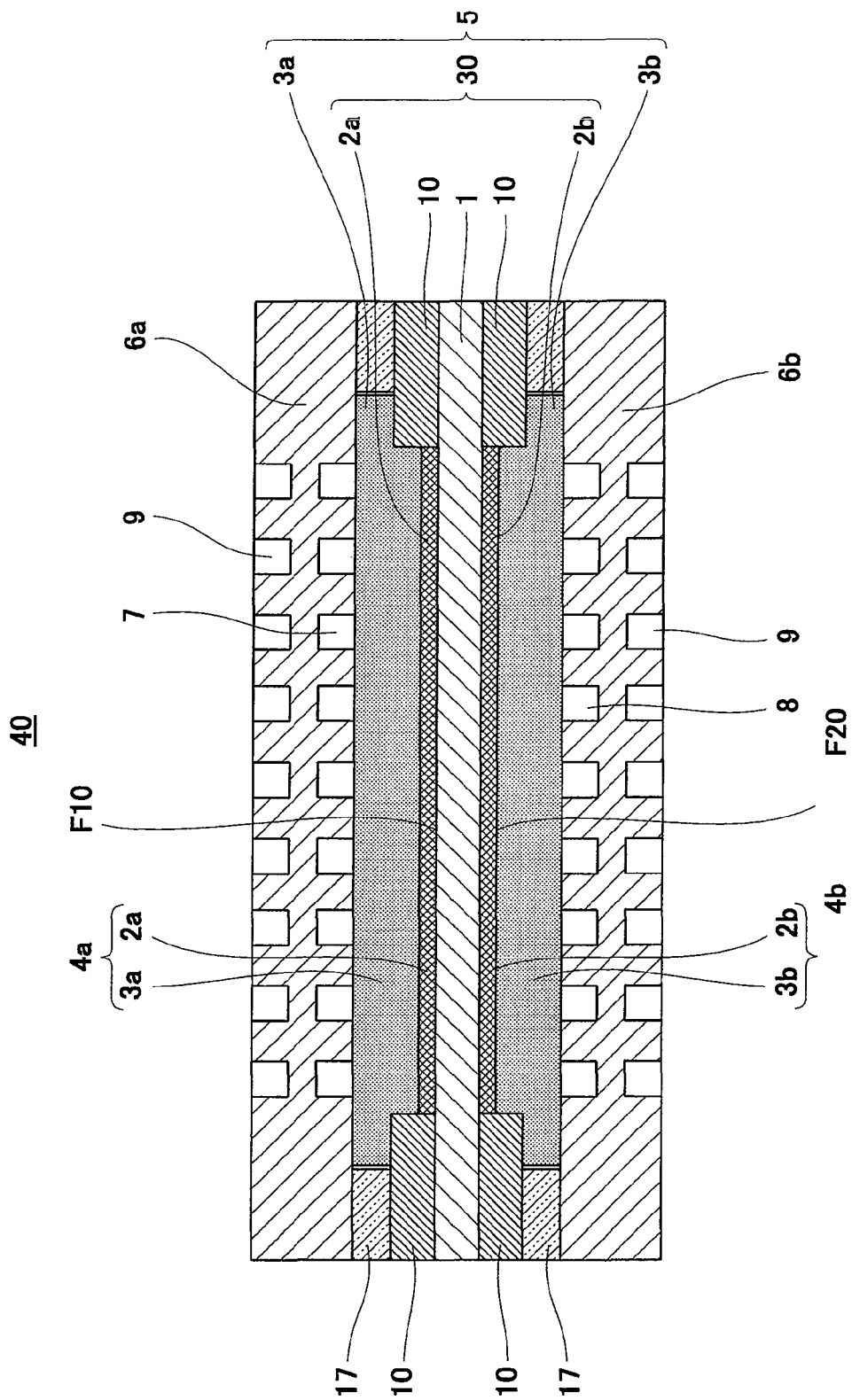
FIG. 7 is a schematic diagram showing a configuration example (Comparative Example 1) in which a membrane reinforcing member disposed on a main surface of a polymer electrolyte membrane does not have a two-layer structure.

FIG. 7 is a schematic diagram showing a configuration example (Comparative Example 1) in which the membrane reinforcing member disposed on the main surface of the polymer electrolyte membrane 1 does not have the two-layer structure.

As shown in FIG. 7, the cell 40 of Comparative Example 1 is the same as the cell 40 of the present embodiment except that the membrane reinforcing member is constituted by one first membrane reinforcing member. In the cell 40 of Comparative Example 1, the anode gas diffusion layer 3a has a flat plate shape, and has a uniform thickness before it is incorporated in the cell stack. By incorporating the anode gas diffusion layer 3a in the cell stack, the anode gas diffusion layer 3a is sandwiched between the anode separator 6a and the first membrane reinforcing member 10 and between the anode separator 6a and the anode catalyst layer 2a to be compressed in the thickness direction. In this case, since the membrane reinforcing member is constituted by one first membrane reinforcing member 10 unlike the two-layer structure of Embodiment 1, a portion (hereinafter referred to as "separator-membrane reinforcing member sandwiched portion") of the anode gas diffusion layer 3a which portion is sandwiched between the anode separator 6a and the first membrane reinforcing member 10 is uniformly compressed (becomes uniform in thickness). Then, an elastic repulsive force of the separator-membrane reinforcing member sandwiched portion is applied to the first membrane reinforcing member 10. As a result, excessive pressure is applied to a corner portion 14 formed by an inner surface F40 and inner peripheral surface of the first membrane reinforcing member 10. Since the corner portion 14 line-contacts the polymer electrolyte membrane 1, this contact portion of the polymer electrolyte membrane 1 may be damaged.

However, as shown in FIG. 6, in the cell 40 according to Embodiment 1, the membrane reinforcing member is formed to have the two-layer structure in which the second membrane reinforcing member 11 is disposed on an outer surface F30 of the first membrane reinforcing member 10. Then, the inner peripheral surface of the first membrane reinforcing member 10 is located inwardly of the polymer electrolyte membrane 1 as compared to the inner peripheral surface of the second membrane reinforcing member 11, and the second membrane reinforcing member 11 is not disposed on an inner peripheral portion 15 of the first membrane reinforcing member 10. With this, a portion of the anode gas diffusion layer 3a which portion is sandwiched between the inner peripheral portion 15 of the first membrane reinforcing member 10 and the anode separator 6a is not so compressed as compared to a portion of the anode gas diffusion layer 3a which portion is sandwiched between the second membrane reinforcing member 11 and the anode separator 6a. Therefore, the pressure applied to the inner peripheral portion 15 of the first membrane reinforcing member 10 is lower than the pressure applied to a portion (portion on which the second membrane reinforcing member 11 is disposed) 16 other than the inner peripheral portion 15 of the first membrane reinforcing member 10. On this account, the pressure applied to the corner portion 14 of the first membrane reinforcing member 10 becomes low. Therefore, although the corner portion 14 line-contacts the main surface F10 of the polymer electrolyte membrane 1, excessive pressure is not applied to the polymer electrolyte membrane 1, so that the damage of the polymer electrolyte membrane 1 can be suppressed.

Method for Manufacturing Membrane-Electrode Assembly

Next, a method for manufacturing the MEA 5 according to Embodiment 1 will be explained. Note that a method for manufacturing the cell 40 and the cell stack (PEFC) using the MEA 5 manufactured in accordance with the following explanation is not especially limited, and a known manufacturing technology of the PEFC can be adopted, so that a detailed explanation thereof is omitted.

Figure 27:
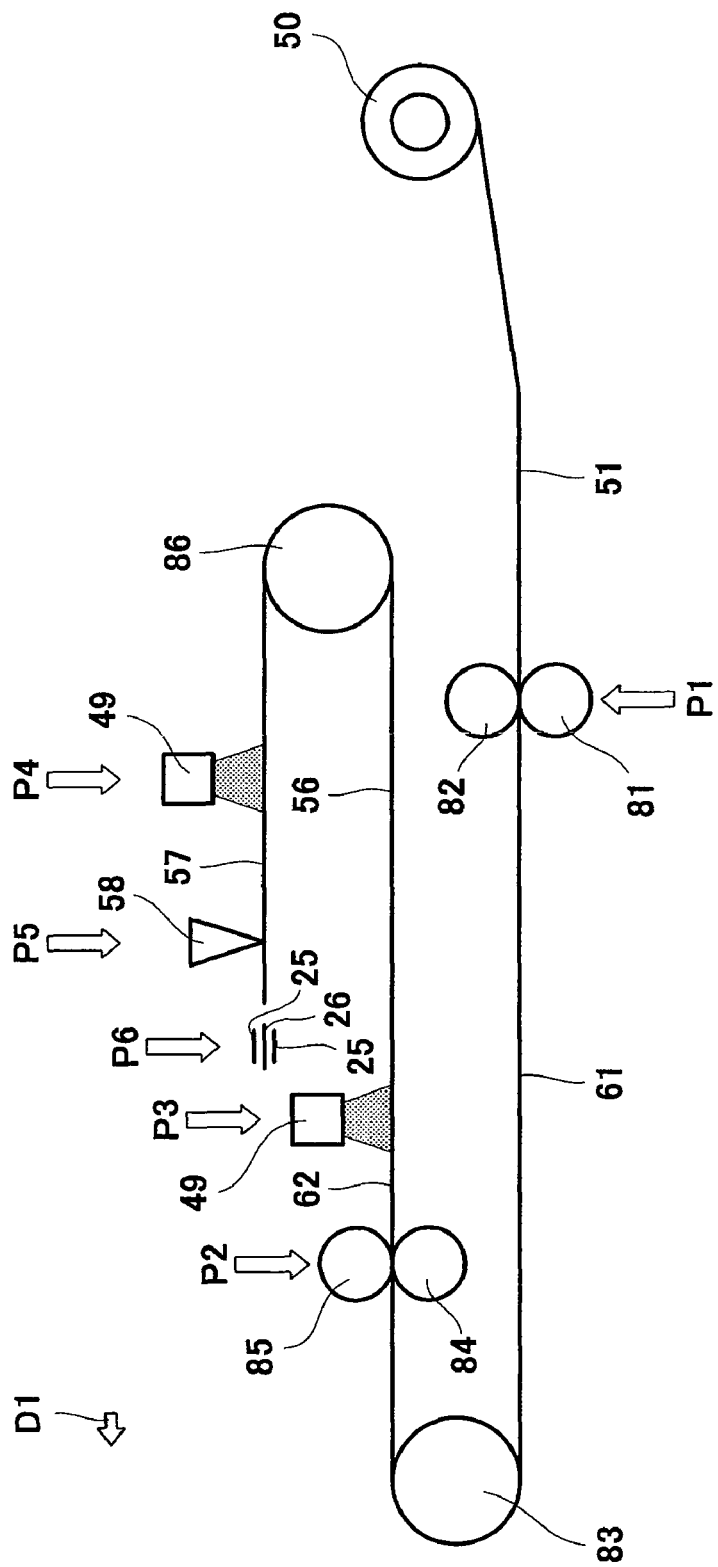
FIG. 27 is a schematic diagram schematically showing a part of a series of steps (treatment areas) of manufacturing the MEA shown in FIGS. 4 and 5, and a part of a manufacturing line for the MEA.

FIG. 27 is a schematic diagram schematically showing a part of a series of steps (treatment areas) of manufacturing the MEA 5 shown in FIGS. 4 and 5, and a part of a manufacturing line for the MEA 5.

As shown in FIG. 27, the MEA 5 is manufactured through: a first step P1 and second step P2 of bonding a polymer electrolyte membrane sheet 51 and the first membrane reinforcing member 10 to form a membrane-membrane reinforcing member sheet assembly; a third step P3 and fourth step P4 of applying the catalyst layers on the membrane-membrane reinforcing member sheet assembly; a fifth step P5 of cutting a membrane-catalyst layer assembly sheet; and a sixth step P6 of bonding a membrane-catalyst layer assembly 26 and a membrane reinforcing member-gas diffusion layer assembly 25. With this, the MEA 5 can be easily mass-produced at low cost.

First, the first step P1 will be explained.

Figure 28:
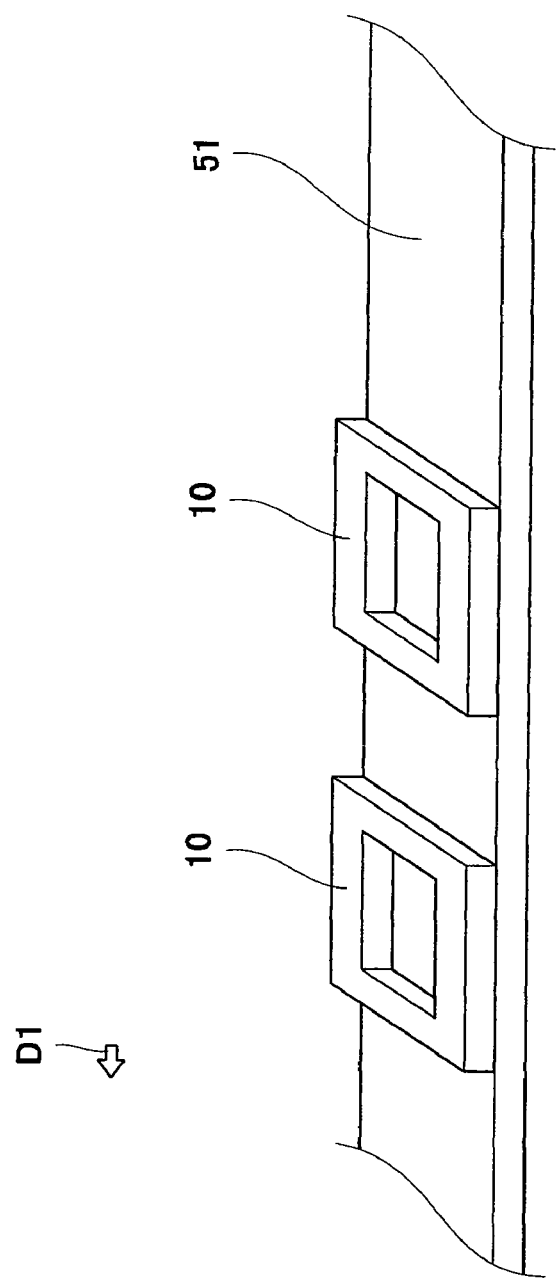
FIG. 28 is a schematic diagram for explaining a first step in a process of manufacturing the MEA shown in FIG. 27.

FIG. 28 is a schematic diagram for explaining the first step P1 in the process of manufacturing the MEA 5 shown in FIG. 27.

As shown in FIGS. 27 and 28, in the area where the first step P1 is carried out, there are provided a thermocompression bonding device (not shown) having a pair of rollers 81 and 82, the elongated polymer electrolyte membrane sheet 51 (that is a member from which the polymer electrolyte membrane 1 shown in FIGS. 4 and 5 is obtained by cutting), and the first membrane reinforcing member 10.

Next, the treatment of the first step P1 will be explained.

First, the elongated polymer electrolyte membrane sheet 51 is manufactured using a publicly known thin film manufacturing technique, and is rolled to obtain a polymer electrolyte membrane roll 50. Similarly, an elongated membrane reinforcing member sheet is manufactured using the thin film manufacturing technique. A rectangular opening is punched out from the membrane reinforcing member sheet, and the membrane reinforcing member sheet is cut to obtain a doughnut-shaped piece. Thus, the first membrane reinforcing member 10 is manufactured.

Then, in the manufacturing line shown in FIG. 27, by driving rollers 83 and 86, the polymer electrolyte membrane sheet 51 is pulled out from the polymer electrolyte membrane roll 50. Next, as shown in FIG. 28, the first membrane reinforcing member 10 is disposed on one main surface (hereinafter referred to as "front surface") of the polymer electrolyte membrane sheet 51 by a suitable supply mechanism or a person. Next, the polymer electrolyte membrane sheet 51 and the first membrane reinforcing member 10 are introduced into the thermocompression bonding device (not shown) having the pair of rollers 81 and 82. In thermocompression bonding device, the polymer electrolyte membrane sheet 51 and the first membrane reinforcing member 10 are bonded to each other while they are proceeding in a proceeding direction D1 between the rollers 81 and 82 preheated. Thus, a tape-shaped membrane-membrane reinforcing member assembly sheet 61 is formed. Then, the membrane-membrane reinforcing member assembly sheet 61 turns by the roller 83. That is, the membrane-membrane reinforcing member assembly sheet 61 is turned over such that a rear surface (main surface opposite the main surface on which the first membrane reinforcing member 10 is disposed) thereof faces upward. Then, the membrane-membrane reinforcing member assembly sheet 61 proceeds to the area of the second step P2.

Herein, the first membrane reinforcing member 10 is manufactured by cutting the membrane reinforcing member sheet. However, the present embodiment is not limited to this. The first membrane reinforcing member 10 may be manufactured by using a die. Moreover, a pretreatment of applying an adhesive to the rear surface (contact surface) of the first membrane reinforcing member 10 may be carried out before causing the rear surface of the first membrane reinforcing member 10 to contact the polymer electrolyte membrane sheet 51. In this case, a pressure treatment may be carried out with the rollers 81 and 82 preheated, or only the pressure treatment may be carried out without the preheating. Moreover, it is preferable that the adhesive do not deteriorate the battery characteristics. For example, it may be possible to use a dispersion medium or a solvent containing a polymer electrolyte material (shown above as the constituent material of the polymer electrolyte membrane 1 for example) that is the same type as or different type (having an affinity so as to be able to be adequately integrated with the polymer electrolyte membrane sheet 51) from the polymer electrolyte membrane sheet 51.

Next, the second step P2 will be explained.

The area of the second step P2 is the same in configuration as the area of the first step P1, so that a detailed explanation thereof is omitted.

When the membrane-membrane reinforcing member assembly sheet 61 formed in the first step P1 proceeds to the area of the second step P2, the first membrane reinforcing member 10 is disposed on the rear surface of the polymer electrolyte membrane sheet 51 of the membrane-membrane reinforcing member assembly sheet 61, as with the first step P1. At this time, the first membrane reinforcing member 10 is disposed on the rear surface of the polymer electrolyte membrane sheet 51 of the membrane-membrane reinforcing member assembly sheet 61 so as to, when viewed from the thickness direction of the polymer electrolyte membrane sheet 51, overlap the first membrane reinforcing member 10 disposed on the front surface of the membrane-membrane reinforcing member assembly sheet 61 (polymer electrolyte membrane sheet 51).

Next, as shown in FIG. 27, the membrane-membrane reinforcing member assembly sheet 61 and the first membrane reinforcing member 10 are introduced into a thermocompression bonding device (not shown) having a pair of rollers 84 and 85. In the thermocompression bonding device, the membrane-membrane reinforcing member assembly sheet 61 and the first membrane reinforcing member 10 are bonded to each other while they are proceeding in the proceeding direction D1 between the rollers 84 and 85 preheated. Thus, a tape-shaped membrane-membrane reinforcing member assembly sheet 62 is formed. Then, the membrane-membrane reinforcing member assembly sheet 62 proceeds to the area of the third step P3. As with the first step P1, the pretreatment of applying the adhesive to the rear surface (contact surface) of the first membrane reinforcing member 10 may be carried out before causing the rear surface (contact surface) of the first membrane reinforcing member 10 to contact the membrane-membrane reinforcing member assembly sheet 61.

Next, the third step P3 will be explained.

Figure 29:
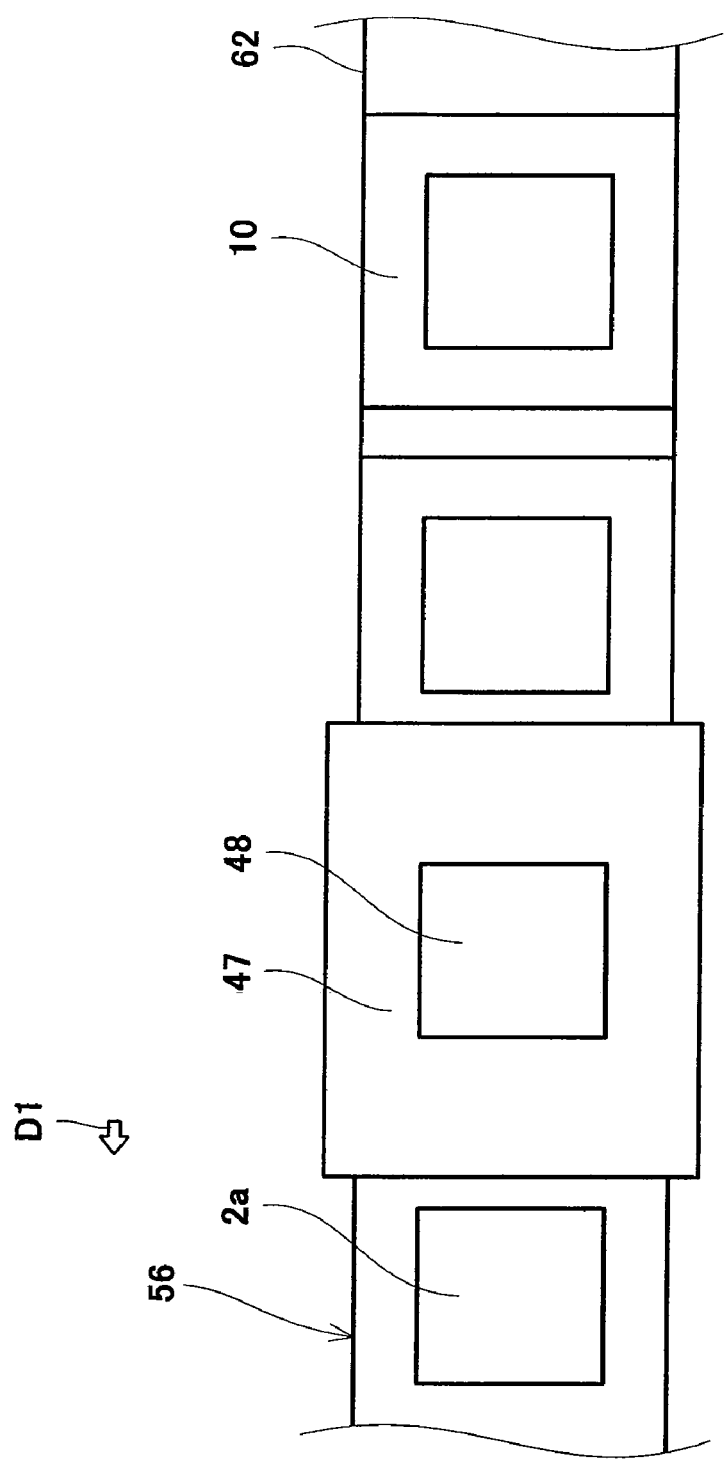
FIG. 29 is a schematic diagram for explaining a third step in the process of manufacturing the MEA shown in FIG. 27.

FIG. 29 is a schematic diagram for explaining the third step P3 in the process of manufacturing the MEA 5 shown in FIG. 27.

First, the configuration of the area of the third step P3 will be explained.

As shown in FIG. 29, in the area where the third step P3 is carried out, there are provided a mask 47 having an opening 48, a supporting means (supporting base for example), not shown, for supporting the membrane-membrane reinforcing member assembly sheet 62 from the rear surface of the membrane-membrane reinforcing member assembly sheet 62, and a catalyst layer forming device 49 (see FIG. 27). The shape of the opening 48 is designed to correspond to the shape of the main surface of the anode catalyst layer 2a shown in FIGS. 4 and 5. Moreover, the catalyst layer forming device includes a mechanism configured to, for example, apply or spray the catalyst layer forming ink to form the anode catalyst layer 2a on the main surface of the membrane-membrane reinforcing member assembly sheet 62. As this mechanism, a mechanism adopted for forming the catalyst layer of the gas diffusion layer of the known fuel cell may be adopted. For example, a mechanism designed based on a spraying method, a spin coating method, a doctor blade method, a die coating method, or a screen printing may be adopted.

Next, the treatment of the third step P3 will be explained.

First, the membrane-membrane reinforcing member assembly sheet 62 formed in the second step P2 proceeds to the area of the third step P3, and stops once. Then, the membrane-membrane reinforcing member assembly sheet 62 is sandwiched between the mask 47 and the supporting base, not shown, to be fixed therebetween. Next, the catalyst layer forming device 49 starts operating. By, for example, applying the catalyst layer forming ink from above the opening 48 of the mask 47, the anode catalyst layer 2a is formed to cover the rear surface of the polymer electrolyte membrane sheet 51 of the membrane-membrane reinforcing member assembly sheet 62 (to fill the opening of the first membrane reinforcing member 10). After the anode catalyst layer 2a is formed, the mask 47 and the supporting base are separated from the membrane-membrane reinforcing member assembly sheet 62. Then, a membrane-catalyst layer sheet 56 formed as above moves in the proceeding direction D1 again. With this, the anode catalyst layers 2a are formed on the membrane-catalyst layer sheet 56 at predetermined intervals in a longitudinal direction of the membrane-catalyst layer sheet 56. Then, the membrane-catalyst layer sheet 56 further moves in the proceeding direction D1, and turns by the roller 86, i.e., is turned over such that the front surface (main surface opposite the main surface on which the anode catalyst layer 2a is formed) of the membrane-catalyst layer sheet 56 faces upward.

Next, the fourth step P4 will be explained.

The area of the fourth step P4 is the same in configuration as the area of the third step P3, so that a detailed explanation thereof is omitted.

The membrane-catalyst layer sheet 56 formed in the third step P3 proceeds to the area of the fourth step P4, and stops once. Then, the membrane-catalyst layer sheet 56 is sandwiched between the mask 47 and the supporting base, not shown, to be fixed therebetween. Next, as shown in FIG. 27, the catalyst layer forming device 49 starts operating. By, for example, applying the catalyst layer forming ink from above the opening 48 of the mask 47, the cathode catalyst layer 2b is formed to cover the front surface of the polymer electrolyte membrane sheet 51 of the membrane-catalyst layer sheet 56 (to fill the opening of the first membrane reinforcing member 10). At this time, the cathode catalyst layer 2b is formed to overlap the anode catalyst layer 2a when viewed from the thickness direction of the membrane-catalyst layer sheet 56. Then, after the cathode catalyst layer 2b is formed, the mask 47 and the supporting base are separated from the membrane-catalyst layer sheet 56. Then, a membrane-catalyst layer assembly sheet 57 formed as above moves in the proceeding direction D1 again. With this, the cathode catalyst layers 2b are formed on the membrane-catalyst layer assembly sheet 57 at predetermined intervals in a longitudinal direction of the membrane-catalyst layer assembly sheet 57 (the cathode catalyst layers 2b are formed to overlap the anode catalyst layers 2a). Then, the membrane-catalyst layer assembly sheet 57 further moves in the proceeding direction D1.

The ingredient composition, the dryness, and the like of each of the anode catalyst layer 2a and the cathode catalyst layer 2b are adjusted so that each of the anode catalyst layer 2a and the cathode catalyst layer 2b has appropriate bendability. In addition, each of the anode catalyst layer 2a and the cathode catalyst layer 2b is subjected to such a treatment (for example, the supporting base is heated, and a dispersing agent of the catalyst layer forming ink is subjected to a drying treatment) that even in a case where the membrane-catalyst layer sheet 56 or the membrane-catalyst layer assembly sheet 57 is disposed upside down, the anode catalyst layer 2a or the cathode catalyst layer 2b does not fall off from the polymer electrolyte membrane sheet 51. Moreover, the drying treatment (for example, at least one of a heat treatment, an air blow treatment, and a degassing treatment) may be suitably carried out each time the anode catalyst layer 2a or the cathode catalyst layer 2b is formed.

Next, the fifth step P5 will be explained.

A cutting device 58 is provided in the area of the fifth step P5. The membrane-catalyst layer assembly sheet 57 formed in the fourth step P4 is introduced into the cutting device 58 in the area of the fifth step P5, and stops once. Then, the membrane-catalyst layer assembly sheet 57 is cut by a cutting mechanism of the cutting device 58 such that each cut piece has a preset size. Thus, the membrane-catalyst layer assembly 26 is manufactured.

Next, the sixth step P6 will be explained.

Figure 30:
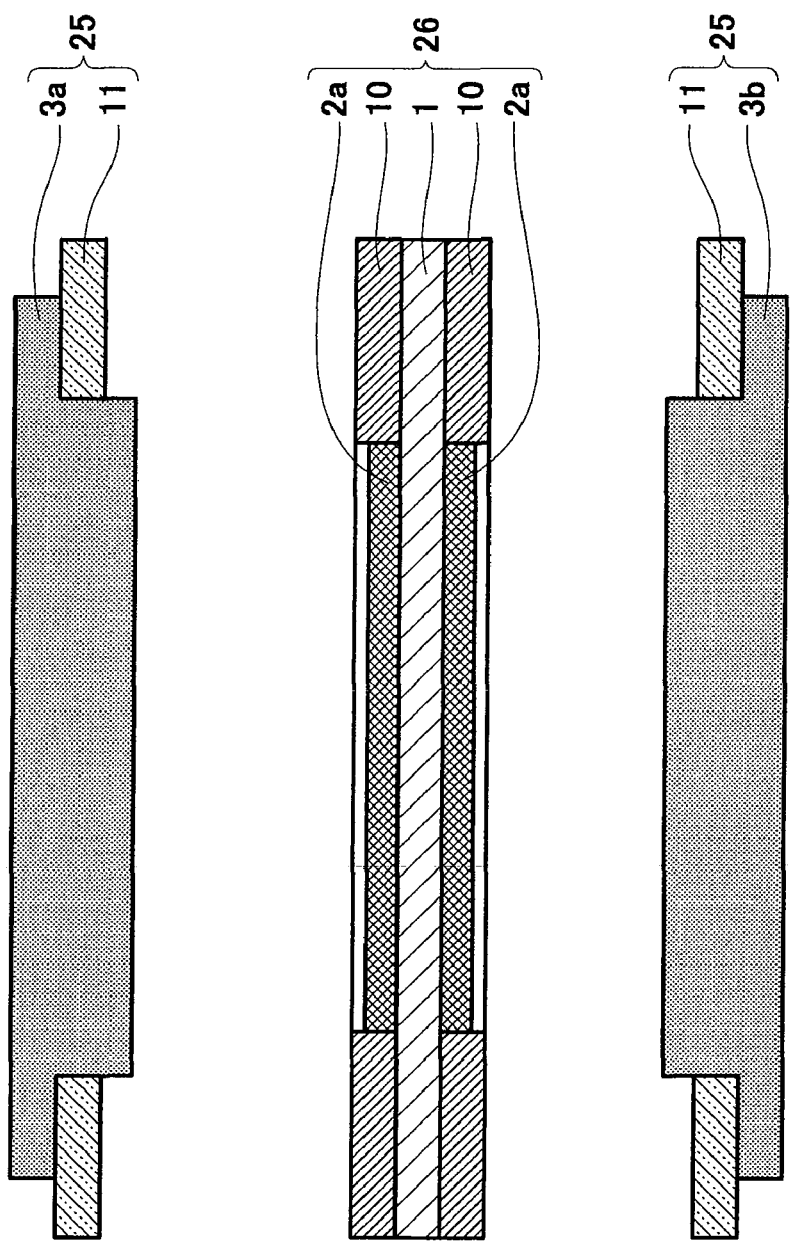
FIG. 30 is a schematic diagram for explaining a sixth step in the process of manufacturing the MEA shown in FIG. 27.

FIG. 30 is a schematic diagram for explaining the sixth step P6 in the process of manufacturing the MEA 5 shown in FIG. 27.

First, the configuration of the area of the sixth step P6 will be explained.

As shown in FIG. 30, in the area where the sixth step P6 is carried out, there are provided the membrane-catalyst layer assembly 26 manufactured in the fifth step P5, a pair of membrane reinforcing member-gas diffusion layer assemblies 25, and the thermocompression bonding device (not shown). Here, a method for manufacturing the membrane reinforcing member-gas diffusion layer assembly 25 will be explained in reference to FIG. 31.

Figure 31:
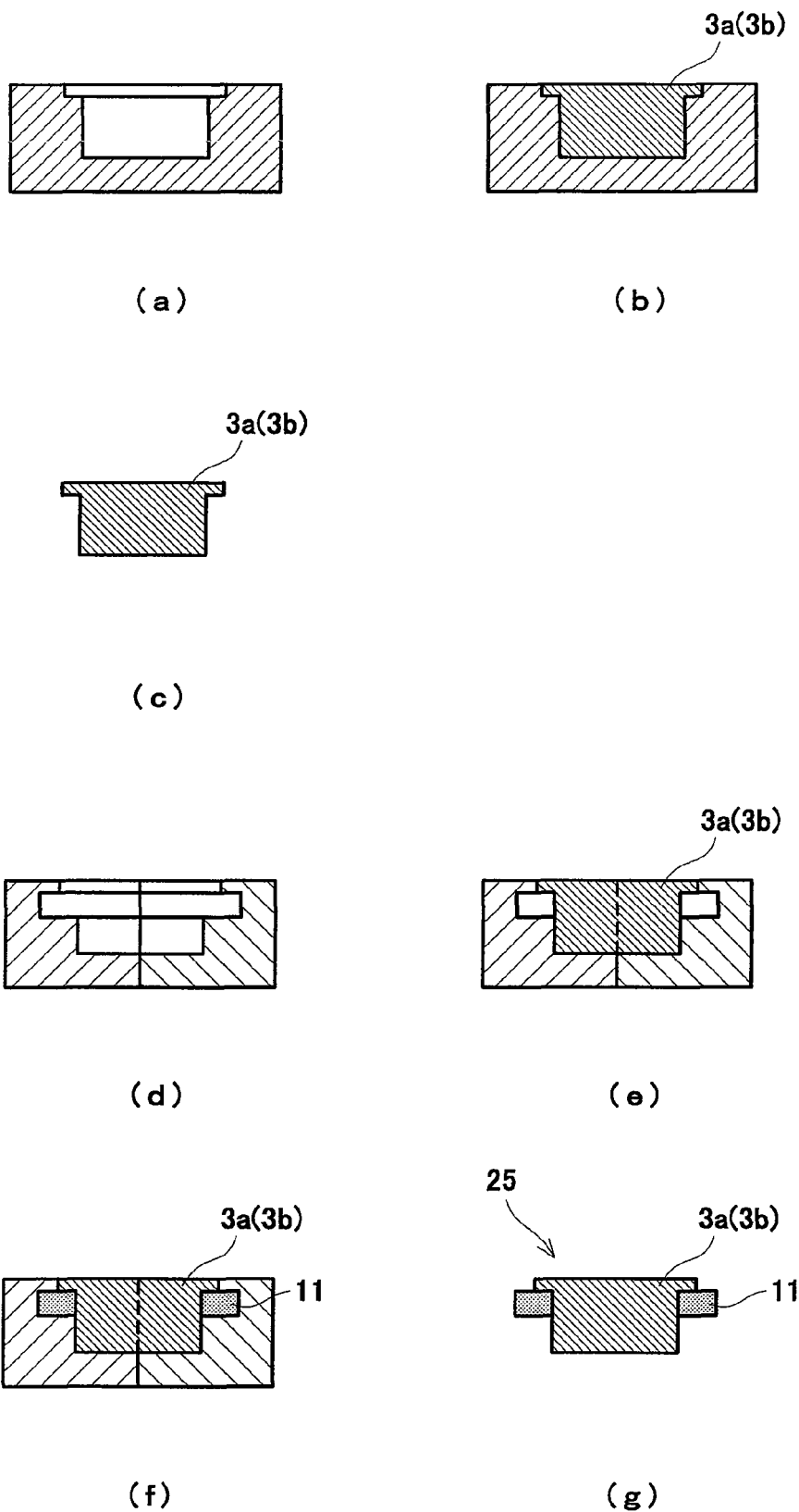
FIG. 31 is a schematic diagram for explaining steps of manufacturing a membrane reinforcing member-gas diffusion layer assembly shown in FIG. 27.

FIG. 31 are schematic diagrams for explaining steps of manufacturing the membrane reinforcing member-gas diffusion layer assembly 25 shown in FIG. 27.

First, as shown in FIG. 31(a), manufactured is a die for forming the anode gas diffusion layer 3a (or the cathode gas diffusion layer 3b) which has a substantially rectangular solid shape and whose peripheral surface concaves inwardly to form a step shape.

Then, a mixture containing binder resin, electrically-conductive particles (carbon particles for example), and a solvent is kneaded, and the kneaded mixture is poured into the die of the anode gas diffusion layer 3a (or the cathode gas diffusion layer 3b) shown in FIG. 31(a) and is solidified therein (see FIG. 31(b)). Thus, the anode gas diffusion layer 3a (or the cathode gas diffusion layer 3b) is manufactured (see FIG. 31(C)).

Next, as shown in FIG. 31(d), manufactured is a split die for forming the membrane reinforcing member-gas diffusion layer assembly 25 which has a substantially rectangular solid shape and is formed such that a substantially center portion of the peripheral surface of the membrane reinforcing member-gas diffusion layer assembly 25 projects outwardly and a portion below this projecting portion concaves inwardly to form a step shape (To be specific, the outer shape of a component obtained by bonding the doughnut-shaped second membrane reinforcing member 11 having a substantially rectangular shape and an opening to the step portion of the anode gas diffusion layer 3a (or the cathode gas diffusion layer 3b). Then, the anode gas diffusion layer 3a (or the cathode gas diffusion layer 3b) is placed in the split die of the membrane reinforcing member-gas diffusion layer assembly 25 (see FIG. 31(e)). Next, the material constituting the second membrane reinforcing member 11 is liquefied by being heated to a temperature higher than the melting point of the material. Then, this liquid material is poured into the split die of the membrane reinforcing member-gas diffusion layer assembly 25 (see FIG. 31(f)) to manufacture the second membrane reinforcing member 11, and the anode gas diffusion layer 3a (or the cathode gas diffusion layer 3b) and the second membrane reinforcing member 11 are bonded to each other. Thus, the membrane reinforcing member-gas diffusion layer assembly 25 is manufactured (see FIG. 31(g)).

Next, the treatment of the sixth step P6 will be explained.

As shown in FIG. 30, the membrane-catalyst layer assembly 26 manufactured in the fifth step P5 and the pair of membrane reinforcing member-gas diffusion layer assemblies 25 manufactured by the above method are placed in the thermocompression bonding device by a robot (not shown) such that the membrane-catalyst layer assembly 26 is sandwiched between the pair of membrane reinforcing member-gas diffusion layer assemblies 25.

At this time, the hand of the robot handles the first membrane reinforcing member 10 of the membrane-catalyst layer assembly 26 and the second membrane reinforcing member 11 of the membrane reinforcing member-gas diffusion layer assembly 25. This is easier than a case of directly handling the polymer electrolyte membrane 1, the anode gas diffusion layer 3a, and the cathode gas diffusion layer 3b which are high in flexibility. Moreover, the polymer electrolyte membrane 1 and the like may be damaged by directly handling the polymer electrolyte membrane 1, the anode gas diffusion layer 3a, and the cathode gas diffusion layer 3b. However, in the present embodiment, since the first and second membrane reinforcing members 10 and 11 are handled, the polymer electrolyte membrane 1 and the like are not damaged.

Then, the thermocompression bonding device carries out the thermocompression bonding of these components to manufacture the MEA 5.

As above, in accordance with the PEFC of Embodiment 1, the damage of the polymer electrolyte membrane 1 can be more surely suppressed, the durability can be improved, and more highly reliable fuel cells can be provided. In addition, in accordance with the PEFC of Embodiment 1, the first membrane reinforcing member 10 is bonded to the polymer electrolyte membrane 1, the mixture containing the binder resin and the electrically-conductive particles are kneaded, extended by pressure, and solidified to form the anode gas diffusion layer 3a (or the cathode gas diffusion layer 3b), and the second membrane reinforcing member 11 is bonded to the anode gas diffusion layer 3a (or the cathode gas diffusion layer 3b). With this, the handleability and the work efficiency can be improved.

In the manufacturing line for the MEA 5 shown in FIG. 27, the polymer electrolyte membrane sheet 51 that is a material is caused to move as a single sheet until it becomes the membrane-catalyst layer assembly sheet 57. To cause the sheet to appropriately move in the proceeding direction D1, a towing mechanism, such as a capstan or a pair of rollers, for towing the sheet, a tension applying mechanism, such as a tensioner, for applying an appropriate tension to the sheet, and a sheet temporary holding and feeding mechanism, such as a dancer roller, for temporarily stopping the sheet at a predetermined area (the area of the fourth step P4 for example) and then rapidly feeding the sheet are provided at appropriate positions in the manufacturing line. However, since these are known in the art, explanations thereof are omitted.

Moreover, herein, after the first membrane reinforcing members 10 are bonded to the polymer electrolyte membrane sheet 51, the anode catalyst layer 2a and the cathode catalyst layer 2b are formed on the polymer electrolyte membrane sheet 51. However, the present embodiment is not limited to this, and the first membrane reinforcing members 10 may be bonded to the polymer electrolyte membrane sheet 51 after the anode catalyst layer 2a and the cathode catalyst layer 2b are formed on the polymer electrolyte membrane sheet 51.

Further, herein, the membrane reinforcing member-gas diffusion layer assembly 25 is manufactured by manufacturing the anode gas diffusion layer 3a (or the cathode gas diffusion layer 3b) and then manufacturing the second membrane reinforcing member 11 on the anode gas diffusion layer 3a (or the cathode gas diffusion layer 3b). However, the present embodiment is not limited to this, and the membrane reinforcing member-gas diffusion layer assembly 25 may be manufactured as below.

First, the second membrane reinforcing member 11 is manufactured by the above method. Then, the second membrane reinforcing member 11 is placed in the split die of the membrane reinforcing member-gas diffusion layer assembly 25 shown in FIG. 31(d). Next, the mixture containing the binder resin, the electrically-conductive particles (carbon particles for example), and the solvent is kneaded, and the kneaded mixture is poured into the die of the membrane reinforcing member-gas diffusion layer assembly 25 and is solidified therein. With this, the second membrane reinforcing member 11 and the anode gas diffusion layer 3a (or the cathode gas diffusion layer 3b) are bonded to each other. Thus, the membrane reinforcing member-gas diffusion layer assembly 25 can be manufactured.

Next, Modification Example 1 of the configuration of the MEA 5 according to Embodiment 1 will be explained.

Modification Example 1

Figure 32:
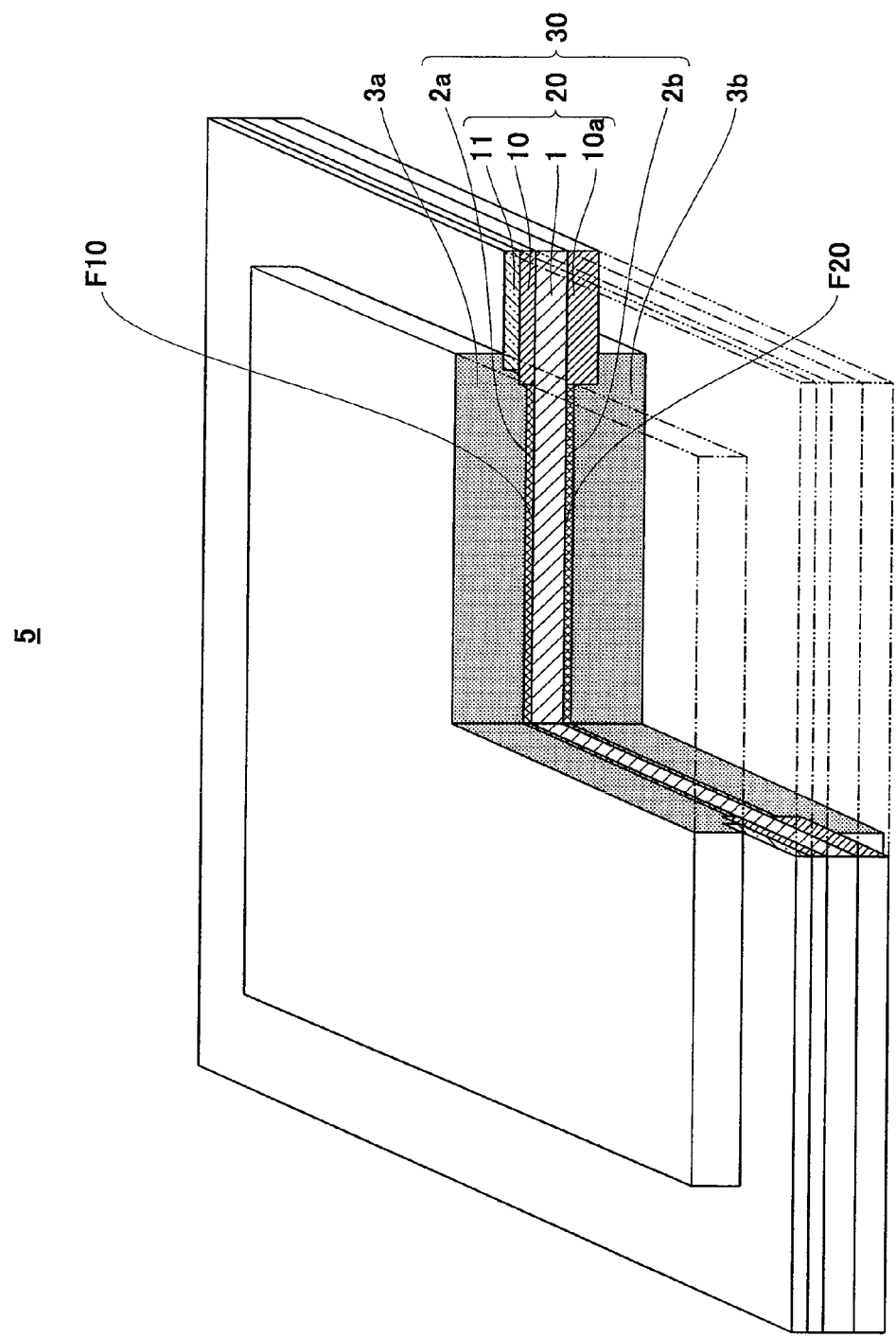
FIG. 32 is a schematic diagram showing a schematic configuration of the MEA that is Modification Example 1 of the MEA according to Embodiment 1.

FIG. 32 is a schematic diagram showing a schematic configuration of the MEA 5 that is Modification Example 1 of the MEA 5 according to Embodiment 1.

As shown in FIG. 32, in the MEA 5 of Modification Example 1, a first membrane reinforcing member 10a is disposed on the main surface F20 of the polymer electrolyte membrane 1. As with the first membrane reinforcing member 10, the first membrane reinforcing member 10a is formed to have a substantially rectangular shape and is provided with an opening at the center thereof. When viewed from the thickness direction of the polymer electrolyte membrane 1, an inner peripheral surface forming the opening of the first membrane reinforcing member 10a is formed to coincide with an inner peripheral surface forming the opening of the first membrane reinforcing member 10. Moreover, the thickness of the first membrane reinforcing member 10a is the same as the thickness of the total of the first membrane reinforcing member 10a and the second membrane reinforcing member 11.

As with the PEFC according to Embodiment 1, the PEFC including the MEA 5 of Modification Example 1 configured as above is formed to have the two-layer structure in which the first membrane reinforcing member 10 is disposed on the main surface F10 of the polymer electrolyte membrane 1, and the second membrane reinforcing member 11 is disposed on the outer surface of the first membrane reinforcing member 10. On this account, as with Embodiment 1, the pressure applied to the corner portion of the first membrane reinforcing member 10 which portion contacts the main surface F10 of the polymer electrolyte membrane 1 becomes low. Therefore, although the corner portion line-contacts the main surface F10 of the polymer electrolyte membrane 1, excessive pressure is not applied to the polymer electrolyte membrane 1, so that the damage of the polymer electrolyte membrane 1 can be suppressed.

Next, Modification Example 2 of the configuration of the MEA 5 according to Embodiment 1 will be explained.

Modification Example 2

Figure 33:
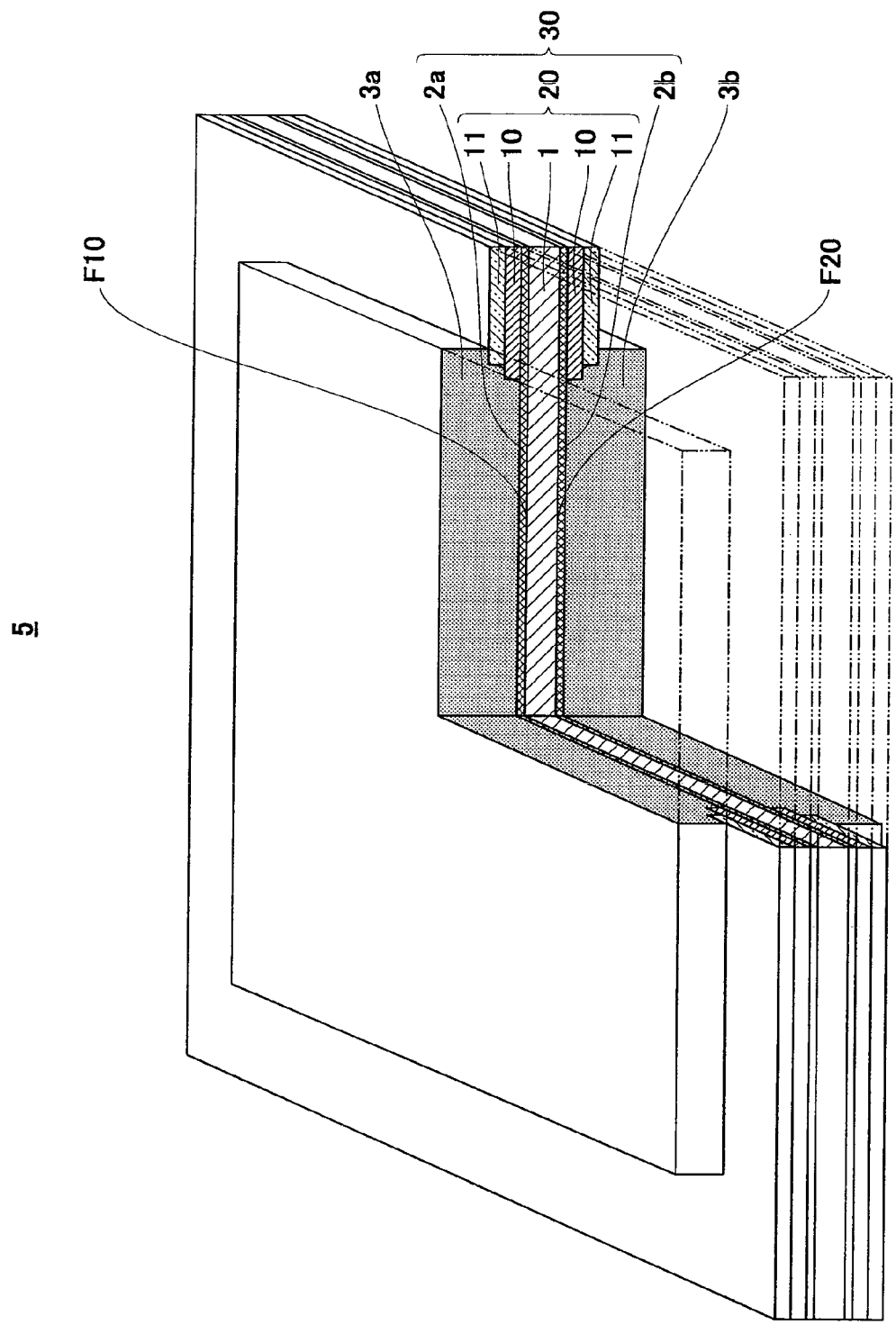
FIG. 33 is a schematic diagram showing a schematic configuration of the MEA that is Modification Example 2 of the MEA according to Embodiment 1.

FIG. 33 is a schematic diagram showing a schematic configuration of the MEA 5 that is Modification Example 2 of the MEA 5 according to Embodiment 1.

As shown in FIG. 33, in the MEA 5 of Modification Example 2, the anode catalyst layer 2a is disposed on the entire main surface F10 of the polymer electrolyte membrane 1, and the cathode catalyst layer 2b is disposed on the entire main surface F20 of the polymer electrolyte membrane 1. Then, the first membrane reinforcing members 10 are disposed on the outer surface of the anode catalyst layer 2a and the outer surface of the cathode catalyst layer 2b, respectively.

The MEA 5 of Modification Example 2 can be continuously manufactured by carrying out the first step P1 and the second step P2 after the third step P3 and the fourth step P4 are carried out in the method for manufacturing the MEA 5 according to Embodiment 1.

The PEFC including the MEA 5 of Modification Example 2 configured as above is formed to have the two-layer structure in which the first membrane reinforcing members 10 are disposed on the outer surface of the anode catalyst layer 2a and the outer surface of the cathode catalyst layer 2b, respectively, and the second membrane reinforcing members 11 are disposed on the outer surfaces of the first membrane reinforcing members 10, respectively. Then, the inner peripheral surface of the first membrane reinforcing member 10 is located inwardly of the polymer electrolyte membrane 1 as compared to the inner peripheral surface of the second membrane reinforcing member 11, and the second membrane reinforcing member 11 is not disposed on the inner peripheral portion of the first membrane reinforcing member 10.

With this, the portion of the anode gas diffusion layer 3a (or the cathode gas diffusion layer 3b) which portion is sandwiched between the inner peripheral portion of the first membrane reinforcing member 10 and the anode separator (or the cathode separator) is not so compressed as compared to the portion of the anode gas diffusion layer 3a (or the cathode gas diffusion layer 3b) which portion is sandwiched between the second membrane reinforcing member 11 and the anode separator (or the cathode separator). Therefore, the pressure applied to the inner peripheral portion of the first membrane reinforcing member 10 is lower than the pressure applied to the portion (portion on which the second membrane reinforcing member 11 is disposed) other than the inner peripheral portion of the first membrane reinforcing member 10. On this account, the pressure applied to the corner portion of the first membrane reinforcing member 10 which portion contacts the outer surface of the anode catalyst layer 2a (or the cathode catalyst layer 2b) becomes low. Therefore, although the corner portion line-contacts the outer surface of the anode catalyst layer 2a (or the cathode catalyst layer 2b), excessive pressure is not applied to the anode catalyst layer 2a (or the cathode catalyst layer 2b), so that the damage of the anode catalyst layer 2a (or the cathode catalyst layer 2b) can be suppressed, and therefore, the damage of the polymer electrolyte membrane 1 can be suppressed.

Next, Modification Example of the method for manufacturing the MEA 5 according to Embodiment 1 will be explained.

Modification Example 3

Figure 34:
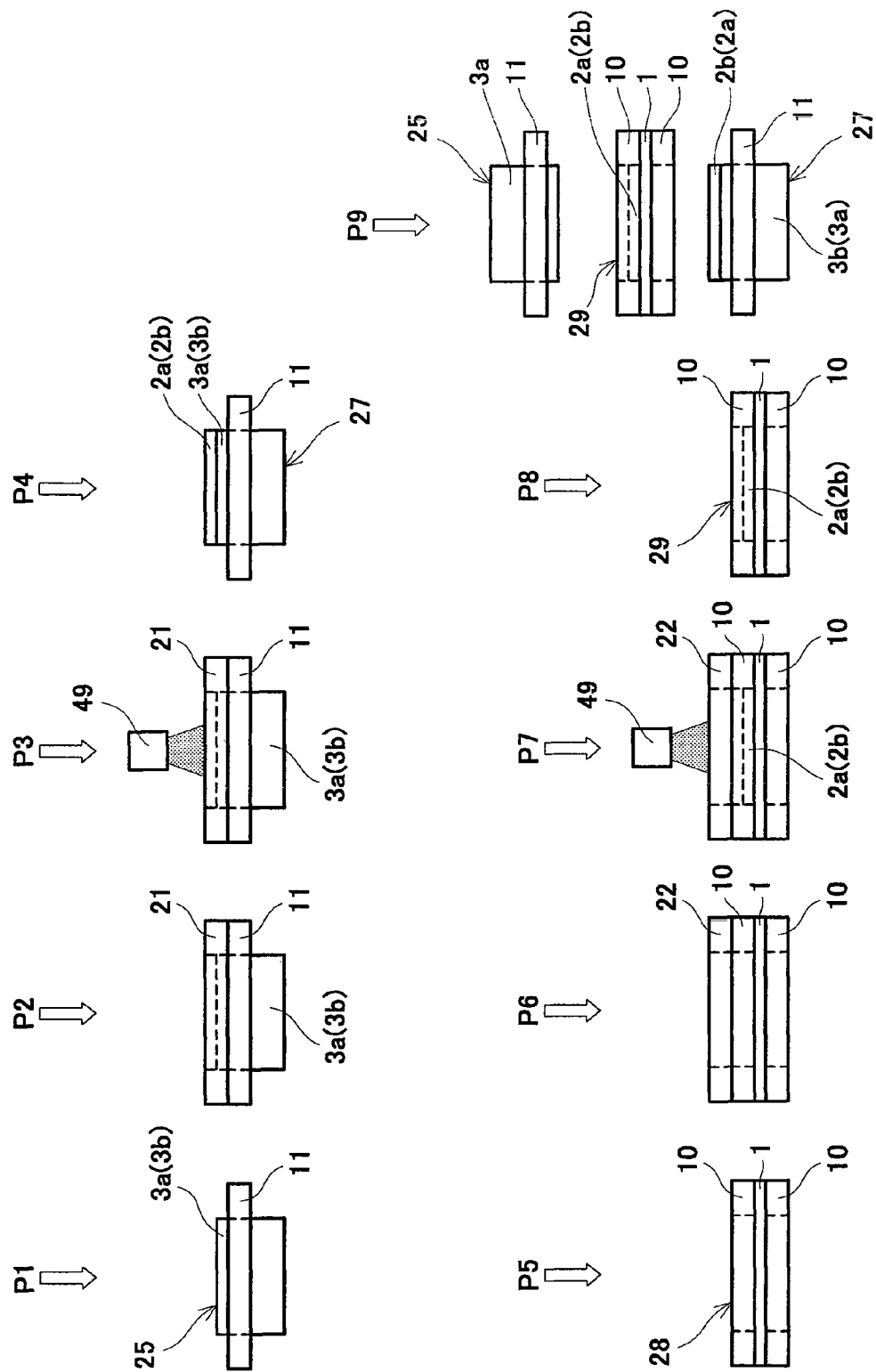
FIG. 34 is a schematic diagram for explaining Modification Example 3 of the method for manufacturing the MEA according to Embodiment 1.

FIG. 34 is a schematic diagram for explaining Modification Example 3 of the method for manufacturing the MEA 5 according to Embodiment 1.

As shown in FIG. 34, in Modification Example 3 of the method for manufacturing the MEA 5 according to Embodiment 1, the MEA 5 is manufactured through the first step P1 to a ninth step P9. In the first step P1, the anode gas diffusion layer 3a (or the cathode gas diffusion layer 3b) and the second membrane reinforcing member 11 are bonded to each other by the above method to manufacture the membrane reinforcing member-gas diffusion layer assembly 25. Herein, the membrane reinforcing member-gas diffusion layer assembly 25 is configured such that the anode gas diffusion layer 3a (or the cathode gas diffusion layer 3b) is not disposed on the main surface of the second membrane reinforcing member 11. However, as shown in FIGS. 31 and 32, the membrane reinforcing member-gas diffusion layer assembly 25 may be configured such that the anode gas diffusion layer 3a (or the cathode gas diffusion layer 3b) is disposed on the main surface of the second membrane reinforcing member 11.

In the second step P2, a second mask member 21 having an opening which is substantially the same in size as the opening of the second membrane reinforcing member 11 is disposed on one main surface of the second membrane reinforcing member 11 of the membrane reinforcing member-gas diffusion layer assembly 25 manufactured in the first step P1. Next, in the third step P3, the catalyst layer forming device 49 forms the anode catalyst layer 2a (or the cathode catalyst layer 2b) by applying the catalyst layer forming ink from above the second mask member 21 disposed in the second step P2 such that the catalyst layer forming ink covers the surface of the anode gas diffusion layer 3a (or the cathode gas diffusion layer 3b) of the membrane reinforcing member-gas diffusion layer assembly 25 (such that the catalyst layer forming ink fills the opening of the second membrane reinforcing member 11). Next, in the fourth step P4, the second mask member 21 disposed in the second step P2 is removed to manufacture a membrane reinforcing member-electrode assembly 27. The synthetic resin used as the material of the second membrane reinforcing member can be used as the material of the second mask member 21.

Moreover, in the fifth step P5, the first membrane reinforcing members 10 are bonded (thermocompression bonding) by the thermocompression bonding device to the polymer electrolyte membrane 1 which has been precut to have a predetermined size. Thus, a membrane-membrane reinforcing member assembly 28 is manufactured. In the sixth step P6, a first mask member 22 having an opening which is substantially the same in size as the opening of the first membrane reinforcing member 10 is disposed on the main surface of one of the first membrane reinforcing members 10 of the membrane-membrane reinforcing member assembly 28 manufactured in the fifth step P5. Next, in the seventh step P7, the catalyst layer forming device 49 forms the cathode catalyst layer 2b (or the anode catalyst layer 2a) by applying the catalyst layer forming ink from above the first mask member 22 disposed in the sixth step P6 such that the catalyst layer forming ink covers the surface of the polymer electrolyte membrane 1 of the membrane-membrane reinforcing member assembly 28 (such that the catalyst layer forming ink fills the opening of the first membrane reinforcing member 10).

Next, in the eighth step P8, the first mask member 22 disposed in the sixth step P6 is removed to manufacture a membrane-catalyst layer assembly 29. The synthetic resin used as the material of the first membrane reinforcing member can be used as the material of the first mask member 22.

Then, in the ninth step P9, the membrane reinforcing member-gas diffusion layer assembly 25 manufactured in the first step P1, the membrane reinforcing member-electrode assembly 27 manufactured in the fourth step P4, and the membrane-catalyst layer assembly 29 manufactured in the eighth step P8 are placed in the thermocompression bonding device by the robot such that the membrane reinforcing member-gas diffusion layer assembly 25 and the membrane reinforcing member-electrode assembly 27 sandwich the membrane-catalyst layer assembly 29. With this, the thermocompression bonding device carries out the thermocompression bonding of these assemblies 25, 27, and 29. Thus, the MEA 5 is manufactured.

In Modification Example 3, when placing the membrane reinforcing member-gas diffusion layer assembly 25 and the like in the thermocompression bonding device, the hand of the robot handles the first membrane reinforcing member 10 and the second membrane reinforcing member 11. This is easier than a case of directly handling the polymer electrolyte membrane 1, the anode gas diffusion layer 3a, and the cathode gas diffusion layer 3b which are high in flexibility. Moreover, since the hand of the robot handles the first and second membrane reinforcing members 10 and 11, the polymer electrolyte membrane 1, the anode gas diffusion layer 3a, and the cathode gas diffusion layer 3b are not damaged.

In Modification Example 3, the MEA 5 is manufactured by a batch method using the polymer electrolyte membrane 1 which has been precut to have a predetermined size. However, the present modification example is not limited to this. As with Embodiment 1, the MEA 5 may be manufactured using the polymer electrolyte membrane sheet 51 in the manufacturing line.

Embodiment 2

Configuration of Membrane-Electrode Assembly

Figure 8:
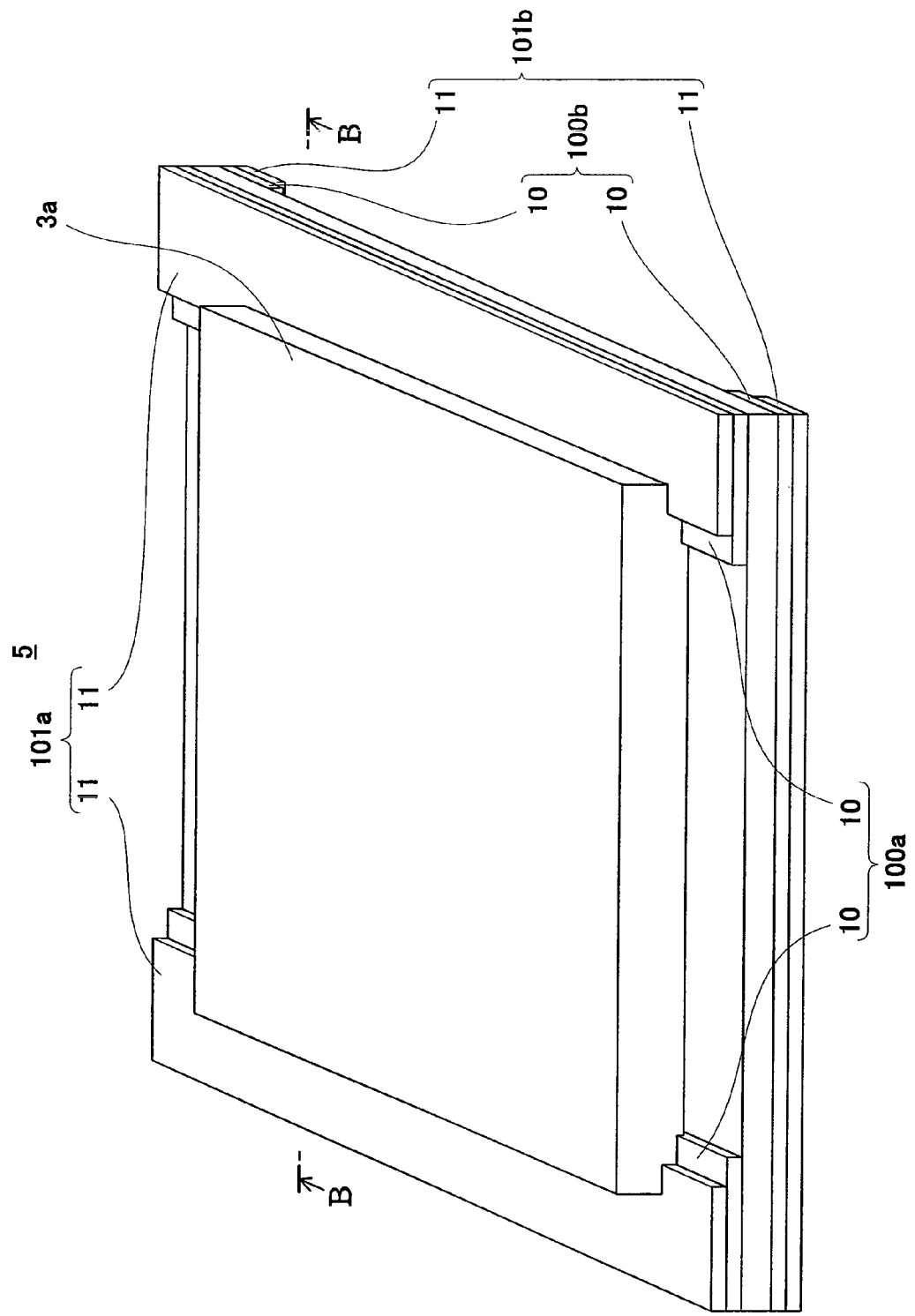
FIG. 8 is a perspective view schematically showing a schematic configuration of the MEA in the cell according to Embodiment 2 of the present invention when viewed obliquely from above.
Figure 9:
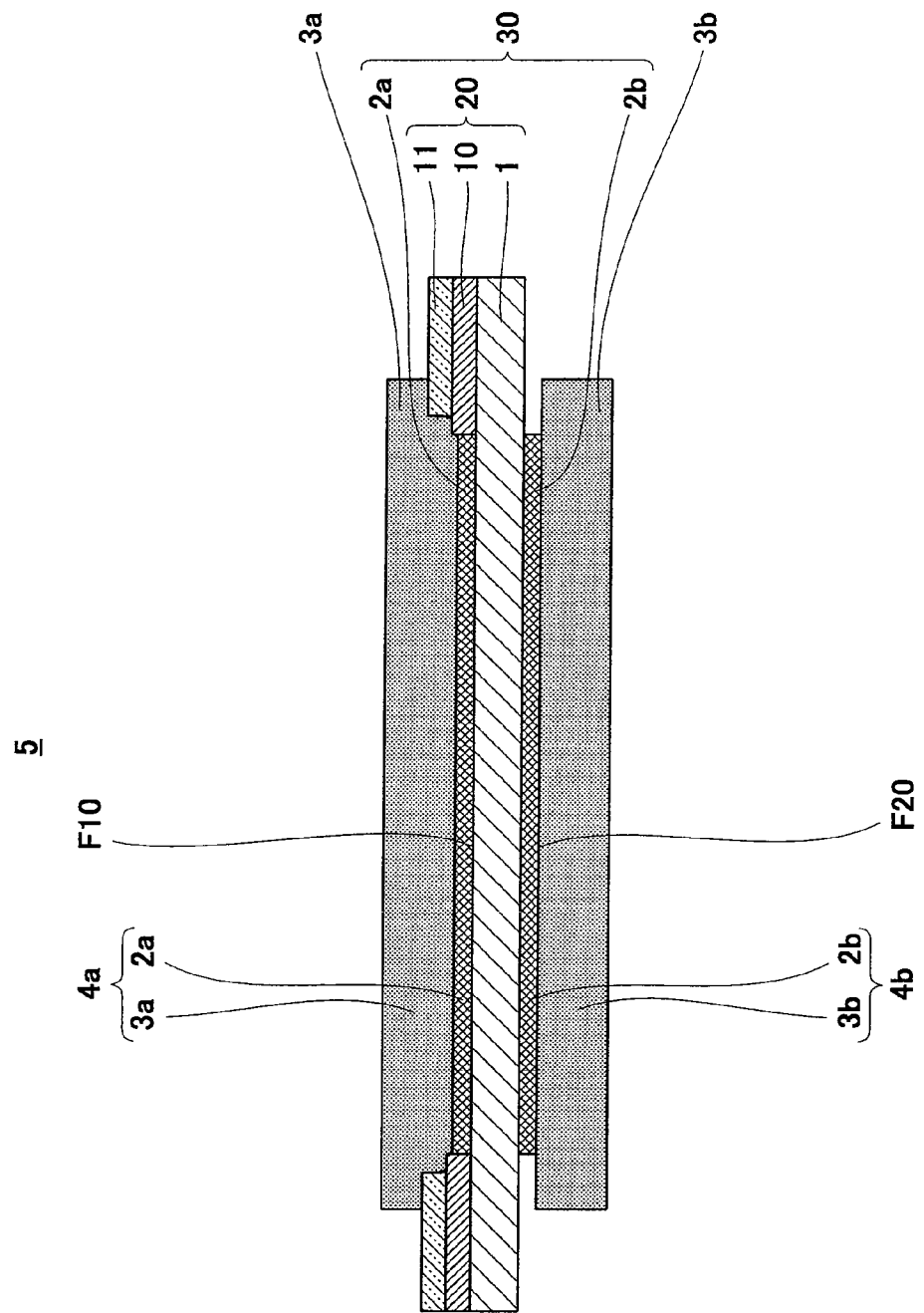
FIG. 9 is a cross-sectional view taken along line B-B of FIG. 8.

FIG. 8 is a perspective view schematically showing a schematic configuration of the MEA 5 in the cell 40 of the PEFC according to Embodiment 2 of the present invention when viewed obliquely from above. FIG. 9 is a cross-sectional view taken along line B-B of FIG. 8.

As shown in FIGS. 8 and 9, in the MEA 5 according to Embodiment 2, the first membrane reinforcing members 10 constitute a first pair 100a and a second pair 100b, and the second membrane reinforcing members 11 constitute a first pair 101a and a second pair 101b.

The first membrane reinforcing members 10 of the first pair 100a are disposed on the main surface F10 of the polymer electrolyte membrane 1 so as to respectively extend along one pair of opposed sides of the main surface F10. The second membrane reinforcing members 11 of the first pair 101a are respectively disposed on the main surfaces of the first membrane reinforcing members 10 of the first pair 100a so as to extend along a longitudinal direction of the first membrane reinforcing member 10 of the first pair 100a (so as to respectively extend along one pair of opposed sides of the main surface F10 of the polymer electrolyte membrane 1).

Moreover, the first membrane reinforcing members 10 of the second pair 100b are disposed on the main surface F20 of the polymer electrolyte membrane 1 so as to respectively extend along the other pair of opposed sides of the main surface F20. The second membrane reinforcing members 11 of the second pair 101b are respectively disposed on the main surfaces of the first membrane reinforcing members 10 of the second pair 100b so as to extend along the longitudinal direction of the first membrane reinforcing member 10 of the second pair 100b (so as to respectively extend along the other pair of opposed sides of the main surface F20 of the polymer electrolyte membrane 1).

As above, the first membrane reinforcing members 10 of the first pair 100a and the first membrane reinforcing members 10 of the second pair 100b are disposed to surround a peripheral portion of the polymer electrolyte membrane 1 (to extend along four sides of the polymer electrolyte membrane 1) as a whole. Moreover, when viewed from the thickness direction of the polymer electrolyte membrane 1, the first membrane reinforcing members 10 and the second membrane reinforcing members 11 are formed to overlap each other at four corner portions of the polymer electrolyte membrane 1.

Then, when viewed from the thickness direction of the polymer electrolyte membrane 1, each of the anode catalyst layer 2a and the cathode catalyst layer 2b is formed to be located between the first membrane reinforcing members 10 of the first pair 100a and between the first membrane reinforcing members 10 of the second pair 100b, and the anode catalyst layer 2a and the cathode catalyst layer 2b are formed to overlap each other. Moreover, the anode gas diffusion layer 3a is formed to cover the main surfaces of the anode catalyst layer 2a, the first membrane reinforcing member 10, and the second membrane reinforcing member 11, the cathode gas diffusion layer 3b is formed to cover the main surfaces of the cathode catalyst layer 2b, the first membrane reinforcing member 10, and the second membrane reinforcing member 11, and the anode gas diffusion layer 3a and the cathode gas diffusion layer 3b are formed to overlap each other when viewed from the thickness direction of the polymer electrolyte membrane 1.

In the MEA 5 according to Embodiment 2 formed as above, the membrane reinforcing member is formed to have the two-layer structure as with Embodiment 1. Therefore, the damage of the polymer electrolyte membrane 1 can be suppressed as with Embodiment 1. Further, as shown in FIG. 9, in the MEA 5 of the present embodiment, the end portion of the cathode gas diffusion layer 3b may directly contact the main surface F20 of the polymer electrolyte membrane 1, so that the polymer electrolyte membrane 1 may be damaged at this portion. However, even in this case, since the first and second membrane reinforcing members 10 and 11 are disposed on or above the main surface F10 of the polymer electrolyte membrane 1, the cross leakage of the reactant gas does not occur. Similarly, there is a portion where the end portion of the anode gas diffusion layer 3a may directly contact the main surface F10 of the polymer electrolyte membrane 1. However, since the first and second membrane reinforcing members 10 and 11 are disposed on or above the main surface F20 of the polymer electrolyte membrane 1 at this portion, the cross leakage of the reactant gas does not occur.

The cell 40 according to Embodiment 2 is the same as the cell 40 according to Embodiment 1 except that the gasket 17 is formed to fill the gap among the first and second membrane reinforcing members 10 and 11 and four sides of the polymer electrolyte membrane 1, so that a detailed explanation thereof is omitted.

Method for Manufacturing Membrane-Electrode Assembly

Next, the method for manufacturing the MEA 5 according to Embodiment 2 will be explained. Note that the method for manufacturing the cell 40 and the cell stack (PEFC) using the MEA 5 manufactured in accordance with the following explanation is not especially limited, and a known manufacturing technology of the PEFC can be adopted, so that a detailed explanation thereof is omitted.

First, a method for manufacturing a membrane-catalyst layer stack body 30 will be explained.

Figure 10:
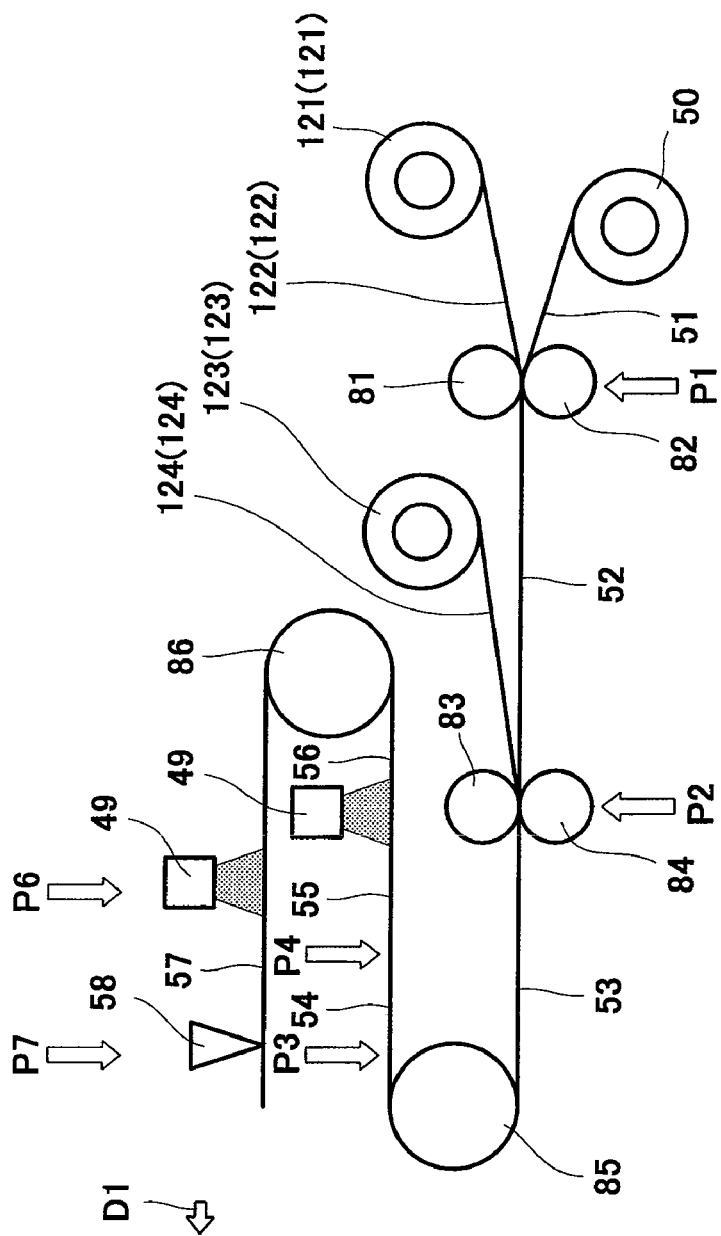
FIG. 10 is a schematic diagram schematically showing a part of a series of steps (treatment areas) of manufacturing the membrane-catalyst layer assembly in the MEA shown in FIGS. 8 and 9, and a part of a manufacturing line for the membrane-catalyst layer assembly.

FIG. 10 is a schematic diagram schematically showing a part of a series of steps (treatment areas) of manufacturing the membrane-catalyst layer assembly in the MEA 5 shown in FIGS. 8 and 9, and a part of a manufacturing line for the membrane-catalyst layer assembly.

As shown in FIG. 10, the membrane-catalyst layer stack body 30 is manufactured through: the first step P1 to fourth step P4 of bonding the polymer electrolyte membrane sheet and the membrane reinforcing member tape to form the membrane-membrane reinforcing member sheet assembly; the fifth step P5 and sixth step P6 of applying the catalyst layers to the membrane-membrane reinforcing member sheet assembly; and the seventh step P7 of cutting the membrane-catalyst layer assembly sheet. With this, the MEA 5 can be easily mass-produced at low cost.

First, the first step P1 will be explained.

Figure 11:
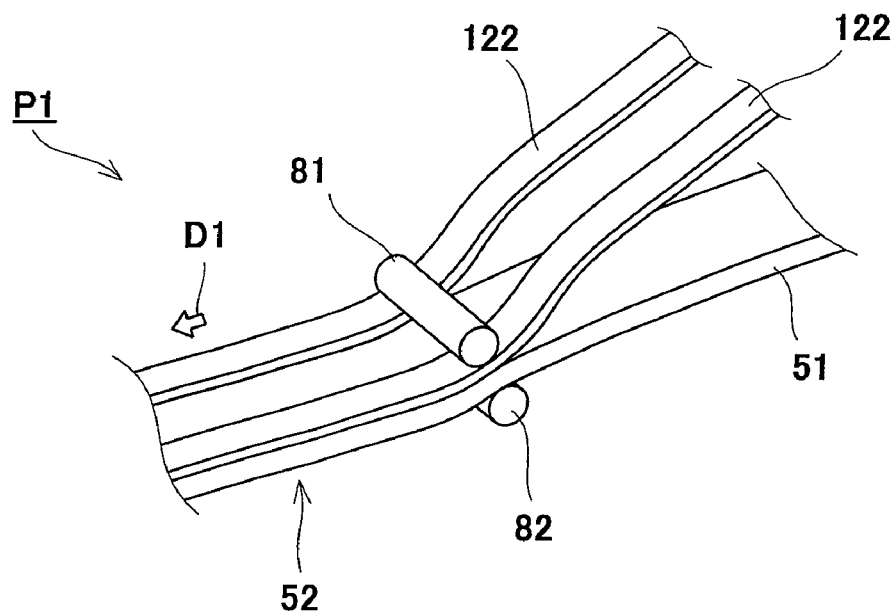
FIG. 11 is a schematic diagram for explaining a first step in a process of manufacturing the membrane-catalyst layer assembly shown in FIG. 10.

FIG. 11 is a schematic diagram for explaining the first step P1 in the process of manufacturing the membrane-catalyst layer assembly 30 shown in FIG. 10.

First, the polymer electrolyte membrane roll 50 and a first membrane reinforcing member roll 121 are manufactured using a known thin film manufacturing technique. The polymer electrolyte membrane roll 50 is obtained by rolling the elongated polymer electrolyte membrane sheet 51 (that is a member from which the polymer electrolyte membrane 1 shown in FIGS. 8 and 9 is obtained by cutting). The first membrane reinforcing member roll 121 is obtained by rolling a first membrane reinforcing member tape 122 (that is a member from which the polymer electrolyte membrane 1 shown in FIGS. 8 and 9 is obtained by cutting). Then, the polymer electrolyte membrane roll 50 and a pair of first membrane reinforcing member rolls 121 are positioned such that the first membrane reinforcing member tapes 122 are respectively located on side end portions of the polymer electrolyte membrane sheet 51.

Next, as shown in FIG. 10, by driving the rollers 85 and 86, the polymer electrolyte membrane sheet 51 is pulled out from the polymer electrolyte membrane roll 50, the first membrane reinforcing member tapes 122 are pulled out from the first membrane reinforcing member rolls 121, and these tapes are introduced into the thermocompression bonding device (not shown) having a pair of rollers 81 and 82. In the thermocompression bonding device, the polymer electrolyte membrane sheet 51 and the first membrane reinforcing member tapes 122 are boned to each other while they are proceeding in the proceeding direction D1 between the rollers 81 and 82 preheated. Thus, a tape-shaped membrane-membrane reinforcing member sheet assembly 52 is formed. Then, the membrane-membrane reinforcing member sheet assembly 52 proceeds to the area of the second step P2.

The pretreatment of applying the adhesive to the surfaces (contact surfaces) of the first membrane reinforcing member tapes 122 may be carried out before causing the surfaces (contact surfaces) of the first membrane reinforcing member tapes 122 to contact the polymer electrolyte membrane sheet 51. In this case, the pressure treatment may be carried out with the rollers 81 and 82 preheated, or only the pressure treatment may be carried out without the preheating. Moreover, it is preferable that the adhesive do not deteriorate the battery characteristics. For example, it may be possible to use a dispersion medium or a solvent containing a polymer electrolyte material (shown above as the constituent material of the polymer electrolyte membrane 1 for example) that is the same type or different type (having an affinity so as to be able to be adequately integrated with the polymer electrolyte membrane sheet 51) from the polymer electrolyte membrane sheet 51.

Next, the second step P2 will be explained.

Figure 12:
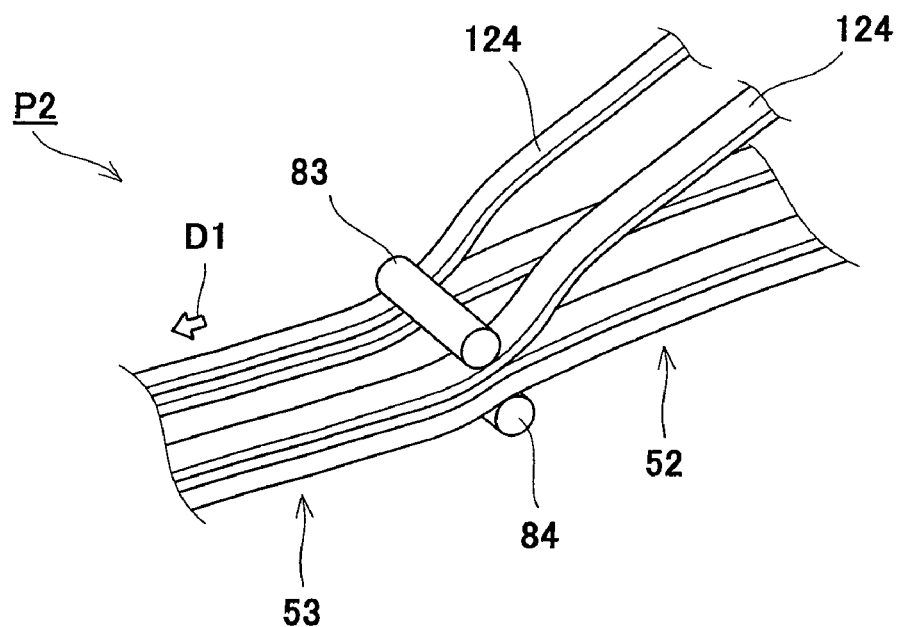
FIG. 12 is a schematic diagram for explaining a second step in the process of manufacturing the membrane-catalyst layer assembly shown in FIG. 10.

FIG. 12 is a schematic diagram for explaining the second step P2 in the process of manufacturing the membrane-catalyst layer assembly 30 shown in FIG. 10.

First, as with the first membrane reinforcing member roll 121, a second membrane reinforcing member roll 123 is manufactured. The second membrane reinforcing member roll 123 is obtained by rolling a second membrane reinforcing member tape 124 (that is a member from which the second membrane reinforcing member 11 shown in FIGS. 8 and 9 is obtained by cutting). Then, a pair of second membrane reinforcing member rolls 123 are positioned such that the second membrane reinforcing member tapes 124 are respectively located on side end portions of the membrane-membrane reinforcing member assembly 52.

Next, as shown in FIG. 12, the second membrane reinforcing member tapes 124 are pulled out from the second membrane reinforcing member rolls 123, and these tapes are introduced into the thermocompression bonding device (not shown) having a pair of rollers 82 and 83. In the thermocompression bonding device, the membrane-membrane reinforcing member sheet assembly 52 and the second membrane reinforcing member tapes 124 are bonded to each other while they are proceeding in the proceeding direction D1 between the rollers 83 and 84 preheated. Thus, a tape-shaped membrane-membrane reinforcing member sheet assembly 53 is formed. Then, by driving the rollers 85 and 86, the membrane-membrane reinforcing member sheet assembly 53 further moves in the proceeding direction D1, and turns by the roller 85, i.e., is turned over such that the rear surface (main surface opposite the main surface on which the first and second membrane reinforcing member tapes 122 and 124 are disposed) of the membrane-membrane reinforcing member sheet assembly 53 faces upward. Then, the membrane-membrane reinforcing member sheet assembly 53 proceeds to the area of the third step P3. As with the above case where the first membrane reinforcing member tapes 122 are bonded, the pretreatment of applying the adhesive to the surfaces (contact surfaces) of the second membrane reinforcing member tapes 124 may be carried out before causing the surfaces (contact surfaces) of the second membrane reinforcing member tapes 124 to contact the membrane-membrane reinforcing member sheet assembly 52.

Next, the third step P3 will be explained.

Figure 13:
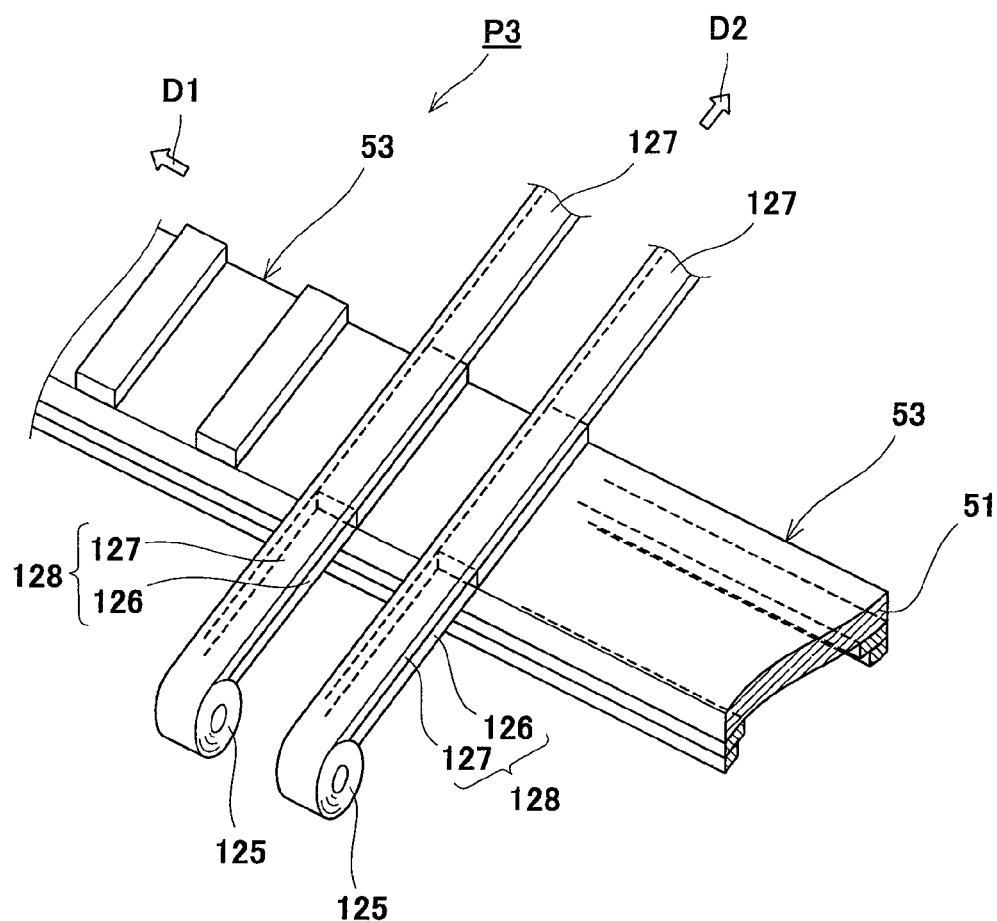
FIG. 13 is a schematic diagram for explaining a third step in the process of manufacturing the membrane-catalyst layer assembly shown in FIG. 10.

FIG. 13 is a schematic diagram for explaining the third step P3 in the process of manufacturing the membrane-catalyst layer assembly 30 shown in FIG. 10.

First, the configuration of the area of the third step P3 will be explained.

As shown in FIG. 13, a pair of base material-membrane reinforcing member rolls 125 are placed in the area of the third step P3. Each of the base material-membrane reinforcing member rolls 125 is obtained by rolling a base material-membrane reinforcing member tape stack body 128 formed such that a first membrane reinforcing member tape 126 is stacked on a base material tape 127. In addition, two cutters, not shown, are placed in the area of the third step P3. Each of the base material-membrane reinforcing member rolls 125 is placed such that a proceeding direction D2 of the base material-membrane reinforcing member tape stack body 128 pulled out from the base material-membrane reinforcing member roll 125 and the proceeding direction D1 of the membrane-membrane reinforcing member sheet assembly 53 are substantially perpendicular to each other. Moreover, the base material-membrane reinforcing member rolls 125 are placed such that a distance therebetween in the proceeding direction D1 is set to a predetermined distance so as to coincide with the size of the cut polymer electrolyte membrane 1.

Next, the treatment of the third step P3 will be explained.

First, the membrane-membrane reinforcing member sheet assembly 53 formed in the second step P2 proceeds to the area of the third step P3, and stops once. Then, the base material-membrane reinforcing member tape stack bodies 128 are pulled out from the pair of base material-membrane reinforcing member rolls 125 in the proceeding direction D2, and stop once. Next, only the first membrane reinforcing member tapes 126 of the base material-membrane reinforcing member tape stack bodies 128 are cut by two cutters, not shown, such that each cut piece has a predetermined length (length corresponding to the first membrane reinforcing member 10) from an end portion of the first membrane reinforcing member tape 126 of the base material-membrane reinforcing member tape stack body 128. At this time, the depth of cut by each of two cutters is adjusted to be the same as the thickness of the first membrane reinforcing member tape 126, so that the base material tape 127 of the base material-membrane reinforcing member tape stack body 128 is not cut. The base material tape 127 has an adequate mechanical strength (hardness, bendability) so as not to be cut by two cutters. Moreover, the first membrane reinforcing member tapes 126 are cut by two cutters herein, but may be cut by one cutter.

Next, the base material-membrane reinforcing member tape stack bodies 128 are further pulled out and stop such that the main surfaces of the first membrane reinforcing member tapes 126 contact the rear surface of the membrane-membrane reinforcing member sheet assembly 53. At this time, the base material-membrane reinforcing member tape stack bodies 128 stop such that when viewed from the thickness direction of the membrane-membrane reinforcing member sheet assembly 53, the end portion of the first membrane reinforcing member tape 126 coincide with a side end portion of the membrane-membrane reinforcing member sheet assembly 53.

Then, the base material-membrane reinforcing member tape stack bodies 128 are subjected to the heat treatment by a pressing means, not shown, and are subjected to the pressure treatment so as not to be misaligned with respect to the membrane-membrane reinforcing member sheet assembly 53. With this, the polymer electrolyte membrane sheet 51 of the membrane-membrane reinforcing member sheet assembly 53 and the first membrane reinforcing member tapes 126 of the base material-membrane reinforcing member tape stack bodies 128 are fusion-bonded to each other. Thus, a stack body of these members is fixed.

Next, the base material tape 127 is removed from the base material-membrane reinforcing member tape stack body 128 by a suitable means, and only the first membrane reinforcing member tape 126 (first membrane reinforcing member 10) is fixed to the membrane-membrane reinforcing member sheet assembly 53. Thus, a tape-shaped membrane-membrane reinforcing member sheet assembly 54 is formed. By driving the rollers 85 and 86, the membrane-membrane reinforcing member sheet assembly 54 formed as above moves in the proceeding direction D1. With this, the first membrane reinforcing members 10 are formed on the membrane-membrane reinforcing member sheet assembly 54 at predetermined intervals in a longitudinal direction of the membrane-membrane reinforcing member sheet assembly 54.

As with the above case where the first membrane reinforcing member tape 122 is bonded, the pretreatment of applying the adhesive to the rear surfaces (contact surfaces) of the first membrane reinforcing member tapes 126 may be carried out before the first membrane reinforcing member tapes 126 are subjected to the heat treatment by the pressing means, not shown.

Next, the fourth step P4 will be explained.

Figure 14:
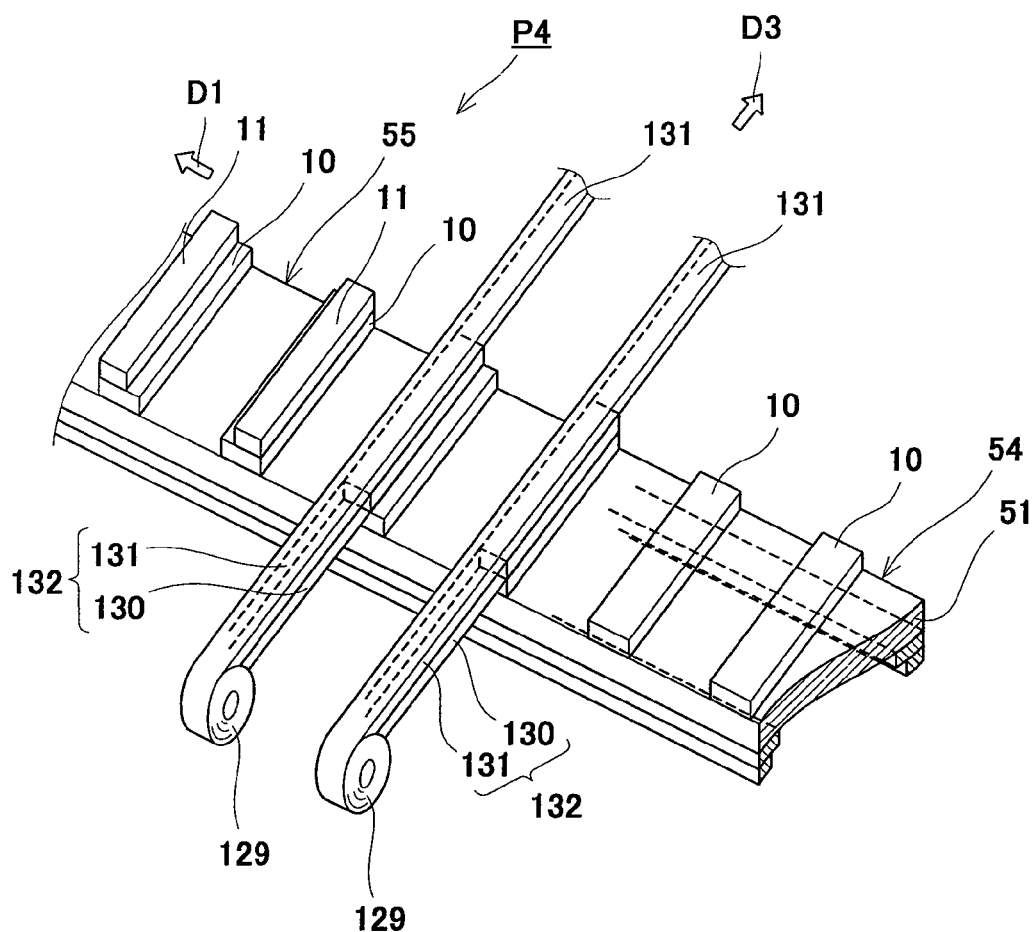
FIG. 14 is a schematic diagram for explaining a fourth step in the process of manufacturing the membrane-catalyst layer assembly shown in FIG. 10.

FIG. 14 is a schematic diagram for explaining the fourth step P4 in the process of manufacturing the membrane-catalyst layer assembly 30 shown in FIG. 10.

First, the configuration of the area of the fourth step P4 will be explained.

As shown in FIG. 14, the area of the fourth step P4 is the same in configuration as the area of the third step P3. To be specific, a pair of base material-membrane reinforcing member rolls 129 are placed in the area of the fourth step P4. Each of the base material-membrane reinforcing member rolls 129 is obtained by rolling a base material-membrane reinforcing member tape stack body 132 formed such that a second membrane reinforcing member tape 130 is stacked on a base material tape 131. In addition, two cutters, not shown, are placed in the area of the fourth step P4. Each of the base material-membrane reinforcing member rolls 129 is placed such that the proceeding direction D2 of the base material-membrane reinforcing member tape stack body 132 pulled out from the base material-membrane reinforcing member roll 129 and the proceeding direction D1 of the membrane-membrane reinforcing member sheet assembly 54 are substantially perpendicular to each other. Moreover, the base material-membrane reinforcing member rolls 129 are placed such that a distance therebetween in the proceeding direction D1 is set to a predetermined distance so as to coincide with the size of the cut polymer electrolyte membrane 1.

Next, the treatment of the fourth step P4 will be explained.

First, the membrane-membrane reinforcing member sheet assembly 54 formed in the third step P3 proceeds to the area of the fourth step P4, and stops once. Then, the base material-membrane reinforcing member tape stack bodies 132 are pulled out from the base material-membrane reinforcing member rolls 129 in the proceeding direction D2, and stop once.

Next, only the second membrane reinforcing member tapes 130 of the base material-membrane reinforcing member tape stack bodies 132 are cut by two cutters, not shown, such that each cut piece has a predetermined length (length corresponding to the second membrane reinforcing member 11) from an end portion of the second membrane reinforcing member tape 130 of the base material-membrane reinforcing member tape stack body 132. At this time, as with the third step P3, the depth of cut by each of two cutters is adjusted to be the same as the thickness of the second membrane reinforcing member tape 130, so that the base material tape 131 of the base material-membrane reinforcing member tape stack body 132 is not cut. The base material tape 131 has an adequate mechanical strength (hardness, bendability) so as not to be cut by two cutters. Moreover, the second membrane reinforcing member tapes 130 are cut by two cutters herein, but may be cut by one cutter.

Next, the base material-membrane reinforcing member tape stack bodies 132 are further pulled out and stop such that the main surfaces of the second membrane reinforcing member tapes 130 respectively contact the main surfaces of the first membrane reinforcing members 10 of the membrane-membrane reinforcing member sheet assembly 54. At this time, the base material-membrane reinforcing member tape stack bodies 132 stop such that when viewed from the thickness direction of the membrane-membrane reinforcing member sheet assembly 54, the end portion of the second membrane reinforcing member tape 130 coincide with a side end portion of the membrane-membrane reinforcing member sheet assembly 54.

Then, the base material-membrane reinforcing member tape stack bodies 132 are subjected to the heat treatment by the pressing means, not shown, and are subjected to the pressure treatment so as not to be misaligned with respect to the first membrane reinforcing members 10 of the membrane-membrane reinforcing member sheet assembly 54. With this, the first membrane reinforcing members 10 of the membrane-membrane reinforcing member sheet assembly 54 and the second membrane reinforcing member tapes 130 of the base material-membrane reinforcing member tape stack bodies 132 are fusion-bonded to each other. Thus, a stack body of these members is fixed.

Next, the base material tape 131 is removed from the base material-membrane reinforcing member tape stack body 132 by a suitable means, and only the second membrane reinforcing member tape 130 (second membrane reinforcing member 11) is fixed to the membrane-membrane reinforcing member sheet assembly 54. Thus, a tape-shaped membrane-membrane reinforcing member sheet assembly 55 is formed. The membrane-membrane reinforcing member sheet assembly 55 formed as above moves in the proceeding direction D1. With this, the second membrane reinforcing members 11 are respectively formed on the main surfaces of the first membrane reinforcing members 10 in the membrane-membrane reinforcing member sheet assembly 55.

As with the case where the first membrane reinforcing member tape 122 is bonded, the pretreatment of applying the adhesive to the rear surfaces (contact surfaces) of the second membrane reinforcing member tapes 130 may be carried out before the second membrane reinforcing member tapes 130 are subjected to the heat treatment by the pressing means, not shown. Moreover, the membrane-membrane reinforcing member sheet assembly 55 may be formed by using a base material-membrane reinforcing member bond roll obtained by rolling a base material-membrane reinforcing member bond tape formed such that the second membrane reinforcing member tape 130 is bonded to the base material-membrane reinforcing member tape stack body 128.

Next, the fifth step P5 will be explained.

Figure 15:
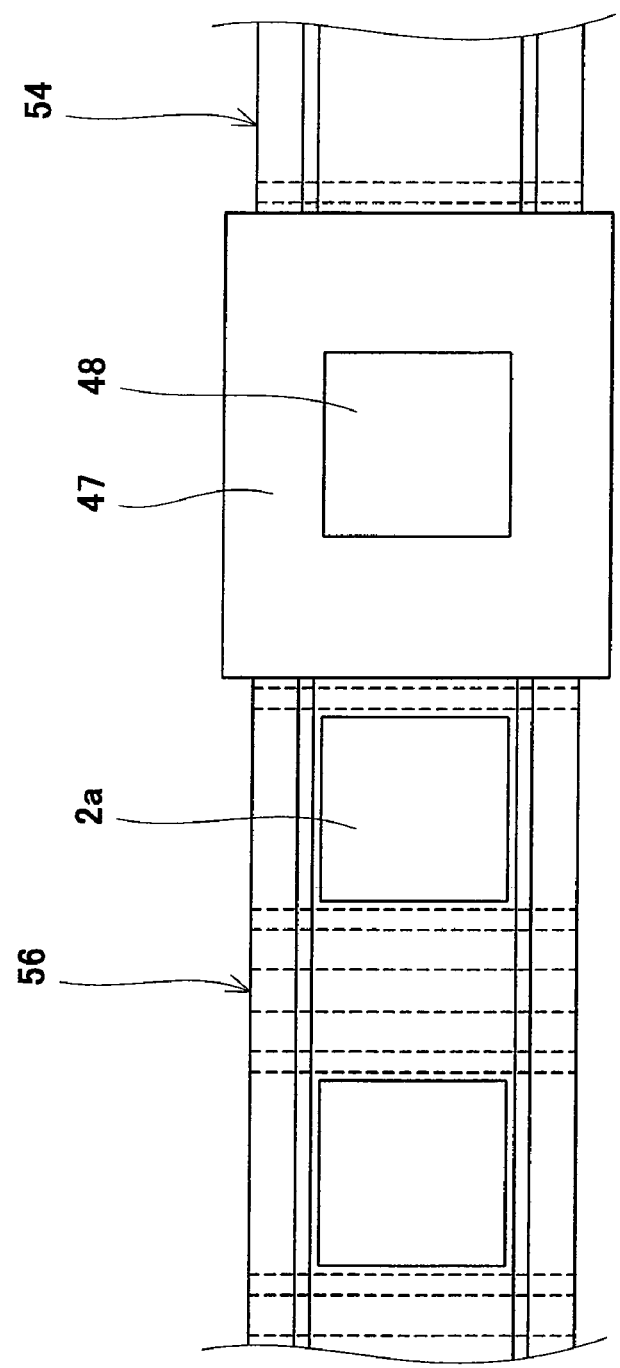
FIG. 15 is a schematic diagram for explaining a fifth step in the process of manufacturing the membrane-catalyst layer assembly shown in FIG. 10.

FIG. 15 is a schematic diagram for explaining the fifth step P5 in the process of manufacturing the membrane-catalyst layer assembly 30 shown in FIG. 10.

First, the configuration of the area of the fifth step P5 will be explained.

As shown in FIG. 15, in the area where the fifth step P5 is carried out, there are provided the mask 47 having the opening 48, the supporting means (supporting base for example), not shown, for supporting the membrane-membrane reinforcing member sheet assembly 55 from the rear surface of the membrane-membrane reinforcing member sheet assembly 55, and the catalyst layer forming device 49 (see FIG. 10). The shape of the opening 48 is designed to correspond to the shape of the main surface of the anode catalyst layer 2a shown in FIGS. 8 and 9. Moreover, the catalyst layer forming device includes the mechanism configured to, for example, apply or spray the catalyst layer forming ink to form the anode catalyst layer 2a on the main surface of the membrane-membrane reinforcing member sheet assembly 55. As this mechanism, a mechanism adopted for forming the catalyst layer of the gas diffusion layer of the known fuel cell may be adopted. For example, a mechanism designed based on the spraying method, the spin coating method, the doctor blade method, the die coating method, or the screen printing may be adopted.

Next, the treatment of the fifth step P5 will be explained.

First, the membrane-membrane reinforcing member sheet assembly 55 formed in the fourth step P4 proceeds to the fifth step P5, and stops once. Then, the membrane-membrane reinforcing member sheet assembly 55 is sandwiched between the mask 47 and the supporting base, not shown, to be fixed therebetween. Next, the catalyst layer forming device 49 starts operating. By, for example, applying the catalyst layer forming ink from above the opening 48 of the mask 47, the anode catalyst layer 2a is formed to cover the surface of the polymer electrolyte membrane sheet 51 of the membrane-membrane reinforcing member sheet assembly 55. After the anode catalyst layer 2a is formed, the mask 47 and the supporting base are separated from the membrane-membrane reinforcing member sheet assembly 55. By driving the rollers 85 and 86, the membrane-catalyst layer sheet 56 formed as above moves in the proceeding direction D1. With this, the anode catalyst layers 2a are formed on the membrane-catalyst layer sheet 56 at predetermined intervals in the longitudinal direction of the membrane-catalyst layer sheet 56. Then, by driving the rollers 85 and 86, the membrane-catalyst layer sheet 56 further moves in the proceeding direction D1, and turns by the roller 86, i.e., is turned over such that the rear surface (main surface opposite the main surface on which the anode catalyst layer 2a is formed) of the membrane-catalyst layer sheet 56 faces upward.

Next, the sixth step P6 will be explained.

Since the area of the sixth step P6 is the same in configuration as the area of the fifth step P5, a detailed explanation thereof is omitted.

As shown in FIG. 10, the membrane-catalyst layer sheet 56 formed in the fifth step P5 proceeds to the area of the sixth step P6, and stops once. Then, the membrane-catalyst layer sheet 56 is sandwiched between the mask 47 and the supporting base, not shown, to be fixed therebetween. Next, the catalyst layer forming device 49 starts operating. By, for example, applying the catalyst layer forming ink from above the opening 48 of the mask 47, the cathode catalyst layer 2b is formed to cover the rear surface of the polymer electrolyte membrane sheet 51 of the membrane-catalyst layer sheet 56. At this time, the cathode catalyst layer 2b is formed to overlap the anode catalyst layer 2a when viewed from the thickness direction of the membrane-catalyst layer sheet 56. Then, after the cathode catalyst layer 2b is formed, the mask 47 and the supporting base are separated from the membrane-catalyst layer sheet 56. By driving the rollers 85 and 86, the membrane-catalyst layer assembly sheet 57 formed as above moves in the proceeding direction D1. With this, the cathode catalyst layers 2b are formed on the membrane-catalyst layer assembly sheet 57 at predetermined intervals in the longitudinal direction of the membrane-catalyst layer assembly sheet 57 (the cathode catalyst layers 2b are formed to respectively overlap the anode catalyst layer 2a). Then, by driving the rollers 85 and 86, the membrane-catalyst layer assembly sheet 57 further moves in the proceeding direction D1.

The ingredient composition, the dryness, and the like of each of the anode catalyst layer 2a and the cathode catalyst layer 2b are adjusted so that each of the anode catalyst layer 2a and the cathode catalyst layer 2b has appropriate bendability. In addition, each of the anode catalyst layer 2a and the cathode catalyst layer 2b is subjected to such a treatment (for example, the supporting base is heated, and a dispersing agent of the catalyst layer forming ink is subjected to the drying treatment) that even in a case where the membrane-catalyst layer sheet 56 or the membrane-catalyst layer assembly sheet 57 is disposed upside down, the anode catalyst layer 2a or the cathode catalyst layer 2b does not fall off from the polymer electrolyte membrane sheet 51. Moreover, the drying treatment (for example, at least one of the heat treatment, the air blow treatment, and the degassing treatment) may be suitably carried out each time the anode catalyst layer 2a or the cathode catalyst layer 2b is formed.

Next, the seventh step P7 will be explained.

The cutting device 58 is provided in the area of the seventh step P7. The membrane-catalyst layer assembly sheet 57 formed in the sixth step P6 is introduced into the cutting device 58 in the area of the seventh step P7, and stops once. Then, the membrane-catalyst layer assembly sheet 57 is cut by the cutting mechanism of the cutting device 58 such that each cut piece has a preset size. Thus, the membrane-catalyst layer assembly 30 shown in FIGS. 8 and 9 is manufactured.

In the manufacturing line for the membrane-catalyst layer assembly 30 shown in FIG. 10, the polymer electrolyte membrane sheet 51 that is a material is caused to move as a single sheet until it becomes the membrane-catalyst layer assembly sheet 57. To cause the sheet to appropriately move in the proceeding direction D1, a towing mechanism, such as a capstan or a pair of rollers, for towing the sheet, a tension applying mechanism, such as a tensioner, for applying an appropriate tension to the sheet, and a sheet temporary holding and feeding mechanism, such as a dancer roller, for temporarily stopping the sheet at a predetermined area (the area of the fourth step P4 for example) and then rapidly feeding the sheet are provided at appropriate positions in the manufacturing line. However, since these are known in the art, explanations thereof are omitted.

Moreover, instead of the first step P1 and the second step P2, the membrane-membrane reinforcing member sheet assembly 53 may be manufactured in the following manner.

Figure 35:
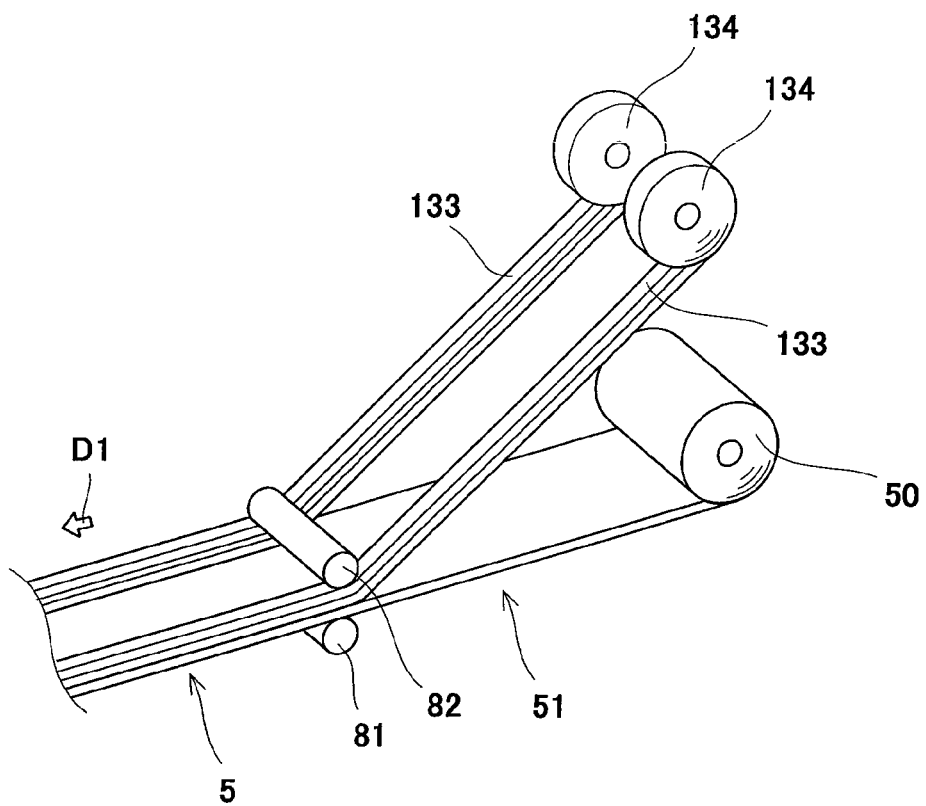
FIG. 35 is a schematic diagram schematically showing a part of a series of steps (treatment areas) of manufacturing a membrane-membrane reinforcing member sheet assembly shown in FIG. 10, and a part of a manufacturing line for the membrane-membrane reinforcing member sheet assembly.

FIG. 35 is a schematic diagram schematically showing a part of a series of steps (treatment areas) of manufacturing the membrane-membrane reinforcing member sheet assembly 53 shown in FIG. 10, and a part of a manufacturing line for the membrane-membrane reinforcing member sheet assembly 53.

As shown in FIG. 35, in the area of a tenth step P10 in which the membrane-membrane reinforcing member sheet assembly 53 is manufactured, there are provided the polymer electrolyte membrane roll 50 obtained by rolling the polymer electrolyte membrane sheet 51 and a pair of membrane reinforcing member rolls 134 each obtained by rolling a membrane reinforcing member assembly tape 133. In addition, the thermocompression bonding device (not shown) having the rollers 83 and 84 is placed in the area of a tenth step P10. Specifically, the polymer electrolyte membrane roll 50 and the pair of membrane reinforcing member rolls 134 are placed such that the membrane reinforcing member tapes 133 are respectively located on side end portions of the polymer electrolyte membrane sheet 51. Here, a method for manufacturing the membrane reinforcing member roll 134 will be explained in reference to FIG. 36.

Figure 36:
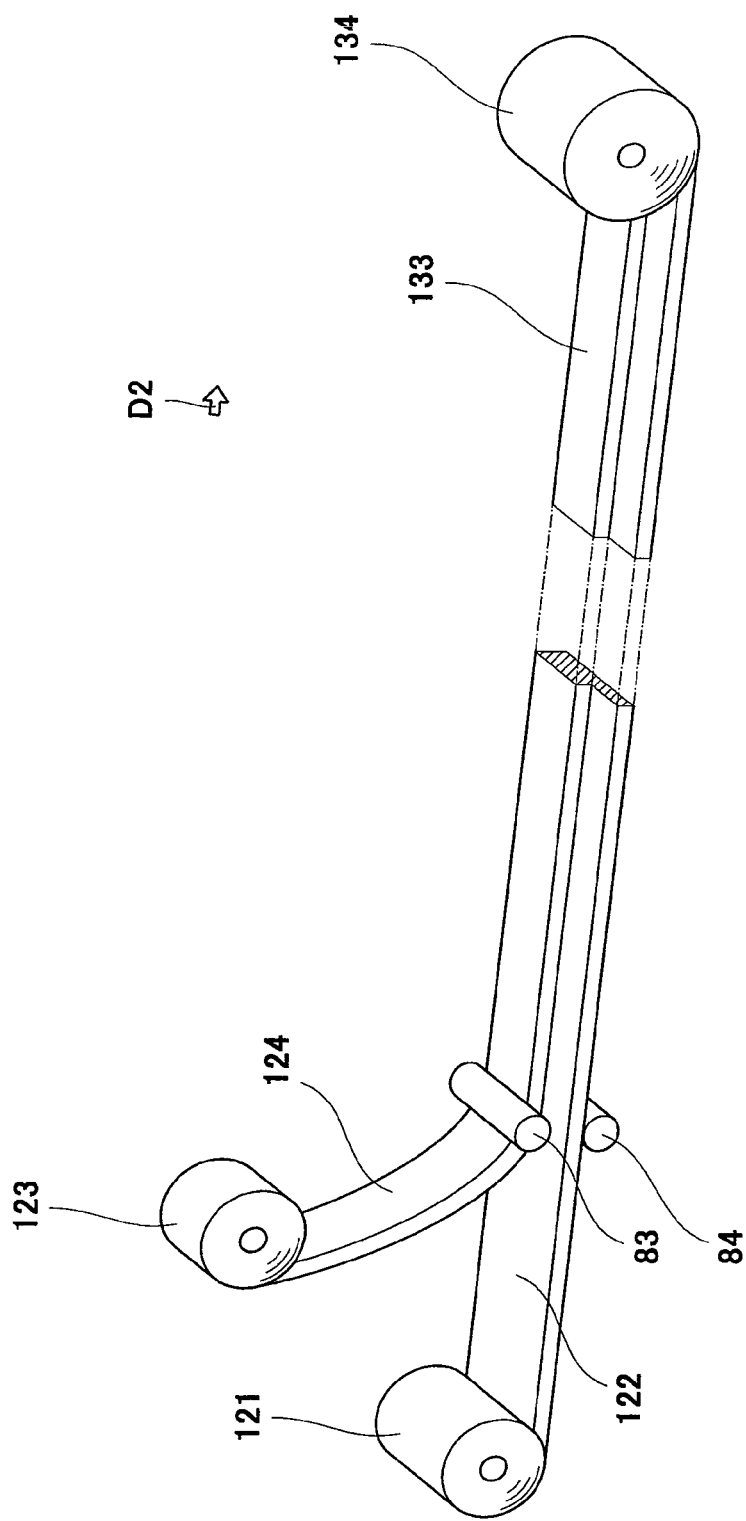
FIG. 36 is a schematic diagram for explaining a step of manufacturing a membrane reinforcing member roll shown in FIG. 35.

FIG. 36 is a schematic diagram for explaining a step of manufacturing the membrane reinforcing member roll 134 shown in FIG. 35.

First, the first membrane reinforcing member roll 121 and the second membrane reinforcing member roll 123 shown in FIGS. 12 and 13 are manufactured. The first membrane reinforcing member roll 121 is obtained by rolling the first membrane reinforcing member tape 122, and the second membrane reinforcing member roll 123 is obtained by rolling the second membrane reinforcing member tape 124. Then, the first membrane reinforcing member roll 121 and the second membrane reinforcing member roll 123 are positioned such that the second membrane reinforcing member tape 123 is located at a side end portion of the first membrane reinforcing member tape 121.

Next, as shown in FIG. 36, the first membrane reinforcing member tape 122 is pulled out from the first membrane reinforcing member roll 121, the second membrane reinforcing member tape 124 is pulled out from the second membrane reinforcing member roll 123, and these tapes are introduced into the thermocompression bonding device (not shown) having a pair of rollers 83 and 84. In the thermocompression bonding device, the first membrane reinforcing member tape 122 and the second membrane reinforcing member tape 124 are bonded to each other while they are proceeding in the proceeding direction D2 between the rollers 83 and 84 preheated. Thus, the membrane reinforcing member assembly tape 133 is formed. Then, the membrane reinforcing member assembly tape 133 is rolled to manufacture the membrane reinforcing member roll 134. The pretreatment of applying the adhesive to the surface (contact surface) of the second membrane reinforcing member tape 124 may be carried out before causing the surface (contact surface) of the second membrane reinforcing member tape 124 to contact the first membrane reinforcing member tape 122.

Next, the treatment of the tenth step P10 will be explained.

By a suitable means, the polymer electrolyte membrane sheet 51 is pulled out from the polymer electrolyte membrane roll 50, the membrane reinforcing member tapes 133 are pulled out from the membrane reinforcing member rolls 134, and these tapes are introduced into the thermocompression bonding device (not shown) having a pair of rollers 81 and 82. In the thermocompression bonding device, the polymer electrolyte membrane sheet 51 and the membrane reinforcing member tapes 133 are bonded to each other while they are proceeding in the proceeding direction D2 between the rollers 81 and 82 preheated. Thus, the tape-shaped membrane-membrane reinforcing member sheet assembly 53 is formed. The pretreatment of applying the adhesive to the surfaces (contact surfaces) of the membrane reinforcing member tapes 133 can be carried out before causing the surfaces (contact surfaces) of the membrane reinforcing member tapes 133 to contact the polymer electrolyte membrane sheet 51.

Next, the method for manufacturing the MEA 5 will be explained.

The anode gas diffusion layer 3*a* and the cathode gas diffusion layer 3*b* (carbon cloth for example) each obtained by cutting to have a suitable size are respectively bonded to the main surfaces of the anode catalyst layer 2*a* and the cathode catalyst layer 2*b* of the membrane-catalyst layer assembly 30 obtained as above. Thus, the MEA 5 is obtained. The MEA 5 may be formed after a water-repellent carbon layer is formed by, for example, applying a water-repellent carbon layer forming ink to the main surfaces of the anode catalyst layer 2*a* and the cathode catalyst layer 2*b* or the main surfaces of the anode gas diffusion layer 3*a* and the cathode gas diffusion layer 3*b*.

Moreover, the MEA 5 may be formed such that before the sixth step P6, the anode gas diffusion layer 3*a* and the cathode gas diffusion layer 3*b* are respectively bonded to the main surfaces of the anode catalyst layer 2*a* and the cathode catalyst layer 2*b* of the membrane-catalyst layer assembly sheet 57. In this case, a membrane-electrode sheet may be formed such that the precut anode gas diffusion layer 3*a* and the precut cathode gas diffusion layer 3*b* are respectively bonded to the main surfaces of the anode catalyst layer 2*a* and the cathode catalyst layer 2*b*, or may be formed such that the tape-shaped anode gas diffusion layer 3*a* and the tape-shaped cathode gas diffusion layer 3*b* are respectively bonded to the main surfaces of the anode catalyst layer 2*a* and the cathode catalyst layer 2*b*, and are then cut. Then, a pair of obtained membrane-electrode sheets are cut in the same manner as in the sixth step P6. Thus, the MEA 5 is formed. The MEA 5 may be formed after the water-repellent carbon layer is formed by, for example, applying the water-repellent carbon layer forming ink to the main surfaces of the anode catalyst layer 2*a* and the cathode catalyst layer 2*b* or the main surfaces of the anode gas diffusion layer 3*a* and the cathode gas diffusion layer 3*b*.

As above, in accordance with the PEFC according to Embodiment 2, the damage of the polymer electrolyte membrane 1 can be surely suppressed, the durability can be improved, and a highly reliable fuel cell can be provided. In addition, the PEFC can be mass-produced at low cost.

Embodiment 3

The PEFC according to Embodiment 3 and the PEFC according to Embodiment 2 are the same in basic configuration as each other, but are different from each other as follows.

Figure 16:
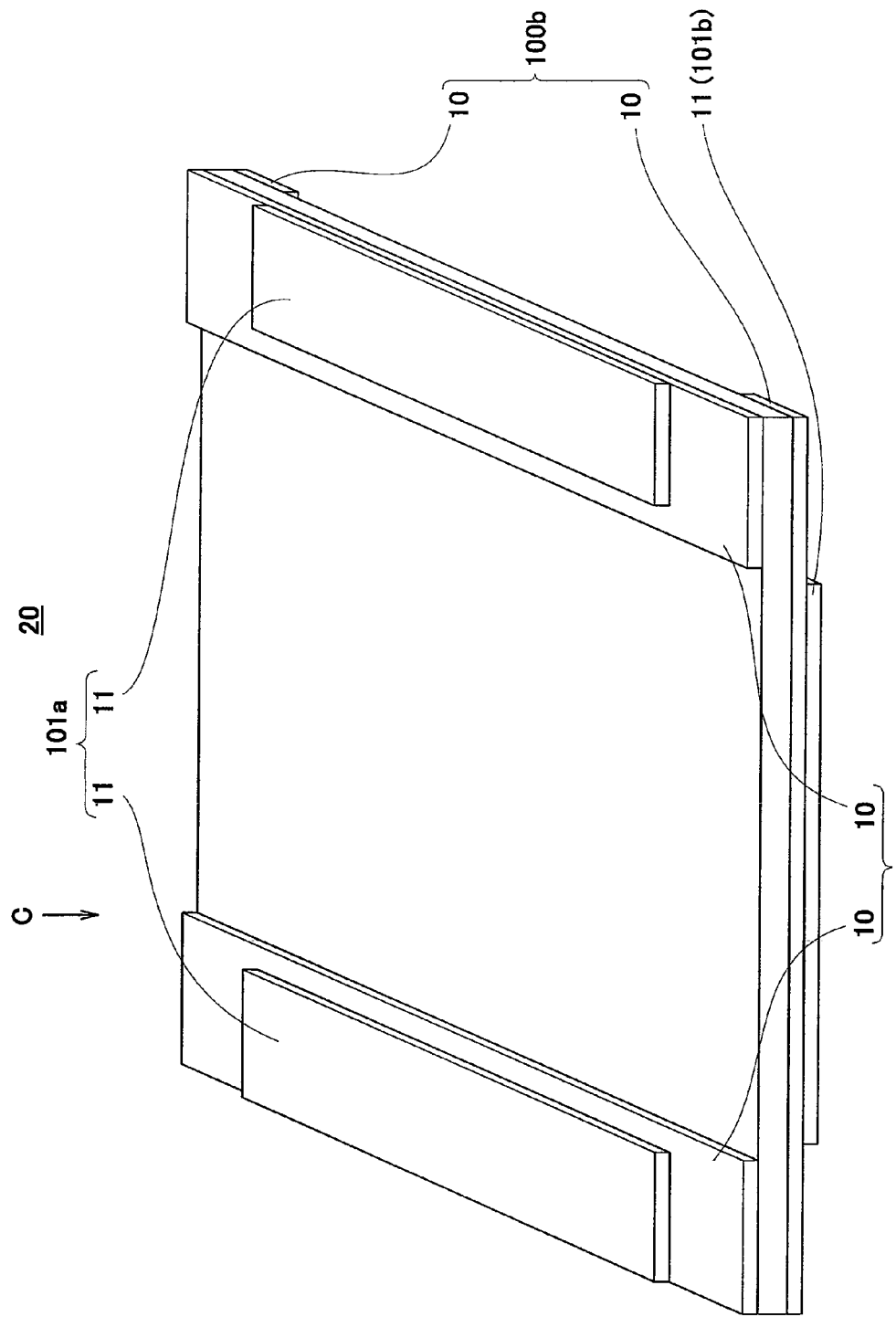
FIG. 16 is a perspective view schematically showing a schematic configuration of the membrane-membrane reinforcing member assembly of the cell in a polymer electrolyte fuel cell according to Embodiment 3 of the present invention when viewed obliquely from above.
Figure 17:
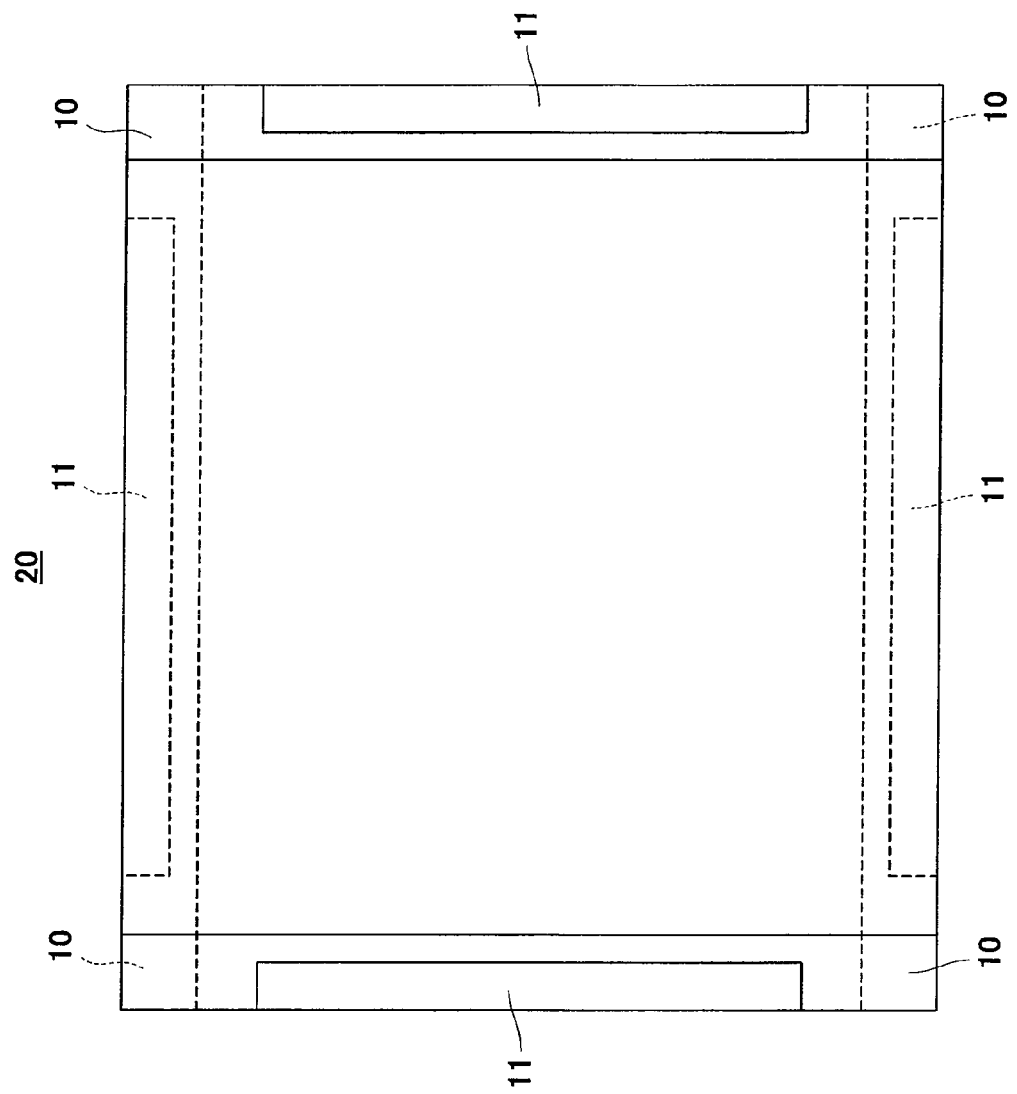
FIG. 17 is a schematic diagram showing the membrane-membrane reinforcing member assembly when viewed from a direction indicated by an arrow C of FIG. 16.
Figure 18:
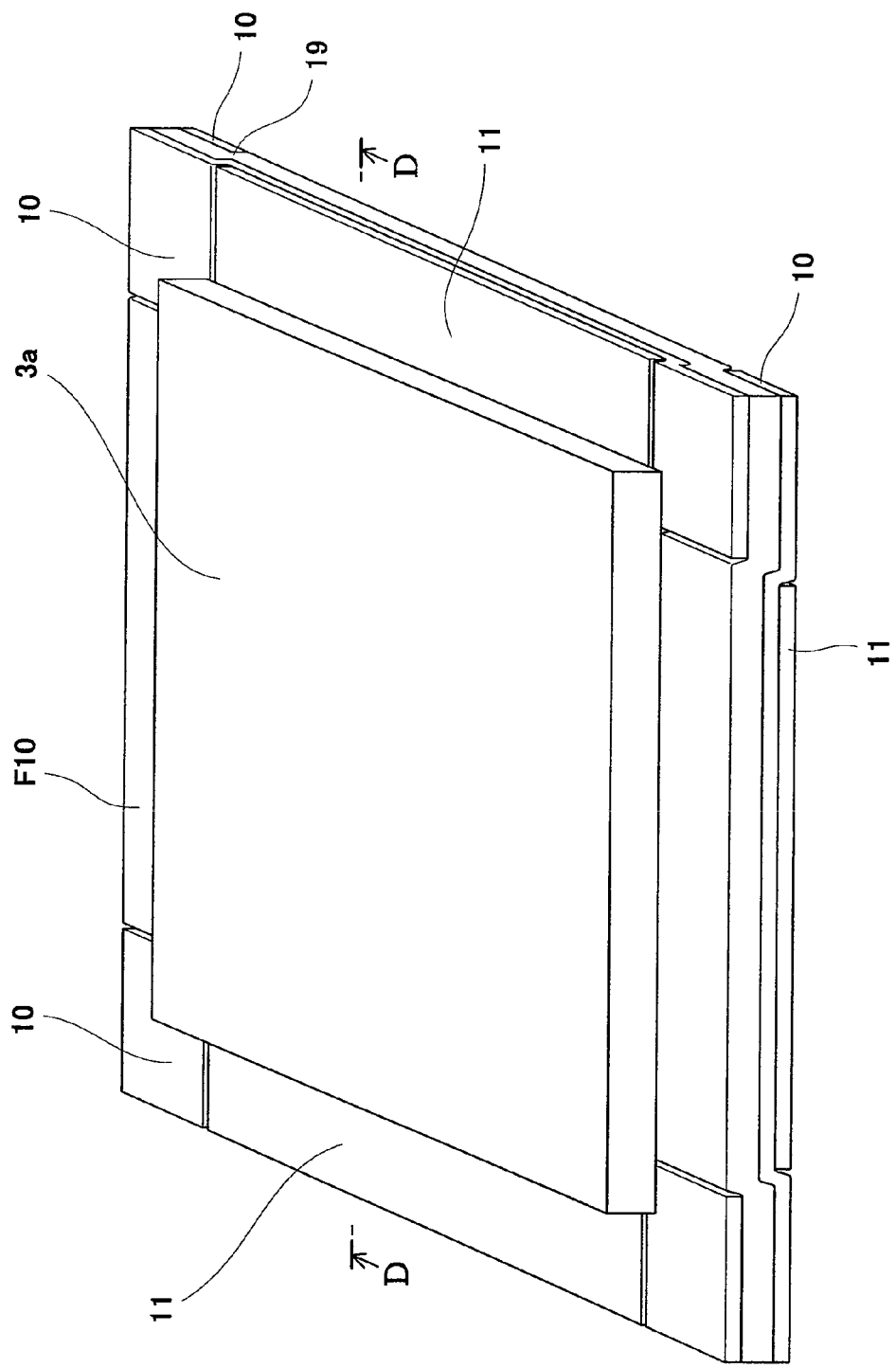
FIG. 18 is a perspective view schematically showing a schematic configuration of the MEA incorporated in a cell stack according to Embodiment 3 of the present invention when viewed obliquely from above.
Figure 19:
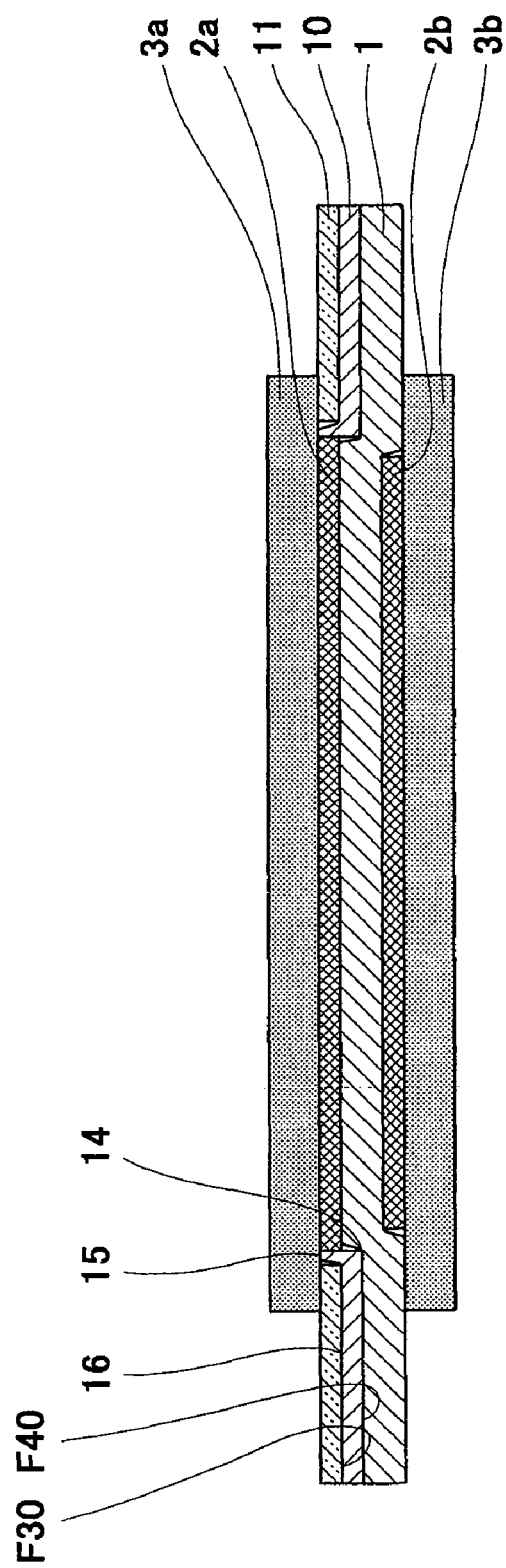
FIG. 19 is a cross-sectional view taken along line D-D of FIG. 18.

FIG. 16 is a perspective view schematically showing a schematic configuration of the membrane-membrane reinforcing member assembly 20 of the cell 40 in the PEFC according to Embodiment 3 of the present invention when viewed obliquely from above. FIG. 17 is a schematic diagram showing the membrane-membrane reinforcing member assembly 20 when viewed from a direction indicated by an arrow C of FIG. 16. FIG. 18 is a perspective view schematically showing a schematic configuration of the MEA 5 incorporated in the cell stack when viewed obliquely from above. FIG. 19 is a cross-sectional view taken along line D-D of FIG. 18.

As shown in FIGS. 16 and 17, in the membrane-membrane reinforcing member assembly 20 according to Embodiment 3, when viewed from the thickness direction of the polymer electrolyte membrane 1, each of the second membrane reinforcing members 11 of the first pair 101*a* constituting the second membrane reinforcing members 11 is placed so as to be located between the first membrane reinforcing members 10 of the second pair 100*b* and placed such that a predetermined interval is provided between an end surface of the second membrane reinforcing member 11 of the first pair 101*a* in a width direction of the second membrane reinforcing member 11 and an end surface of the first membrane reinforcing member 10 of the second pair 100*b* in a longitudinal direction of the first membrane reinforcing member 10. Moreover, when viewed from the thickness direction of the polymer electrolyte membrane 1, each of the second membrane reinforcing members 11 of the second pair 101*b* is placed so as to be located between the first membrane reinforcing members 10 of the first pair 100*a* and placed such that a predetermined interval is provided between an end surface of the second membrane reinforcing member 11 of the second pair 101*b* in the width direction of the second membrane reinforcing member 11 and an end surface of the first membrane reinforcing member 10 of the first pair 100*a* in the longitudinal direction of the first membrane reinforcing member 10. The predetermined interval is slightly larger than the thickness of the second membrane reinforcing member 11.

Then, as shown in FIGS. 18 and 19, in a state where the polymer electrolyte membrane 1 and the first membrane reinforcing member 10 are incorporated in the cell stack, they bend at bent portions 19. In addition, the outer surface of the second membrane reinforcing member 11, a portion of the outer surface F30 of the first membrane reinforcing member 10 on which portion the second membrane reinforcing member 11 is not disposed, and a portion of the peripheral portion of the main surface F10 of the polymer electrolyte membrane 1 on which portion the first membrane reinforcing member 10 is not disposed (the outer surface of the second membrane reinforcing member 11, a portion of the outer surface F30 of the first membrane reinforcing member 10 on which portion the second membrane reinforcing member 11 is not disposed, and a portion of the peripheral portion of the main surface F20 of the polymer electrolyte membrane 1 on which portion the first membrane reinforcing member 10 is not disposed) are flush with one another. It is preferable that each of the polymer electrolyte membrane 1 and the first membrane reinforcing member 10 have extensibility so as to be able to be bent as above.

As above, in a case where the first membrane reinforcing member 10 is incorporated in the cell stack, it is sandwiched between the anode separator 6a and the polymer electrolyte membrane 1 (via the gasket 17 or the anode gas diffusion layer 3a), and compressed in the thickness direction. In this case, the portion 16 of the outer surface F30 of the first membrane reinforcing member 10 on which portion the second membrane reinforcing member 11 is disposed is compressed more than the inner peripheral portion 15 of the outer surface F30. The pressure applied to the portion 16 is higher than the pressure applied to the inner peripheral portion 15 with which the anode gas diffusion layer 3a directly contacts. On this account, the pressure applied to the corner portion 14 formed by the inner surface F40 and inner peripheral surface of the first membrane reinforcing member 10 is low. Therefore, although the corner portion 14 line-contacts the main surface F10 of the polymer electrolyte membrane 1, excessive pressure is not applied to the polymer electrolyte membrane 1, so that the damage of the polymer electrolyte membrane 1 can be suppressed.

Next, the method for manufacturing the membrane-catalyst layer assembly 30 according to Embodiment 3 will be explained. The method for manufacturing the membrane-catalyst layer assembly 30 according to Embodiment 3 is basically the same as the method for manufacturing the membrane-catalyst layer assembly 30 according to Embodiment 2, but the second step P2 and the fourth step P4 are different.

First, the second membrane reinforcing members 11 are stacked on a base material tape 111 at predetermined intervals to obtain a base material-membrane reinforcing member stack body 112. The base material-membrane reinforcing member stack body 112 is rolled to prepare a base material-membrane reinforcing member roll 113.

Figure 20:
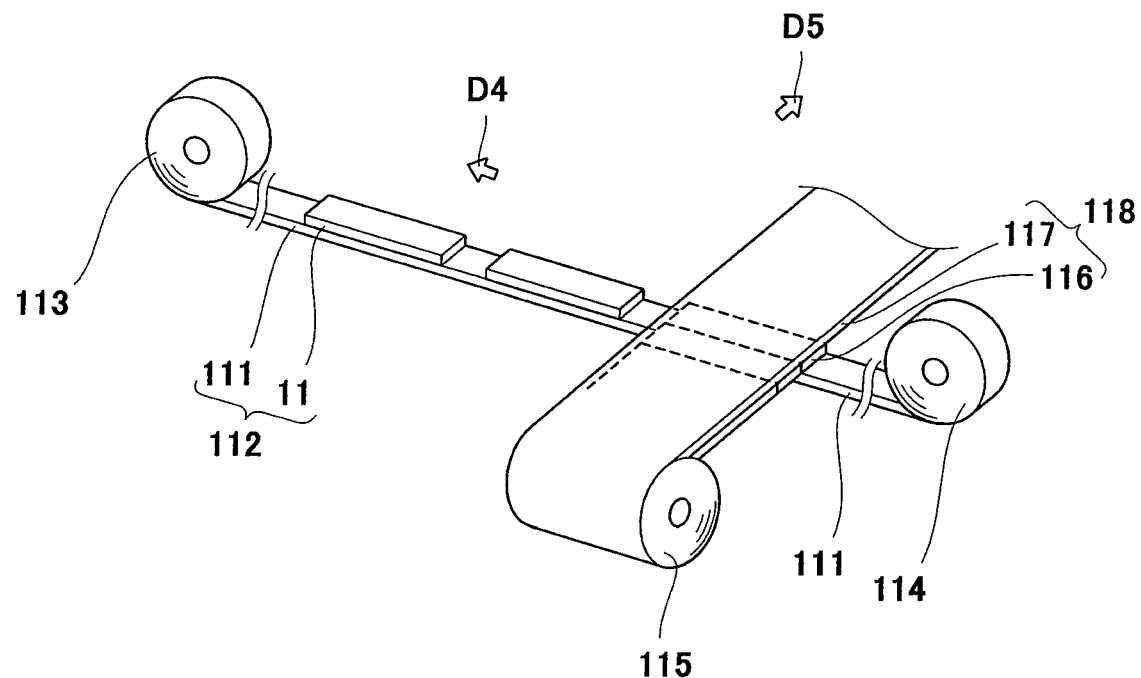
FIG. 20 is a schematic diagram schematically showing the treatment area and manufacturing line for manufacturing a base material-membrane reinforcing member roll.

FIG. 20 is a schematic diagram schematically showing the treatment area and manufacturing line for manufacturing the base material-membrane reinforcing member roll 113.

First, the configuration of the treatment area will be explained.

As shown in FIG. 20, a base material roll 114 and a base material-membrane reinforcing member roll 115 are placed in the treatment area. The base material roll 114 is obtained by rolling the base material tape 111, and the base material-membrane reinforcing member roll 115 is obtained by rolling a base material-membrane reinforcing member stack body 118 formed such that a membrane reinforcing member tape 116 is stacked on a base material tape 117. In addition, a cutter and a pressing means, not shown, are placed in the treatment area. Specifically, the base material roll 114 and the base material-membrane reinforcing member roll 115 are placed such that a proceeding direction D4 of the base material tape 111 pulled out from the base material roll 114 and a proceeding direction D5 of the base material-membrane reinforcing member stack body 118 pulled out from the base material-membrane reinforcing member roll 115 are substantially perpendicular to each other. The length of the base material-membrane reinforcing member roll 115 in the width direction is the same as the length of the second membrane reinforcing member 11 in the longitudinal direction.

Next, a method for manufacturing the base material-membrane reinforcing member roll 113 will be explained.

The base material tape 111 is pulled out from the base material roll 114 in the proceeding direction D4, the base material-membrane reinforcing member stack body 118 is pulled out from the base material-membrane reinforcing member roll 115 in the proceeding direction D5, and both the base material tape 111 and the base material-membrane reinforcing member stack body 118 stop once. Then, only the membrane reinforcing member tape 116 of the base material-membrane reinforcing member stack body 118 is cut by the cutter, not shown, such that each cut piece has a predetermined length (length corresponding to the width of the second membrane reinforcing member 11) from the end portion of the membrane reinforcing member tape 116 of the base material-membrane reinforcing member stack body 118.

Next, the base material-membrane reinforcing member stack body 118 is further pulled out in the proceeding direction D5, and stops once. Then, the membrane reinforcing member tape 116 of the base material-membrane reinforcing member stack body 118 and the base material tape 111 are fixed to each other by the pressing means, not shown.

Next, the base material tape 117 is removed from the base material-membrane reinforcing member stack body 118 by a suitable means, and only the membrane reinforcing member tape 116 is fixed to the main surface of the base material tape 111. Thus, the base material-membrane reinforcing member stack body 112 is formed. The base material-membrane reinforcing member stack body 112 formed as above moves in the proceeding direction D4. With this, the second membrane reinforcing members 11 are fixed to the base material-membrane reinforcing member stack body 112 at predetermined intervals in a longitudinal direction of the base material-membrane reinforcing member stack body 112. Then, the base material-membrane reinforcing member stack body 112 is rolled to form the base material-membrane reinforcing member roll 113. The pretreatment of applying the adhesive to the surface (contact surface) of the membrane reinforcing member tape 116 may be carried out before the membrane reinforcing member tape 116 is subjected to the pressure treatment by the pressing means, not shown.

Next, the second step P2 will be explained.

Figure 21:
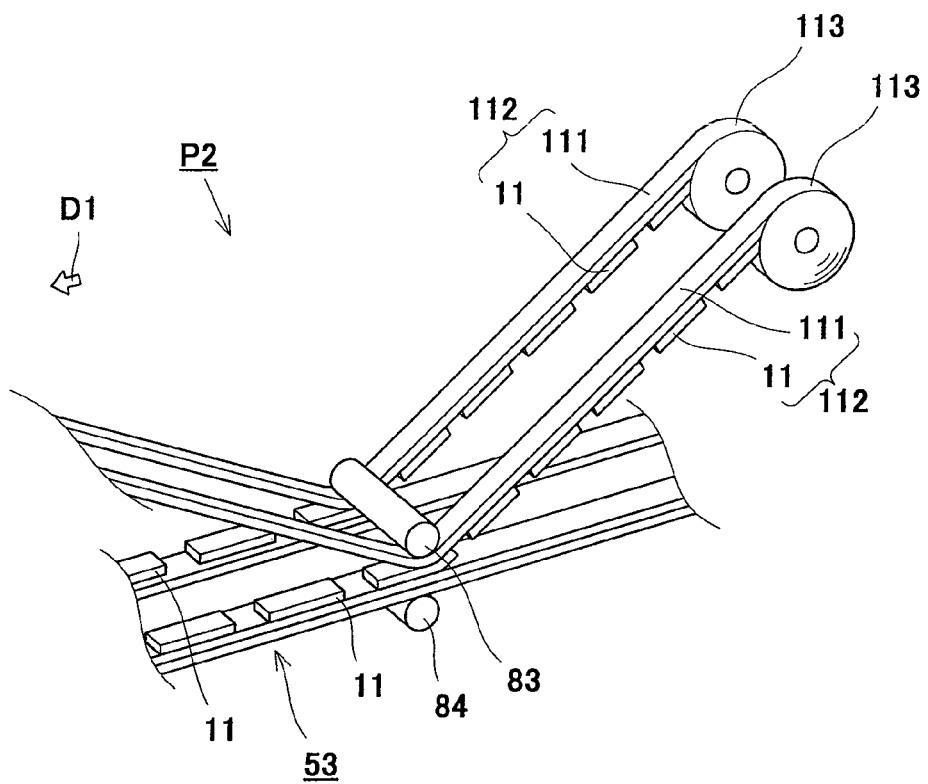
FIG. 21 is a schematic diagram for explaining the second step in the process of manufacturing the membrane-catalyst layer assembly according to Embodiment 3.

FIG. 21 is a schematic diagram for explaining the second step P2 in the process of manufacturing the membrane-catalyst layer assembly 30 according to Embodiment 3.

As shown in FIG. 21, in the area of the second step P2, the membrane-membrane reinforcing member sheet assembly 52 and a pair of base material-membrane reinforcing member rolls 113 are positioned such that a pair of base material-membrane reinforcing member stack bodies 112 are respectively located at side end portions of the membrane-membrane reinforcing member sheet assembly 52.

The membrane-membrane reinforcing member sheet assembly 52 formed in the first step P1 proceeds to the area of the second step P2, and stops once. Then, the base material-membrane reinforcing member stack bodies 112 are pulled out from the base material-membrane reinforcing member rolls 113, and the base material-membrane reinforcing member stack bodies 112 and the membrane-membrane reinforcing member sheet assembly 52 are introduced into the thermocompression bonding device (not shown) having a pair of rollers 83 and 84. In the thermocompression bonding device, the membrane-membrane reinforcing member sheet assembly 52 and the base material-membrane reinforcing member stack bodies 112 are bonded to each other while they are proceeding in the proceeding direction D1 between the rollers 83 and 84 preheated. Next, the base material tape 111 is removed from the base material-membrane reinforcing member stack body 112 by a suitable means, so that only the second membrane reinforcing member 11 is fixed to the membrane-membrane reinforcing member sheet assembly 52. Thus, the membrane-membrane reinforcing member sheet assembly 53 is formed.

Next, the fourth step P4 will be explained.

Figure 22:
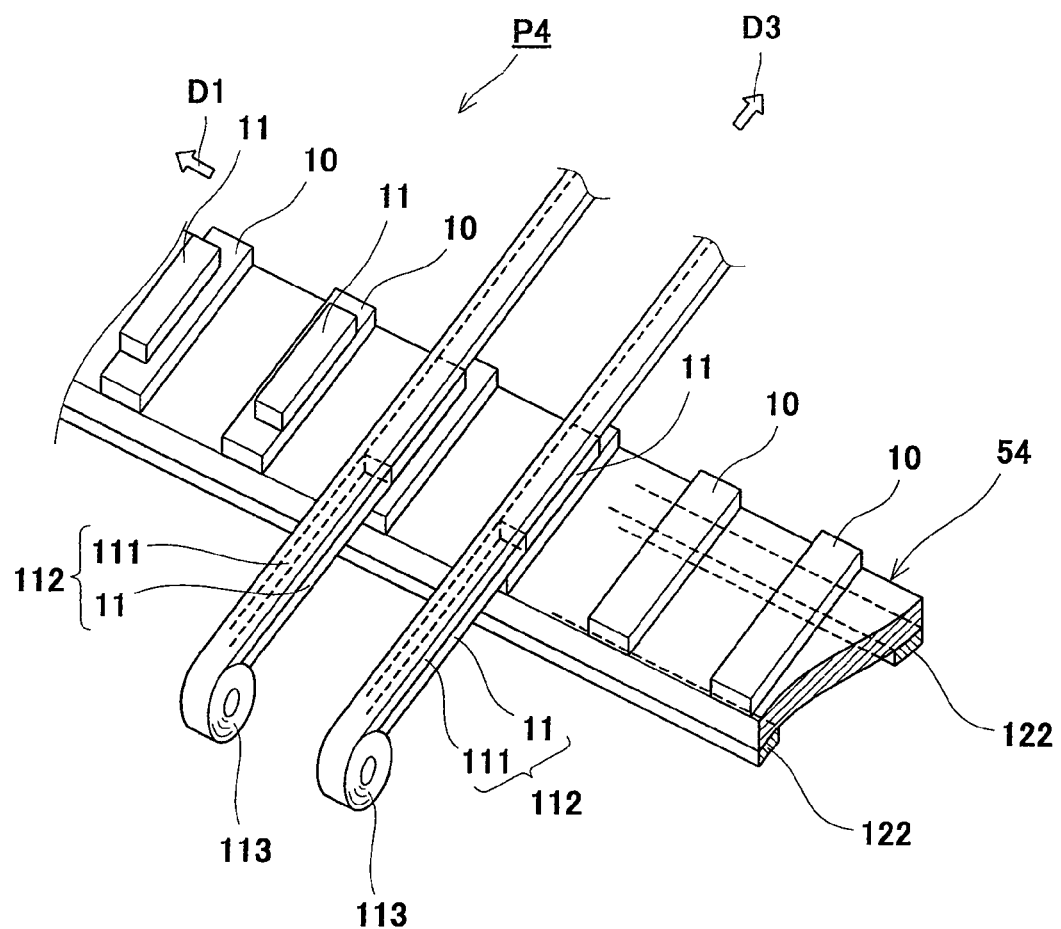
FIG. 22 is a schematic diagram for explaining the fourth step in the process of manufacturing the membrane-catalyst layer assembly according to Embodiment 3.

FIG. 22 is a schematic diagram for explaining the fourth step P4 in the process of manufacturing the membrane-catalyst layer assembly 30 according to Embodiment 3.

First, the configuration of the area of the fourth step P4 will be explained.

As shown in FIG. 22, in the area of the fourth step P4, each of the base material-membrane reinforcing member rolls 113 is placed such that a proceeding direction D3 the base material-membrane reinforcing member stack body 112 pulled out from the base material-membrane reinforcing member roll 113 and the proceeding direction D1 of the membrane-membrane reinforcing member sheet assembly 54 are substantially perpendicular to each other. Moreover, the base material-membrane reinforcing member rolls 113 are placed such that a distance therebetween in the proceeding direction D1 is set to a predetermined distance so as to coincide with the size of the cut polymer electrolyte membrane 1.

Next, the treatment of the fourth step P4 will be explained.

First, the membrane-membrane reinforcing member sheet assembly 54 formed in the third step P3 proceeds to the area of the fourth step P4, and stops once. Then, the base material-membrane reinforcing member stack bodies 112 are pulled out from the pair of base material-membrane reinforcing member rolls 113 in the proceeding direction D2 and stop such that the main surfaces of the second membrane reinforcing members 11 respectively contact the main surfaces of the first membrane reinforcing members 10 of the membrane-membrane reinforcing member sheet assembly 54. At this time, the base material-membrane reinforcing member stack bodies 112 stop such that when viewed from the thickness direction of the membrane-membrane reinforcing member sheet assembly 54, each of the second membrane reinforcing members 11 is located between the first membrane reinforcing member tapes 122, and a predetermined interval is provided between the end surface of the second membrane reinforcing member 11 in the width direction of the second membrane reinforcing member 11 and the end surface of the first membrane reinforcing member tape 122 in the longitudinal direction of the first membrane reinforcing member tape 122.

Then, the base material-membrane reinforcing member stack bodies 112 are subjected to the heat treatment by the pressing means, not shown, and are subjected to the pressure treatment so as not to be misaligned with respect to the first membrane reinforcing members 10 of the membrane-membrane reinforcing member sheet assembly 54. With this, the first membrane reinforcing members 10 of the membrane-membrane reinforcing member sheet assembly 54 and the second membrane reinforcing members 11 of the base material-membrane reinforcing member stack bodies 112 are fusion-bonded to each other. Thus, a stack body of these members is fixed.

Next, the base material tape 111 is removed from the base material-membrane reinforcing member stack body 112 by a suitable means, and only the second membrane reinforcing member 11 is fixed to the membrane-membrane reinforcing member sheet assembly 54. Thus, the tape-shaped membrane-membrane reinforcing member sheet assembly 55 is formed.

As above, in accordance with the PEFC according to Embodiment 3, the damage of the polymer electrolyte membrane 1 can be surely suppressed, the durability can be improved, and a highly reliable fuel cell can be provided. In addition, the PEFC can be mass-produced at low cost.

Embodiment 4

In the membrane-membrane reinforcing member assembly according to Embodiments 1 to 3, an inner edge of the first membrane reinforcing member 10 is located inwardly of the polymer electrolyte membrane 1 as compared to an inner edge of the second membrane reinforcing member 11. However, in the membrane-membrane reinforcing member assembly according to Embodiment 4 of the present invention, the inner edge of the second membrane reinforcing member 11 is located inwardly as compared to the inner edge of the first membrane reinforcing member 10.

Figure 23:
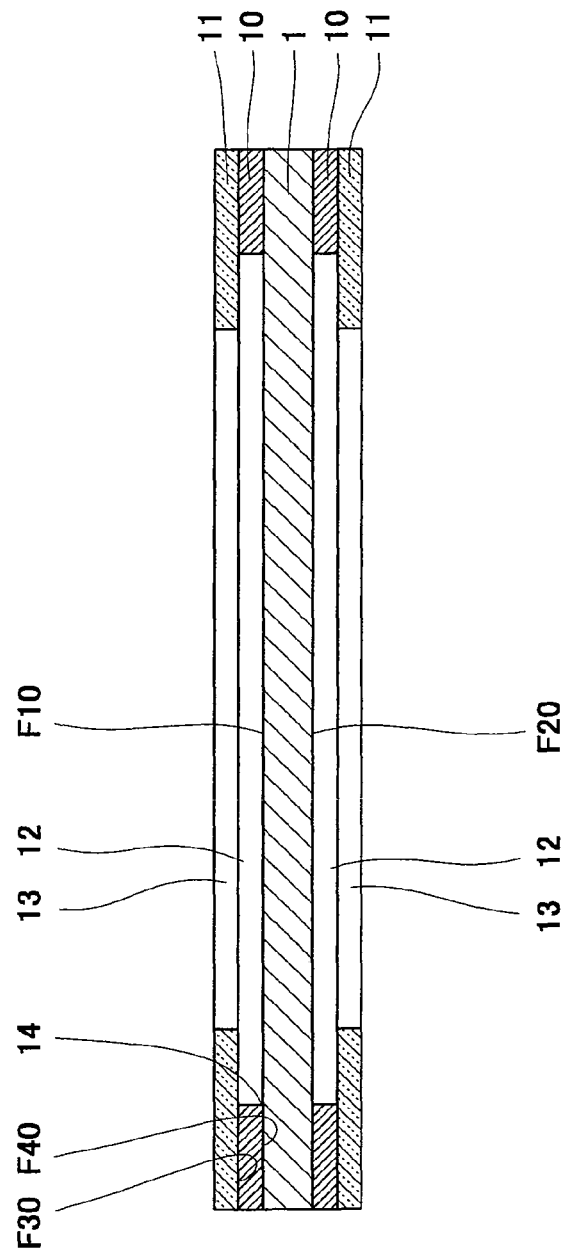
FIG. 23 is a cross-sectional view schematically showing a schematic configuration of the membrane-membrane reinforcing member assembly according to Embodiment 4 of the present invention.

FIG. 23 is a cross-sectional view schematically showing a schematic configuration of the membrane-membrane reinforcing member assembly according to Embodiment 4 of the present invention.

As shown in FIG. 23, in the membrane-membrane reinforcing member assembly 20 according to Embodiment 4, the opening 13 of the second membrane reinforcing member 11 is smaller in area than the opening 12 of the first membrane reinforcing member 10. To be specific, the inner peripheral surface forming the opening 12 of the first membrane reinforcing member 10 is formed to be located between the outer peripheral surface and the inner peripheral surface of the second membrane reinforcing member 11 when viewed from the thickness direction of the polymer electrolyte membrane 1.

Then, when the cells 40 each using the membrane-membrane reinforcing member assembly 20 according to Embodiment 4 are assembled as the stack and fastened to one another, a portion of the second membrane reinforcing member 11 which portion is located inwardly as compared to the first membrane reinforcing member 10 bends toward the main surface of the polymer electrolyte membrane 1 by fastening pressure. On this account, the pressure applied to the inner edge portion of the main surface F30 of the first membrane reinforcing member 10 becomes low, so that the pressure applied to the corner portion 14 formed by the main surface F40 and inner peripheral surface of the first membrane reinforcing member 10 becomes low. Therefore, although the corner portion 14 line-contacts the main surface F10 of the polymer electrolyte membrane 1, excessive pressure is not applied to the polymer electrolyte membrane 1, so that the damage of the polymer electrolyte membrane 1 can be suppressed.

The foregoing has explained the embodiments of the present invention in detail. However, the present invention is not limited to the above embodiments.

For example, the above embodiments of the present invention have explained a case where an outer peripheral portion (edge) of the first membrane reinforcing member 10 or the second membrane reinforcing member 11 coincides with a peripheral portion (edge) of the polymer electrolyte membrane 1 (case where when viewed from a substantially normal direction of the main surface of the polymer electrolyte membrane 1, the outer edge of the first membrane reinforcing member 10 or the second membrane reinforcing member 11 coincides with the edge of the polymer electrolyte membrane 1, and the edge of the polymer electrolyte membrane 1 does not protrude). However, the present invention is not limited to this. As long as the effects of the present invention can be obtained, the edge of the first membrane reinforcing member 10 or the second membrane reinforcing member 11 may entirely or partially protrude as compared to the edge of the polymer electrolyte membrane 1, or the edge of the polymer electrolyte membrane 1 may entirely or partially protrude as compared to the edge of the first membrane reinforcing member 10 or the second membrane reinforcing member 11.

Moreover, the above embodiments of the present invention have explained that the first membrane reinforcing members 10 are formed to extend along four sides of the polymer electrolyte membrane 1 as a whole. However, the present embodiments are not limited to this. As long as the operational advantages of the present invention can be obtained, a part of the first membrane reinforcing members 10 may be omitted. Moreover, as long as the operational advantages of the present invention can be obtained, a part of the second membrane reinforcing members 11 may be omitted.

Moreover, the above embodiments of the present invention have explained that the first membrane reinforcing members 10 are respectively disposed on both main surfaces of the polymer electrolyte membrane 1. However, the present embodiments are not limited to this, and the first membrane reinforcing member 10 may be disposed on only one of the main surfaces of the polymer electrolyte membrane 1. In this case, the first membrane reinforcing members 10 of the first pair and the second membrane reinforcing members 10 of the second pair may be placed to extend along four sides of the polymer electrolyte membrane 1.

Moreover, herein, the polymer electrolyte membrane 1 has a substantially quadrangular shape. However, the present embodiments are not limited to this. For example, each of four interior angles of the quadrangular shape of the polymer electrolyte membrane 1 does not have to be 90 degrees. Moreover, four sides of the polymer electrolyte membrane 1 may be bent to some extent, or four corners of the polymer electrolyte membrane 1 may be chamfered. Further, the polymer electrolyte membrane 1 may be circular or polygonal.

EXAMPLES

Hereinafter, the present invention will be explained in more detail using Examples.

Example 1

In Example 1, the cell 40 of the PEFC according to Embodiment 1 of the present invention was manufactured.

First, a piece of pressure sensitive paper (Prescale (Product Name) produced by Fujifilm Corporation, Ultra Super Low Pressure (LLLW)) was placed on the main surface F10 of the polymer electrolyte membrane 1, and the first and second membrane reinforcing members 10 and 11 were placed on the pressure sensitive paper. At this time, as shown in FIG. 2, when viewed from the thickness direction of the polymer electrolyte membrane 1, the inner peripheral surface of the first membrane reinforcing member 10 was placed to be located inwardly as compared to the inner peripheral surface of the second membrane reinforcing member 11. Specifically, the inner peripheral surface of the second membrane reinforcing member 11 was placed to be located at a position separated from the inner peripheral surface of the first membrane reinforcing member 10 by 1.0 mm in an outward direction (see FIG. 24). The size of each of the first and second membrane reinforcing members 10 and 11 was 205.6×205.6 mm, and the thickness thereof was 30 µm. Moreover, the size of the opening 12 of the first membrane reinforcing member 10 was 154.5×154.5 mm, and the size of the opening 13 of the second membrane reinforcing member 11 was 156.5×156.5 mm.

Next, the anode gas diffusion layer 3a and the cathode gas diffusion layer 3b were placed, and the gaskets 17 were respectively placed on the peripheral portions of the anode gas diffusion layer 3a and the cathode gas diffusion layer 3b. Thus, the MEA 5 was manufactured. At this time, the anode gas diffusion layer 3a (or the cathode gas diffusion layer 3b) was placed such that the outer peripheral surface of the anode gas diffusion layer 3a (or the cathode gas diffusion layer 3b) was located at a position separated from the inner peripheral surface of the second membrane reinforcing member 11 by 0.55 mm in the outward direction. Then, the MEA 5 was sandwiched between the separators 6a and 6b to form the cell 40. The cell 40 was fastened by fastening pressure of 7 kg/cm$^2$. The size of each of the anode gas diffusion layer 3a and the cathode gas diffusion layer 3b was 157.6×157.6 mm, and the thickness thereof was 150 µm. Moreover, the catalyst layers were not formed in Example 1 since the purpose of Example 1 was to test a pressure distribution on the main surface of the polymer electrolyte membrane 1 of the first membrane reinforcing member 10.

Then, the fastened cell 40 was left as it is for one minute, and then was disassembled, and the pressure sensitive paper was taken out. This result is schematically shown in FIG. 24.

Figure 24:
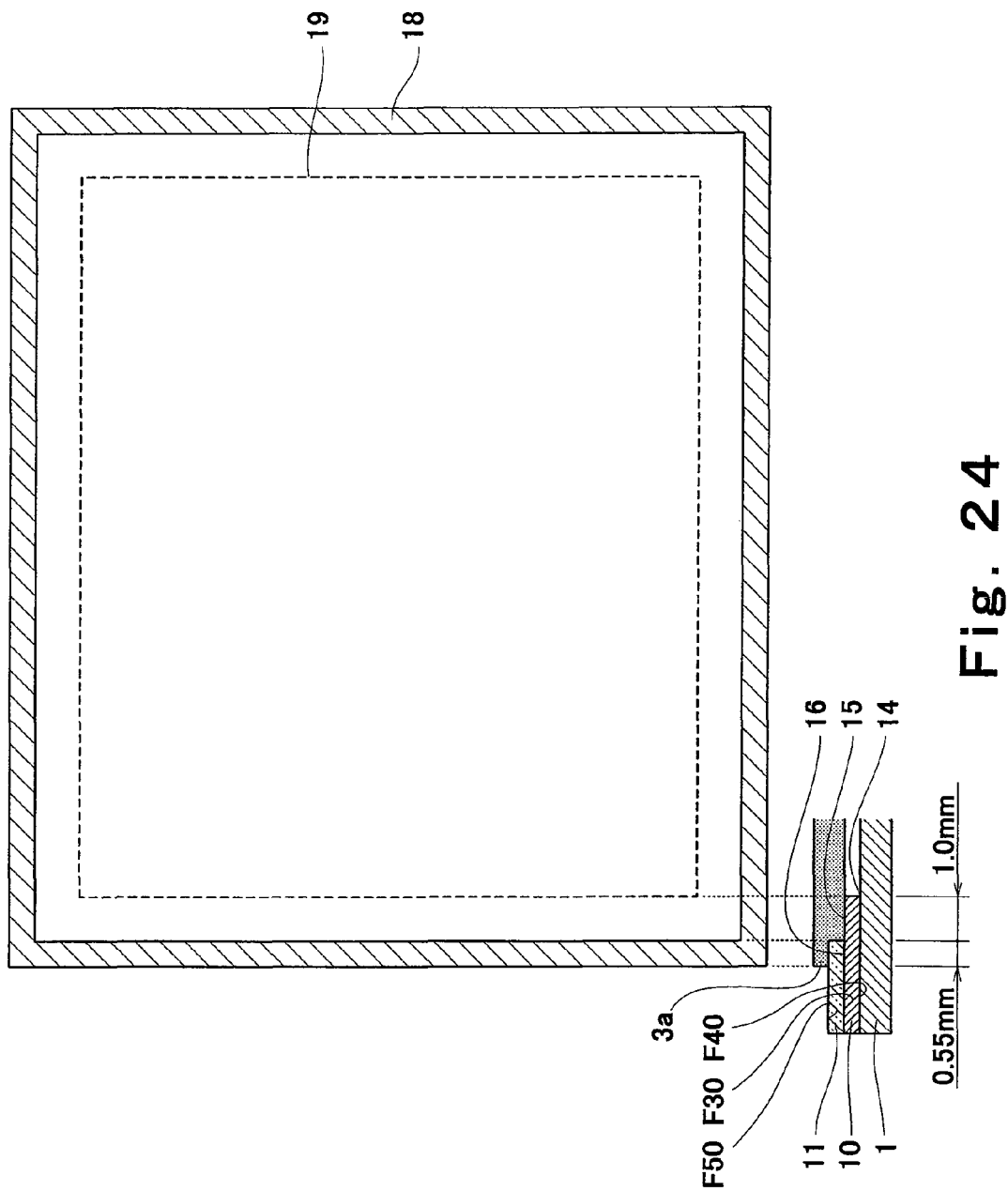
FIG. 24 is a perspective view schematically showing a schematic configuration of the polymer electrolyte fuel cell according to Embodiment 1.
Figure 25:
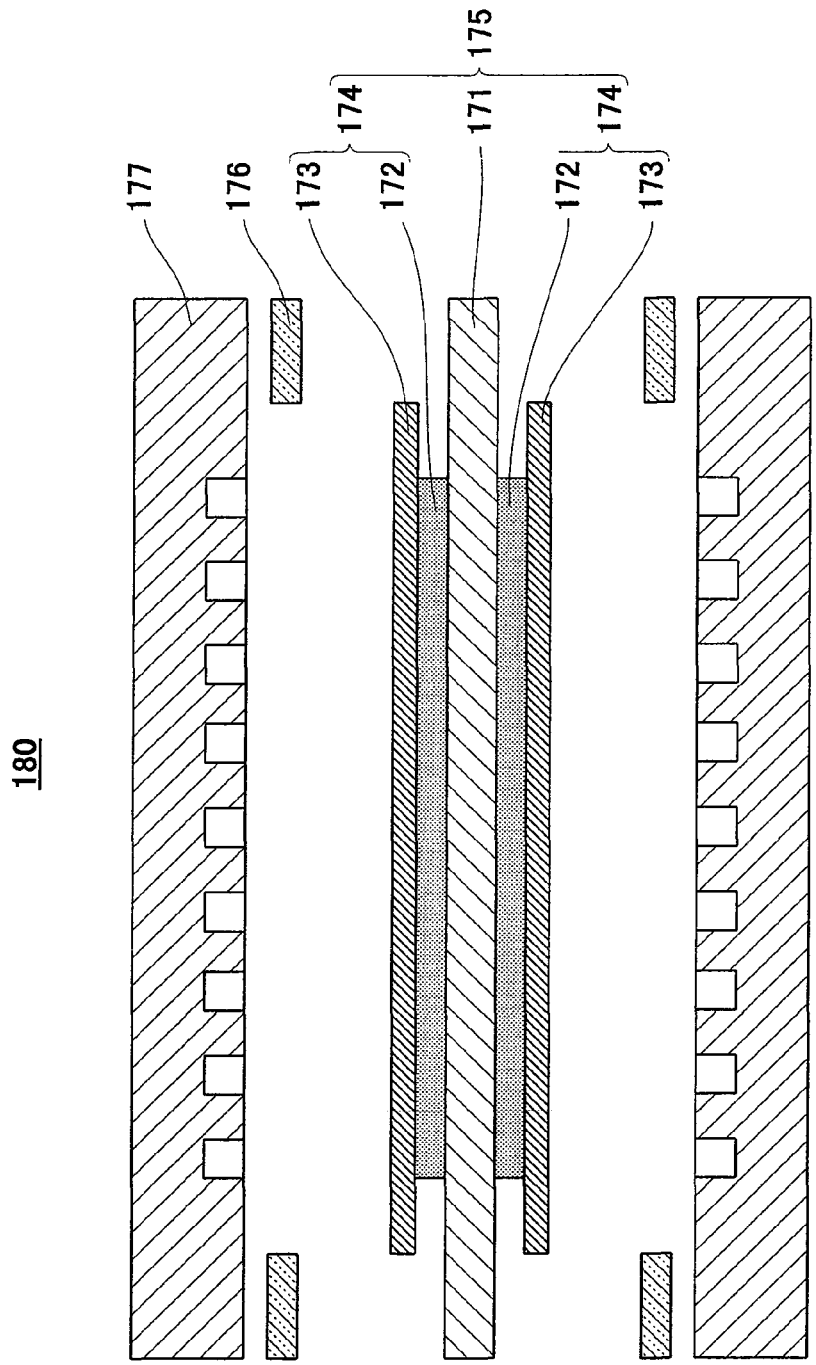
FIG. 25 is a cross-sectional view showing a general configuration of the cell of the polymer electrolyte fuel cell.
Figure 26:
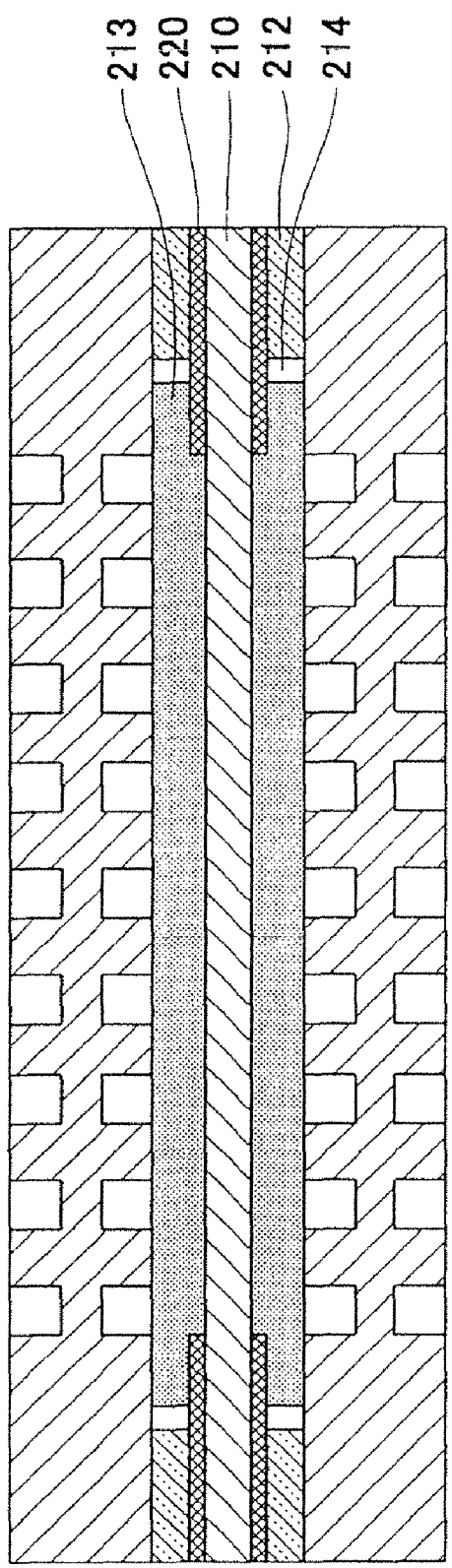
FIG. 26 is a schematic diagram schematically showing the solid polymer electrolyte fuel cell disclosed in Patent Document 2.

FIG. 24 is a schematic diagram showing the distribution of the pressure applied to the polymer electrolyte membrane 1 of the first membrane reinforcing member 10 in Example 1. In FIG. 24, a region 18 shown by diagonal lines is a region where high pressure is applied to the pressure sensitive paper, and a portion shown by a broken line 19 is a portion where low pressure is applied to the pressure sensitive paper. Then, as shown in FIG. 24, the region 18 corresponds to a portion of the inner surface of the anode gas diffusion layer 3a (or the cathode gas diffusion layer 3b) which portion contacts an outer surface F50 of the second membrane reinforcing member 11, and corresponds to the portion 16 of the outer surface F30 of the first membrane reinforcing member 10. The portion shown by the broken line 19 corresponds to the corner portion 14 formed by the inner surface F40 and inner peripheral surface of the first membrane reinforcing member 10.

As above, in accordance with the cell 40 of Example 1, it was confirmed that the pressure applied to the portion 16 of the outer surface F30 of the first membrane reinforcing member 10 was lower than the pressure applied to the corner portion 14 of the first membrane reinforcing member 10. Moreover, it was confirmed that although the corner portion 14 line-contacted the main surface F10 (or the main surface F20) of the polymer electrolyte membrane 1, excessive pressure was not applied to the polymer electrolyte membrane 1, so that the damage of the polymer electrolyte membrane 1 could be prevented.

From the foregoing explanation, many modifications and other embodiments of the present invention are obvious to one skilled in the art. Therefore, the foregoing explanation should be interpreted only as an example, and is provided for the purpose of teaching the best mode for carrying out the present invention to one skilled in the art. The structures and/or functional details may be substantially modified within the spirit of the present invention.

INDUSTRIAL APPLICABILITY

The membrane-membrane reinforcing member assembly, the membrane-catalyst layer assembly, and the membrane-electrode assembly according to the present invention are useful as components of the mass-producible polymer electrolyte fuel cell.

The polymer electrolyte fuel cell of the present invention is expected to be preferably used as a main power supply or an auxiliary power supply of, for example, movable bodies, such as a car, and distributed (on-site) power generating systems (domestic cogeneration systems).

The invention claimed is:

1. A membrane-membrane reinforcing member assembly comprising:
   a polymer electrolyte membrane;
   one or more film-shaped first membrane reinforcing members disposed on a main surface of the polymer electrolyte membrane so as to extend along a peripheral edge of the polymer electrolyte membrane as a whole; and
   one or more film-shaped second membrane reinforcing members disposed on the first membrane reinforcing members so as to extend along the peripheral edge of the polymer electrolyte membrane as a whole and disposed such that when viewed from a thickness direction of the polymer electrolyte membrane, an inner edge of the second membrane reinforcing member and an inner edge of the first membrane reinforcing member do not coincide with each other.

2. The membrane-membrane reinforcing member assembly according to claim 1, wherein the first membrane reinforcing member and the second membrane reinforcing member are disposed on only one of main surfaces of the polymer electrolyte membrane.

3. The membrane-membrane reinforcing member assembly according to claim 1, wherein the first membrane reinforcing member and the second membrane reinforcing member are disposed on each of both main surfaces of the polymer electrolyte membrane.

4. The membrane-membrane reinforcing member assembly according to claim 2, wherein each of the first membrane reinforcing member and the second membrane reinforcing member is formed to have a doughnut frame shape.

5. The membrane-membrane reinforcing member assembly according to claim 1, wherein:
   the polymer electrolyte membrane has a substantially quadrangular shape;
   the first membrane reinforcing members of a first pair are disposed on one of main surfaces of the polymer electrolyte membrane so as to respectively extend along two opposed sides of four sides of the polymer electrolyte membrane, and the first membrane reinforcing members of a second pair are disposed on the other main surface of the polymer electrolyte membrane so as to respectively extend along remaining two opposed sides of the four sides of the polymer electrolyte membrane;
   the second membrane reinforcing members of a first pair are respectively disposed on the first membrane reinforcing members of the first pair so as to respectively extend along the first membrane reinforcing members of the first pair; and
   the second membrane reinforcing members of a second pair are respectively disposed on the first membrane reinforcing members of the second pair so as to respectively extend along the first membrane reinforcing members of the second pair.

6. The membrane-membrane reinforcing member assembly according to claim 5, wherein when viewed from the thickness direction of the polymer electrolyte membrane, each of the second membrane reinforcing members of the first pair is placed between the first membrane reinforcing members of the second pair, and each of the second membrane reinforcing members of the second pair is placed between the first membrane reinforcing members of the first pair.

7. The membrane-membrane reinforcing member assembly according to claim 1, wherein the inner edge of the first membrane reinforcing member is formed to be located inwardly of the polymer electrolyte membrane as compared to the inner edge of the second membrane reinforcing member.

8. The membrane-membrane reinforcing member assembly according to claim 1, wherein the inner edge of the second membrane reinforcing member is formed to be located inwardly of the polymer electrolyte membrane as compared to the inner edge of the first membrane reinforcing member.

9. A membrane-catalyst layer assembly comprising:
   the membrane-membrane reinforcing member assembly according to claim 3;
   a first catalyst layer disposed to cover at least a part of one of the main surfaces of the polymer electrolyte membrane; and
   a second catalyst layer disposed to cover at least a part of the other main surface of the polymer electrolyte membrane.

10. A membrane-electrode assembly comprising:
    the membrane-catalyst layer assembly according to claim 9;
    a first gas diffusion layer disposed to cover at least a part of a main surface of the first catalyst layer; and
    a second gas diffusion layer disposed to cover at least a part of a main surface of the second catalyst layer.

11. The membrane-electrode assembly according to claim 10, wherein:
    the first gas diffusion layer is disposed to cover the first catalyst layer and a part of a main surface of the first membrane reinforcing member or the second membrane reinforcing member; and
    the second gas diffusion layer is disposed to cover the second catalyst layer and a part of a main surface of the first membrane reinforcing member or the second membrane reinforcing member.

12. The membrane-electrode assembly according to claim 11, wherein when viewed from the thickness direction of the polymer electrolyte membrane, the first gas diffusion layer and the second gas diffusion layer are disposed such that entire peripheral edges thereof substantially coincide with each other.

13. A polymer electrolyte fuel cell comprising the membrane-electrode assembly according to claim 10.

14. A method for manufacturing a membrane-electrode assembly, comprising the steps of:
    (A) disposing a film-shaped frame shape first membrane reinforcing member on a main surface of a polymer electrolyte membrane;
    (B) disposing a catalyst layer on a portion of the main surface of the polymer electrolyte membrane at which portion an opening of the first membrane reinforcing member is located;
    (C) bonding a second membrane reinforcing member and a gas diffusion layer such that the gas diffusion layer is fittingly inserted in an opening of the second membrane reinforcing member, to form a membrane reinforcing member-gas diffusion layer assembly; and (D) disposing the membrane reinforcing member-gas diffusion layer assembly formed in the step (C) on the polymer electrolyte membrane subjected to the step (B) such that the catalyst layer and the gas diffusion layer contact each other, and when viewed from a thickness direction of the polymer electrolyte membrane, an inner edge of the first membrane reinforcing member and an inner edge of the second membrane reinforcing member do not coincide with each other.

15. The method according to claim 14, wherein the first membrane reinforcing member, the catalyst layer, the second membrane reinforcing member, and the gas diffusion layer are disposed on each of both main surfaces of the polymer electrolyte membrane.

16. The method according to claim 14, wherein in the step (C), the gas diffusion layer is formed to fill the opening of the second membrane reinforcing member, and the second membrane reinforcing member and the gas diffusion layer are bonded to each other.

17. The method according to claim 14, wherein in the step (C), the gas diffusion layer is formed to have a plate shape, the second membrane reinforcing member is formed to surround a peripheral surface of the gas diffusion layer, and the gas diffusion layer and the second membrane reinforcing member are bonded to each other.

18. A method for manufacturing a membrane-electrode assembly, comprising the steps of:
(E) disposing a film-shaped frame shape first membrane reinforcing member on a main surface of a polymer electrolyte membrane;
(F) bonding a film-shaped frame shape second membrane reinforcing member and a gas diffusion layer such that the gas diffusion layer is fittingly inserted in an opening of the second membrane reinforcing member, to form a membrane reinforcing member-gas diffusion layer assembly;
(G) disposing a catalyst layer on one of main surfaces of the gas diffusion layer of the membrane reinforcing member-gas diffusion layer assembly; and
(H) disposing the membrane reinforcing member-gas diffusion layer assembly formed in the step (G) on the polymer electrolyte membrane subjected to the step (E) such that the catalyst layer contacts the polymer electrolyte membrane, and when viewed from a thickness direction of the polymer electrolyte membrane, an inner edge of the first membrane reinforcing member and an inner edge of the second membrane reinforcing member do not coincide with each other.

19. The method according to claim 18, wherein in the step (F), the gas diffusion layer is formed to fill the opening of the second membrane reinforcing member, and the second membrane reinforcing member and the gas diffusion layer are bonded to each other.

20. The method according to claim 18, wherein in the step (F), the gas diffusion layer is formed to have a plate shape, the second membrane reinforcing member is formed to surround a peripheral surface of the gas diffusion layer, and the gas diffusion layer and the second membrane reinforcing member are bonded to each other.

21. The membrane-membrane reinforcing member assembly according to claim 3, wherein each of the first membrane reinforcing member and the second membrane reinforcing member is formed to have a doughnut shape frame shape.

* * * * *

UNITED STATES PATENT AND TRADEMARK OFFICE
CERTIFICATE OF CORRECTION

PATENT NO.        : 8,192,896 B2
APPLICATION NO.   : 12/530907
DATED             : June 5, 2012
INVENTOR(S)       : Masaki Yamauchi et al.

It is certified that error appears in the above-identified patent and that said Letters Patent is hereby corrected as shown below:

IN THE CLAIMS:

Col. 43, Lines 44-47 should read,

4. The membrane-membrane reinforcing member assembly according to claim 2, wherein each of the first membrane reinforcing member and the second membrane reinforcing member is formed to have a ~~doughnut~~ frame shape.

Col. 46, Lines 29-32 should read,

21. The membrane-membrane reinforcing member assembly according to claim 3, wherein each of the first membrane reinforcing member and the second membrane reinforcing member is formed to have a ~~doughnut shape~~ frame shape.

Signed and Sealed this
Nineteenth Day of February, 2013

Teresa Stanek Rea
*Acting Director of the United States Patent and Trademark Office*